United States Patent
Liu et al.

(10) Patent No.: US 9,298,874 B2
(45) Date of Patent: Mar. 29, 2016

(54) TIME-VARIANT TEMPERATURE-BASED 2-D AND 3-D WIRE ROUTING

(71) Applicant: QUALCOMM Incorporated, San Diego, CA (US)

(72) Inventors: Chun-Chen Liu, San Diego, CA (US); Shengqiong Xie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/340,411

(22) Filed: Jul. 24, 2014

(65) Prior Publication Data

US 2015/0227668 A1    Aug. 13, 2015

Related U.S. Application Data

(63) Continuation-in-part of application No. 14/175,429, filed on Feb. 7, 2014.

(51) Int. Cl.
   *G06F 17/50* (2006.01)

(52) U.S. Cl.
   CPC ........ *G06F 17/5077* (2013.01); *G06F 2217/80* (2013.01); *G06F 2217/84* (2013.01)

(58) Field of Classification Search
   CPC .................. H01L 2924/0002; H01L 2924/00; H01L 21/00; H01L 21/78; H01L 23/5222; H01L 23/528; H01L 23/552; H01L 23/66; H01L 27/00; H01L 27/0207; H01L 27/0922; H01L 27/108; H01L 27/11; H01L 27/01; H01L 27/1104; H01L 2224/0231; H01L 2224/73215; H01L 2224/73265; H01L 23/3128; H01L 24/29; H01L 24/30; H01L 2924/19106; G06F 17/5077; G06F 17/5072
   USPC .................................................. 716/126–131
   See application file for complete search history.

(56) References Cited

U.S. PATENT DOCUMENTS

| | | | |
|---|---|---|---|
| 6,415,427 B2 | 7/2002 | Nitta et al. | |
| 6,775,710 B1 | 8/2004 | Hamamura | |
| 7,155,686 B2 | 12/2006 | Hou et al. | |
| 7,725,861 B2 | 5/2010 | Cheng et al. | |
| 8,209,651 B2 | 6/2012 | Yokogawa et al. | |
| 8,669,778 B1 * | 3/2014 | Or-Bach et al. | 326/37 |
| 2005/0034094 A1 * | 2/2005 | Madurawe | 716/12 |
| 2009/0055789 A1 * | 2/2009 | McIlrath | 716/10 |

OTHER PUBLICATIONS

International Search Report and Written Opinion—PCT/US2015/014780—ISAEPO—Apr. 17, 2015.

(Continued)

*Primary Examiner* — Binh Tat
(74) *Attorney, Agent, or Firm* — Loza & Loza LLP

(57) ABSTRACT

Various features pertain to circuit design schemes that route wires based on temperature. In one aspect, time-variant temperature conditions along a prospective route are taken into account when determining whether to use the route for a wire. For example, a route can be selected from among a set of prospective two-dimensional (2-D) or three-dimensional (3-D) routes based on which route is associated with the "smoothest" temperature gradient. Other aspects of the disclosure pertain to determining or exploiting adjustable search windows, layer wiring densities, worst-case skew values and resistance-capacitance (RC) coupling characteristics, particularly for use with 3-D routing within the layers of a stacked multi-layer substrate.

30 Claims, 32 Drawing Sheets

(56) References Cited

OTHER PUBLICATIONS

Liu C., et al., "Temperature-aware clock tree synthesis considering spatiotemporal hot spot correlations", Computer Design, 2008. ICCD 2008. IEEE International Conference on, IEEE, Piscataway, NJ, USA, Oct. 12, 2008, pp. 107-113, XP031407550, ISBN: 978-1-4244-2657-7.

Liu C., et al., "Thermal aware clock synthesis considering stochastic variation and correlations", Circuits and Systems, 2008. ISCAS 2008. IEEE International Symposium on, IEEE, Piscataway, NJ, USA, May 18, 2008, pp. 1204-1207, XP031392195, DOI: 10.1109/ISCAS.2008.4541640, ISBN: 978-1-4244-1683-7.

Yu H., et al., "Minimal skew clock embedding considering time variant temperature gradient", Proceedings of the 2007 International Symposium on Physical Design, ISPD '07, Jan. 1, 2007, p. 173, XP055181251, New York, New York, USA, DOI: 10.1145/1231996.1232036, ISBN: 978-1-59-593613-4.

Zhang T., et al., "Temperature-Aware Routing in 3D ICs," Asia and South Pacific Conference on Design Automation, Jan. 24, 2006, pp. 309-314, XP010899532, DOI: 10.1109/ASPDAC.2006.1594700, ISBN: 978-0-7803-9451-3.

Zhang T., et al., "Temperature-aware routing in 3D ICs," in Proceedings of the Asia-South Pacific Design Automation Conference, 2006, pp. 1-6.

* cited by examiner

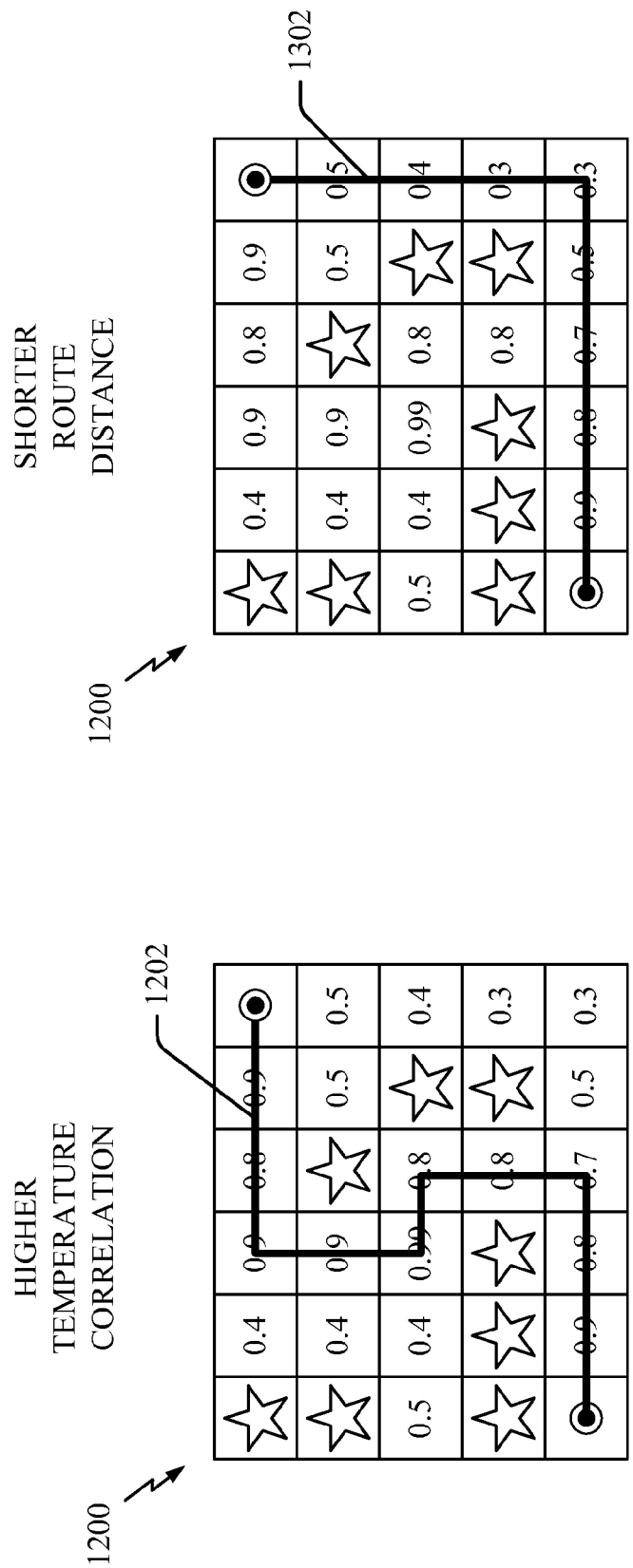

TIME-VARIANT TEMPERATURE-BASED 2-D AND 3-D WIRE ROUTING

CROSS-REFERENCE TO RELATED APPLICATIONS

This application is a continuation-in-part (CIP) of U.S. patent application Ser. No. 14/175,429, filed Feb. 7, 2014, for "Temperature-Based Wire Routing," which is incorporated by reference herein in its entirety.

BACKGROUND

1. Field of the Disclosure

The following relates generally to circuit design and more specifically, but not exclusively, to routing a wire in two-dimensions (2-D) or three-dimension (3-D) based on time-variant temperature characteristics.

2. Description of Related Art

Algorithms for routing wires, sometimes referred to as traces or electrical paths, on or within printed circuit boards (PCBs), integrated circuits (ICs), or other structures attempt to find the routes that best meet the routing requirements for the wires. In general, routing requirements dictate that the wires should be as short as possible. In this way, power consumption and signal propagation delay associated with the transmission of a signal over a wire is minimized at least to some degree. Moreover, the use of shorter wires enables more wires to be routed within a given area, thereby improving circuit density.

In some applications, routing requirements specify that the lengths of multiple wires be equal or nearly equal. For example, in timing critical applications that employ clock trees or that employ parallel wires (e.g., for busses or differential signals), the use of equal wire lengths makes it easier to match the signal propagation characteristics of the wires. Consequently, a signal or signals from one or more data sources may reach multiple data sinks via different wires at approximately the same time, thereby maintaining a desired timing relationship between the signals at the data sinks. In other words, matched wires are employed to keep the relative timing skew of signals transmitted over different wires to a minimum.

Other techniques have been proposed to reduce timing skew. For example, some systems use buffers to control the delay along a wire and thereby reduce timing skew. Other system insert crosslinks into the wiring structure to reduce timing skew.

In practice, however, the above techniques may not sufficiently reduce timing skew or may have certain drawbacks. For example, various operating conditions and environmental factors may affect the propagation delay of a signal through a wire. Thus, it may be difficult to match the signal propagation characteristics of different wires, even if the wire lengths are matched. Also, active techniques such as buffer insertion, can lead to a significant increase in power consumption. In addition, as crosslink link insertion can increase the wire length, an increase in power consumption may be seen in these scenarios as well. In view of the above, a need exists for improved circuit design techniques.

The parent application, noted above, was directed, at least in part, to providing various temperature-based circuit wiring techniques. The present application is directed, at least in part, to additional or alternative temperature-based circuit wiring techniques.

SUMMARY

In one aspect, a routing apparatus includes: a memory device; a processing circuit coupled to the memory device and configured to: identify a plurality of prospective routes for routing a wire through at least one substrate; determine, for each of the prospective routes, a time-variant temperature characteristic associated with the prospective route; select one of the prospective routes based on the time-variant temperature characteristic of the prospective routes; and store an indication of the selected route in the memory device.

In another aspect, a routing method includes: identifying a plurality of prospective routes for routing a wire through at least one substrate; determining, for each of the prospective routes, a time-variant temperature characteristic associated with the prospective route; selecting one of the prospective routes based on the time-variant temperature characteristic of the prospective routes; and storing an indication of the selected route.

In yet another aspect, a routing apparatus includes: means for identifying a plurality of prospective routes for routing a wire through at least one substrate; means for determining, for each of the prospective routes, a time-variant temperature characteristic associated with the prospective route; means for selecting one of the prospective routes based on the time-variant temperature characteristic of the prospective route; and means for storing an indication of the selected route.

In still yet another aspect, a substrate is provided having a wire formed thereon along a selected route associated with a smoothest time-variant temperature gradient from among a plurality of prospective routes wherein the is substrate prepared by a process including: identifying the plurality of prospective routes for routing the wire on the substrate; determining, for each of the prospective routes, a time-variant temperature gradient associated with the prospective route; selecting one of the prospective routes based on which of the prospective routes has the smoothest time-variant temperature gradient of the prospective routes; providing the substrate; and forming the wire on the substrate according to the selected route.

BRIEF DESCRIPTION OF THE DRAWINGS

FIGS. 12 and 13 are diagrams illustrating an example of a route decision considering both temperature correlation and route distance in accordance with some aspects of the disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
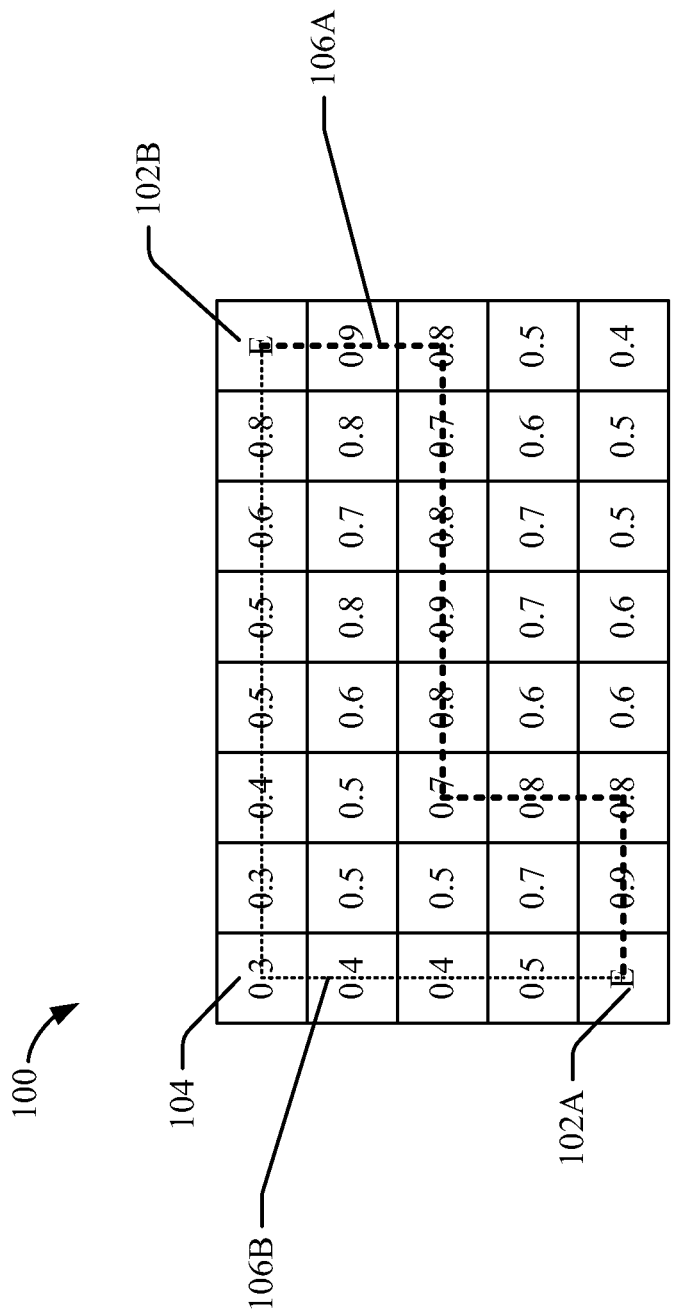
FIG. 1 is a diagram illustrating an example of route selection based on temperature in accordance with some aspects of the disclosure.

FIG. 1 illustrates an example of route selection based on temperature in accordance with some aspects of the disclosure. A grid of route points 100 is defined for routing a wire from a first endpoint 102A to a second endpoint 102B. Each route point is represented by one of the boxes in the grid of route points 100. Thus, there are 40 route points in the example of FIG. 1. In practice, a given route point would typically be located at the center of the corresponding box.

As discussed in more detail below, the route selection scheme involves determining (e.g., estimating) a temperature characteristic associated with each route point. Based on these temperature characteristics, a determination is made regarding the extent to which the temperature characteristic of each route point correlates with the temperature characteristics of the first and second endpoints 102A and 102B. In the example of FIG. 1, the number in a given box represents a temperature correlation cofactor for that box, where 0.99 would represent approximately total temperature correlation and 0.0 would represent no temperature correlation. Thus, a first routing point 104 in the grid of routing points 100 has a temperature correlation cofactor of 0.3 with the first and second endpoints 102A and 102B. It should be appreciated that different correlation cofactor ranges (e.g., including values less than 0 or greater than 1) could be used in different implementations.

In accordance with the teachings herein, the route between the first and second endpoints 102A and 102B is selected by determining which route of all of the possible routes between the first and second endpoints 102A and 102B has the best temperature correlation with the first and second endpoints 102A and 102B. Continuing with the example of FIG. 1, the best route would thus be the route that collectively has the highest correlation cofactors. Accordingly, the route represented by a first dashed line 106A is selected over any other prospective route such as the route represented by a second dashed line 106B.

The routing scheme of FIG. 1 may thus address timing skew issues that arise from different temperature conditions that exist over a route between a pair of endpoints. For example, component workload differences in printed circuit boards (PCBs), integrated circuits (ICs), or other circuitry can result in non-uniform temperature gradients across prospective routing paths. As a specific example, when the workload of a processor is very high, the area around the processor on a PCB, in an IC, etc., would typically be hotter than other areas of the PCB or IC. Given the linear relationship between wire resistance and temperature, a high temperature variance can increase the propagation delay over a wire by, for example, as much as 100%.

Moreover, the temperatures in a given area can vary over time. In the presence of a significant temperature gradient, uncertainty may thus be imparted on the system in terms of propagation delay, timing skew (e.g., clock skew), and skew variation. Furthermore, when interconnects are globally routed over a PCB, an IC, etc., the delay and skew effects of these temperature gradients may be even more problematic.

Figure 3:
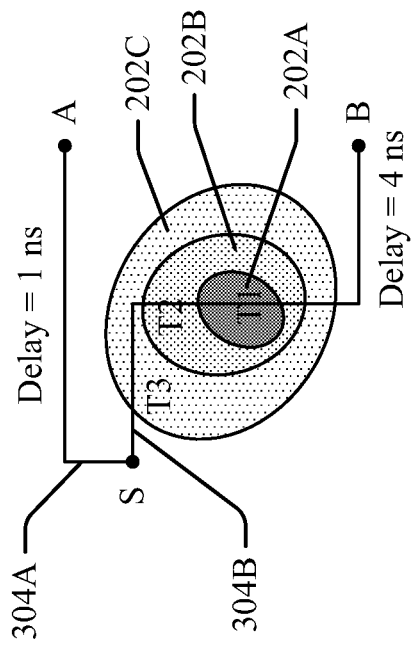
FIGS. 2 and 3 are diagrams illustrating an example of temperature-induced skew.
Figure 2:
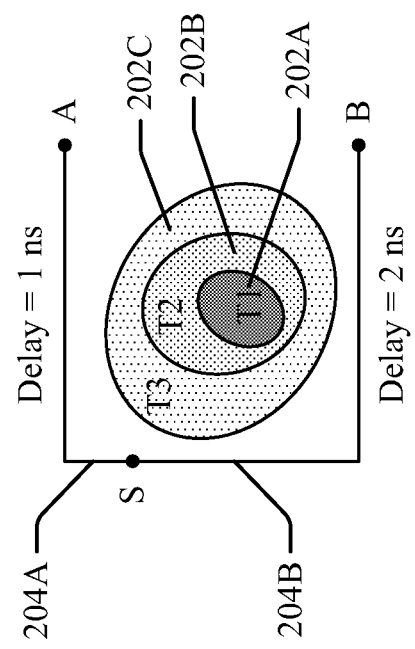

FIGS. 2 and 3 illustrate a simplified example of a routing area that is subject to different temperatures. A first area 202A is subjected to a relatively high temperature of T1 degrees during operation of circuitry in the vicinity of the first area 202A. To reduce the complexity of FIGS. 2 and 3, this circuitry is not shown. A second area 202B is subjected to a temperature of T2 degrees that is lower than T1 degrees during operation of the nearby circuitry. A third area 202C is subjected to a temperature of T3 degrees that is lower than T2 degrees during operation of the nearby circuitry.

In general, there is direct relationship between the temperature of a wire and the resistance of the wire. Consequently, temperatures differences along a wire may significantly affect propagation delay through the wire. FIGS. 2 and 3 illustrate an example of an increase in propagation delay that can arise when a wire passes through areas of high temperature.

In FIG. 2, a signal generated at a source point S propagates to a first sink point A via a first wire segment 204A and to a second sink point B via a second wire segment 204B. The propagation delay from the source point S to the first sink point A is 1 nanosecond, while the propagation delay from the source point S to the second sink point B is 2 nanoseconds. Of note, neither the first wire segment 204A nor the second wire segment 204B passes through any of the first to third areas 202A-202C.

In FIG. 3, a first wire segment 304A does not pass through any of the first to third areas 202A-202C. However, a second wire segment 304B does pass through each of the first to third areas 202A-202C. Consequently, in FIG. 3, the propagation delay from the source point S to the second sink point B is 4 nanoseconds. Accordingly, FIGS. 2 and 3 illustrate that a significant temperature-induced timing skew can arise between the signals carried on different wires (e.g., discrete wires or different branches of a tree) if the route for one of the wires passes through an area that is subject to different temperatures than another one of the wires.

The disclosure relates in some aspects to minimizing temperature-induced timing skew and timing skew variations through the use of a thermal-aware routing scheme. Advantageously, such a thermal-aware routing scheme effectively reduces skew and skew variation without additional metal routing and/or without an increase in power consumption in contrast to buffer insertion, crosslink insertion, and other conventional skew mitigation techniques.

With the above in mind, examples of operations relating to thermal-aware routing functionality according to the disclosure will be described in more detail in conjunction with the flowchart of FIG. 4. For convenience, the operations of FIG. 4 (or any other operations discussed or taught herein) may be described as being performed by specific components. It should be appreciated, however, that in various implementations these operations may be performed by other types of components and may be performed using a different number of components. It also should be appreciated that one or more of the operations described herein may not be employed in a given implementation.

Figure 4:
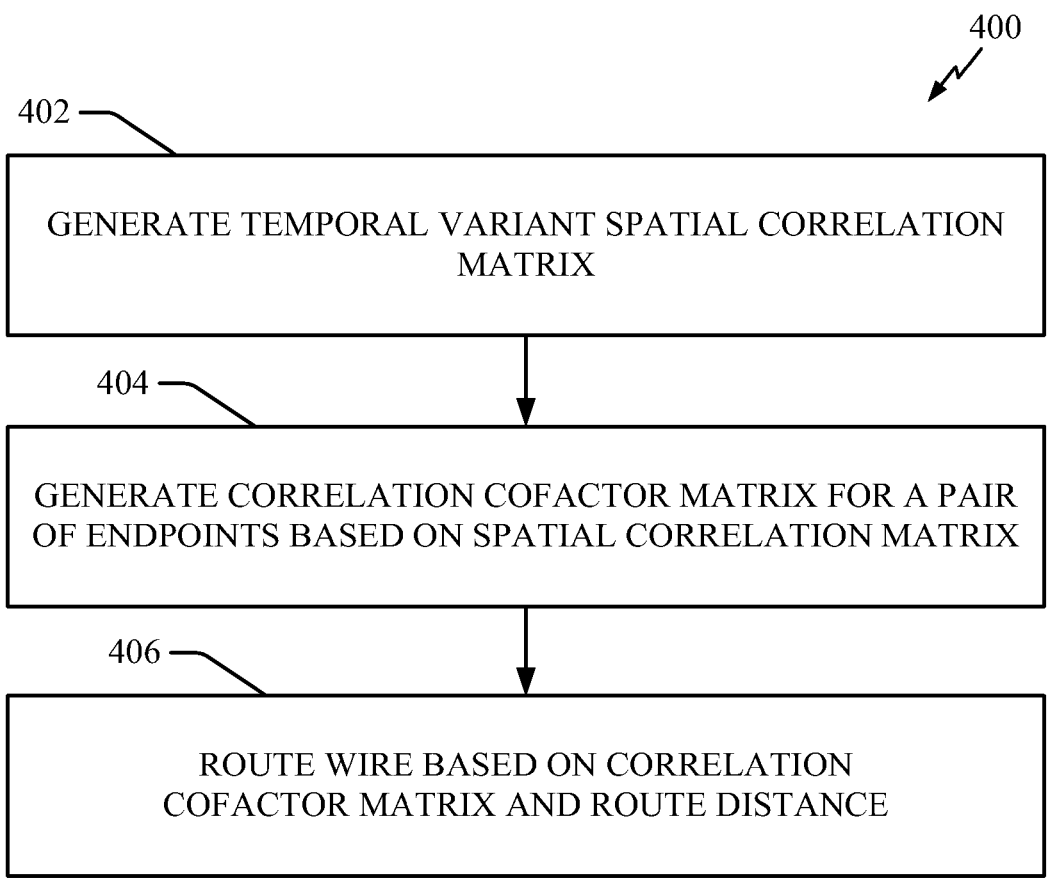
FIG. 4 is a flowchart illustrating an example of a wire routing method in accordance with some aspects of the disclosure.

FIG. 4 illustrates a process 400 for routing a wire based on a correlation co-factor matrix in accordance with some aspects of the disclosure. The process 400 may take place within a processing circuit 1810 (FIG. 18), which may be located in a circuit design tool or some other suitable apparatus. In another aspect, the process 400 may be implemented by the circuit design system 1700 illustrated in FIG. 17. Of course, in various aspects within the scope of the disclosure, the process 400 may be implemented by any suitable apparatus capable of supporting wire routing operations.

An example of an objective that may be achieved by the process 400 is to find the route for a wire that has the smoothest temperature gradient and that also results in as short of a wire as possible. In some aspects, a smooth temperature gradient refers to one that does not have any or has few sudden changes in temperature (e.g., changes in temperature magnitude that exceed a first threshold level) and that does not have large temperature extremes (e.g., a difference in temperature magnitude that exceeds a second threshold level that is larger in magnitude than the first threshold level). By providing a smooth temperature gradient, skew and skew variation that could otherwise be caused by temperature variations along a route can be kept low. In addition, by keeping the wire length short (e.g., through the use of maze routing), the power consumption associated with the wire can be kept low.

In some implementations, the process 400 is used to find a route between endpoints (e.g., pin pairs) that are highly correlated with respect to temperature. For example, this routing scheme may be particularly advantageous for scenarios where both endpoints tend to be at or near the same temperature over time.

In general, the process 400 attempts to find the route that has the highest temperature correlation with the endpoints. Thus, the route selection process attempts to build all routing paths on highly correlated areas. By building on such highly correlated areas, any changes in temperature seen over the course of the route will tend to be smoother (e.g., the magnitude of any temperature changes will be lower). Consequently, timing skew and skew variations associated with a route may be more controlled or predictable.

Further to this end, the process 400 also may avoid so-called hot spots. For example, the route selection process may ensure that the selected route does not pass through any area subject to a temperature extreme (i.e., either too hot or too cold).

At block 402, a temporal variant spatial correlation matrix (map) is generated. Here, the routing area (e.g., the overall PCB or IC) is divided into a uniform grid with a total of N nodes. The temperatures at each of the N nodes are then modeled by, for example, random processes. Each node is thus described by a temperature sequence sampled at N time instances as indicated by Equation 1.

$$L_{n1} = \{T(t_1, n_1), \ldots, T(t_p, n_1), T(t_{p+1}, n_1), \ldots, T(t_N, n_1)\}$$

$$L_{n2} = \{T(t_1, n_2), \ldots, T(t_p, n_2), T(t_{p+1}, n_2), \ldots, T(t_N, n_2)\}$$

$$\ldots$$

$$L_{nN} = \{T(t_1, n_N), \ldots, T(t_p, n_N), T(t_{p+1}, n_N), \ldots, T(t_N, n_N)\} \quad (1)$$

A temperature (spatial) correlation matrix can thus be defined as set forth in Equation 2.

$$C(i, j) = \frac{\text{cov}(i, j)}{\sigma_i \cdot \sigma_j} \quad (2)$$

Here, cov(i,j) is the co-variance matrix between the nodes as set forth in Equation 3.

$$\text{cov}(i,j) = \Sigma_{k=1}^{N} T(t_k,n_i)T(t_k,n_j) - \Sigma_{k=1}^{N} T(t_k,n_i)\Sigma_{k=1}^{N} T(t_k, n_j) \quad (3)$$

The parameters $\sigma_i$ and $\sigma_j$ referenced in Equation 1 and set forth in Equation 4 are the standard deviations for the nodes $n_i$ and $n_j$, respectively.

$$\sigma_i = \sqrt{\sum_{k=1}^{N} \frac{T(t_k, n_i)^2}{N} - (\hat{T}_i)^2} \quad (4)$$

$$\sigma_j = \sqrt{\sum_{k=1}^{N} \frac{T(t_k, n_j)^2}{N} - (\hat{T}_j)^2}$$

Finally, the mean temperatures for the nodes $n_i$ and $n_j$, respectively, are set forth in Equation 5.

$$\hat{T}_i = \sum_{k=1}^{N} \frac{T(t_k, n_i)}{N} \quad (5)$$

$$\hat{T}_j = \sum_{k=1}^{N} \frac{T(t_k, n_j)}{N}$$

At block 404 of FIG. 4, a correlation cofactor matrix (map) is generated based on the spatial correlation matrix generated at block 402. As discussed herein, in some aspects, this operation involves determining the temperature correlation of each point in the grid with respect to the designated wire target points (e.g., endpoints).

A correlation cofactor in area P (CCp) to target i, j is defined based on (e.g., as the product of or as the sum of) the two corresponding coefficients. For the case where the correlation cofactor is based on the product of the coefficients, CCp=cov(i,p)*cov(p,j). Again, areas with a high correlation cofactor value represent high correlation with both routing target points.

At block 406, the wire is routed based on the correlation cofactor matrix and the route distance. In some implementations, a routing algorithm such as a maze routing algorithm is used in conjunction with the thermal ware routing in an attempt to find the shortest possible route with the smoothest possible temperature gradient.

Figure 5:
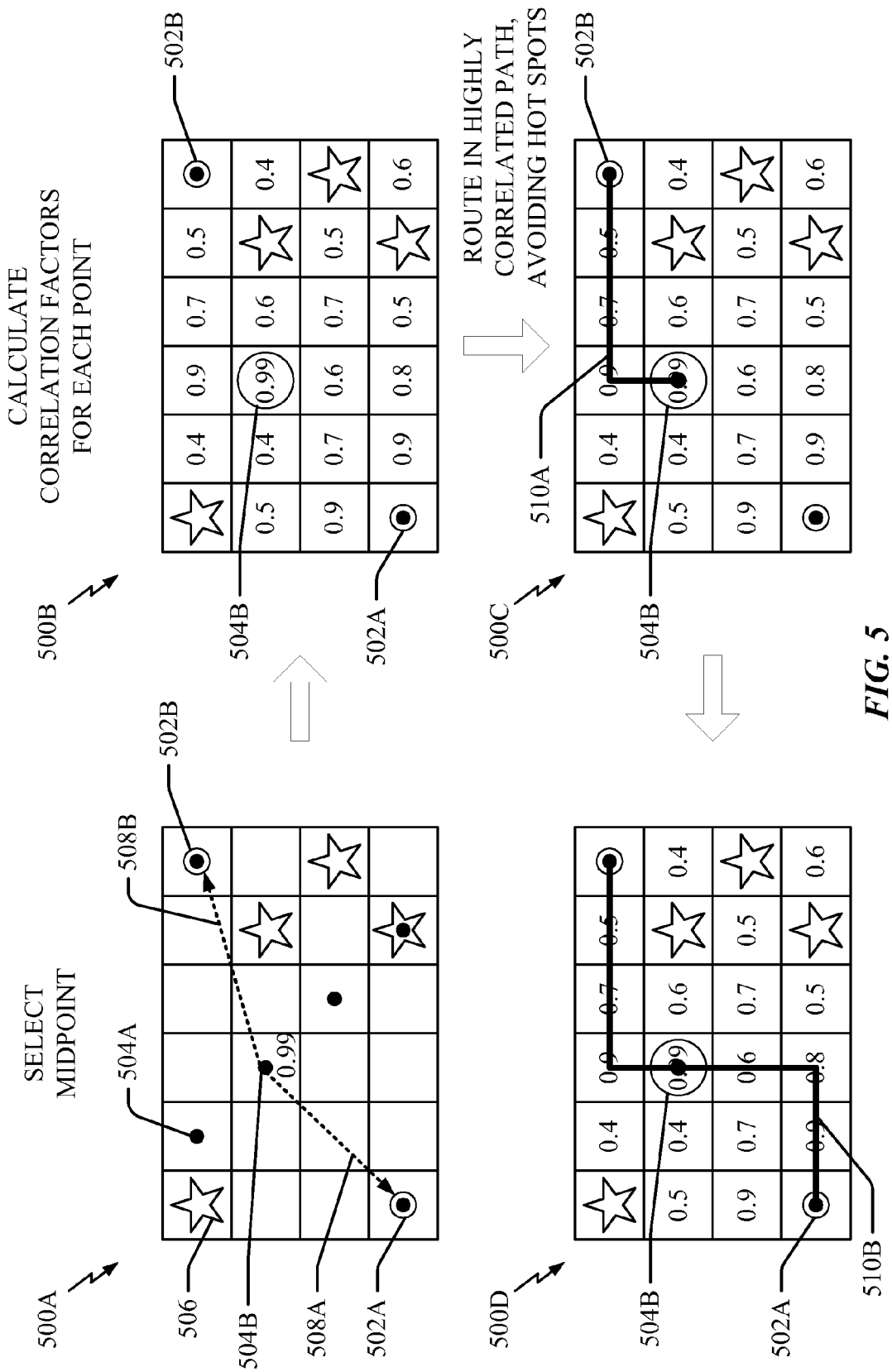
FIG. 5 is a diagram illustrating an example of route selection based on a temperature cofactor matrix in accordance with some aspects of the disclosure.

FIG. 5 illustrates, in a graphical manner, an example of route selection based on a correlation cofactor matrix. FIG. 5 depicts the grid at four different phases of the route selection labeled, in order of operation, a first phase 500A, a second phase 500B, a third phase 500C, and a fourth phase 500D.

In this example, the first phase 500A involves selecting a midpoint between a first endpoint 502A and a second endpoint 502B. To this end, a set of four prospective midpoints are identified, each represented by a single solid dot. For purposes of illustration, a first midpoint 504A and a second midpoint 504B are specially labeled in FIG. 5. The temperature correlation cofactors are calculated for each of the prospective midpoints and, preferably, the prospective midpoint with the highest temperature correlation to the first and second endpoints 502A and 502B is selected as the midpoint for the route. In this example, the second midpoint 504B has a correlation cofactor of 0.99 and, hence, this midpoint is selected as the midpoint for the routing operation. The correlation cofactors of the other prospective midpoints are not labeled to reduce the complexity of FIG. 5.

As mentioned above, in some implementations, the routing operation avoids so-called hot spots. Hot spots are represented as stars in FIG. 5. For purposes of illustration, a first one of these hot spots 506 is specially labeled. It should be appreciated that in some scenarios, the presence of a hot spot may prevent the selection of an otherwise desired midpoint. For example, hot spots may block a direct route to a midpoint.

Once the selected midpoint 504B is selected for the route, a route passing through the second midpoint 504B needs to be identified. Specifically, the route selection involves identifying a route from the second midpoint 504B to the first endpoint 502A, as generally represented by a first dashed line 508A. In addition, the route selection involves identifying a route from the second midpoint 504B to the second endpoint 502B, as generally represented by a second dashed line 508B.

To this end, the routing operation proceeds to the second phase 500B whereby a correlation cofactor is calculated for each routing point. As in FIG. 1, the correlation cofactor may range from 0.0 to approximately 1.0 (e.g., 0.9999). As a visual aid, a circle has been added to the second midpoint 504B to emphasize that this routing point is the midpoint for the route.

The routing operation then proceeds to the third phase 500C where a desired route 510A between the second midpoint 504B and the second endpoint 502B is identified. As discussed herein, the route having the highest correlation cofactor values is selected here. Also, hot spots are avoided during this route selection.

Finally, the routing operation proceeds to the fourth phase 500D where a desired route 510B between the second midpoint 504B and the first endpoint 502A is identified. Again, the route having the highest correlation cofactor values is selected. In addition, hot spots are avoided.

Figure 6:
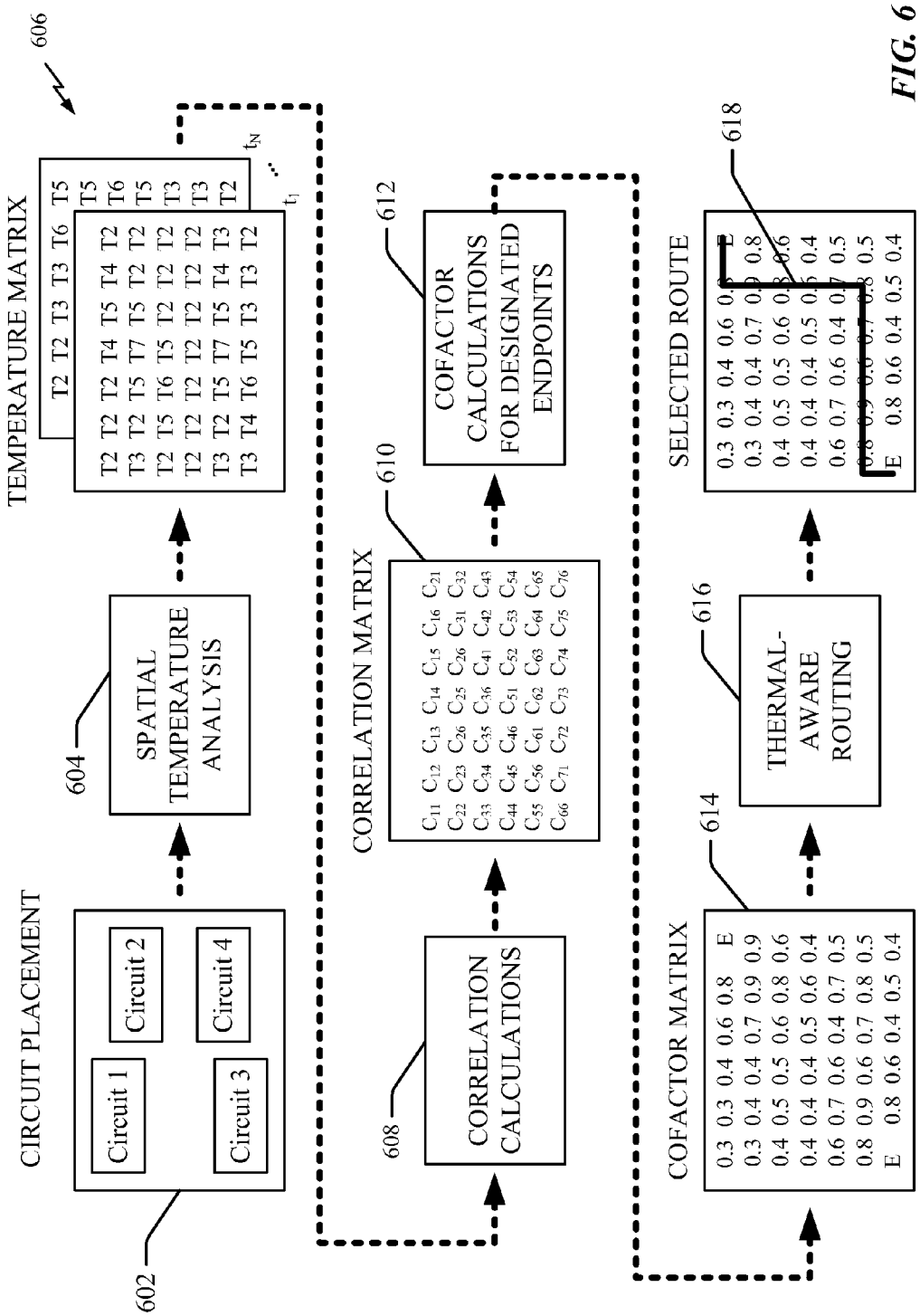
FIG. 6 is a diagram illustrating an example of generating and using a cofactor matrix in accordance with some aspects of the disclosure.

Referring now to FIG. 6, the generation and use of a cofactor matrix will be described in more detail. As mentioned above, high temperature variability can significantly impact the delay and skew associated with a wire route. Thermal-aware routing as taught herein may consider both distance and temperature correlation for evaluating the delay between each node and also reducing skew and skew variation.

Since dynamic temperature variation over time generates different skews, the routing scheme identifies the smoothest routing path, from a temperature perspective, in an attempt to guarantee more stable skew variation. The routing scheme considers time-variant temperature variations along with spatial and temporal correlation. A temperature correlation map is then generated by analyzing time-variant temperature maps. In this way, the routing scheme can identify the route with the highest correlation cofactor values and thereby provide a route with better thermal tolerance. In addition, by avoiding any hot spot areas indicated by the temperature correlation map, the routing scheme can further reduce worst case skew.

Initially, a circuit design process involves locating circuits in an area 602 of a PCB, IC, or some other suitable structure. This may be accomplished, for example, using an appropriate computer aided design (CAD) system.

Spatial temperature analysis 604 is then performed for the area 602. In some aspects, this involves determining (e.g., estimating) the temperature at different points of the area 602 over a period of time. For example, a simulation program that has information about the temperature characteristic of the circuits located in the area 602 and information about how these circuits are configured to operate can generate an estimate of the temperature to be expected at various points within the area 602 when the circuits are in operation.

To model such time-variant temperatures in the vicinity of the circuits in the area 602, a grid is defined on the PCB, IC, or other routing structure and each grid is assigned a temperature range. This temperature range can be obtained by measurement or thermal simulation. For example, the circuits can be run though all operational states (e.g., a complete instruction set for the circuits may be tested) to obtain the corresponding temperature profiles.

As a specific, non-limiting example, temperature analysis may involve a micro-architecture level power and temperature simulation. The area 602 is divided into a uniform grid with a total of N nodes. By applying appropriate benchmark applications in a sequence (each with a time-period $t_p$), the thermal-power is obtained by averaging the cycle-accurate (scale of picoseconds) dynamic power in the thermal-constant scale (scale of milliseconds). Using this time-variant thermal power as an input, the transient temperature $T(t_i, n_j)$ over the area 602 is calculated at different time instants $t_i$ for each node $n_j$ in the grid. To automatically extract correlation for temperature variations, the temperatures at N nodes may be modeled by random processes. Each node in the grid may thus be described by a temperature sequence sampled at N time instants. FIG. 6 illustrates a simplified example of a resulting three dimensional temperature matrix 606 for time instances $t_1$ to $t_N$. In a non-limiting example, the temperature matrix 606 corresponds to Equation 1 set forth above. Note that matrix 606 is referred to as a "three-dimensional matrix" because it includes a set of N 2-D arrays of values where N is the number of nodes. However, this does not imply that the corresponding substrate has multiple layers or that a 3-D grid of nodes is exploited. See below for detailed examples provided within FIG. 26 and following of multilayer substrates wherein a 3-D grid of nodes is defined and exploited.

Correlation calculations 608 use the temperature matrix 606 as an input to generate a correlation matrix 610. In a non-limiting example, the correlation calculations 608 correspond to Equations 2-5 set forth above. In such a case, the correlation matrix 610 would thus correspond to Equation 2. For example, the correlation coefficients C(i, j) can be pre-computed and stored in a table.

Cofactor calculations 612 use the correlation matrix 610 as an input to generate a cofactor matrix 614 associated with designated target points (e.g., endpoints) for the route. A point in the grid having a high correlation cofactor value represents high correlation with both routing target points. As mentioned above, in some implementations, a correlation cofactor is based on the product of the coefficients associated with two target points: CCp=cov(i,p)*cov(p,j). In other implementations, a correlation cofactor may be based on the sum of the coefficients, CCp=cov(i,p)+cov(p,j). Other algorithms that serve to indicate the correlation of a point with two target points could be used as well.

Finally, thermal-aware routing 616 uses the cofactor matrix 614 as an input to identify the route 618 with the highest correlation values. For example, the thermal-aware routing 616 may calculate a correlation value for each prospective route between two target points. The correlation value for a route is a function of the individual cofactor values associated with the grid points along the route. For example, the individual cofactor values may be multiplied together, added together, or operated on in some other way to generate the correlation value for the route.

Various types of routing algorithms (e.g., maze routing, etc.) may be employed in various implementations depending on design objectives. Thermal-aware routing may employ Manhattan routing rules or other routing rules. Thus, routing need not be restricted to "upward" and "to the right" routing choices, or necessarily restricted to remain within a defined routing window. Thus, course reversal (e.g., backtracking) could be employed in a scenario where this results in superior skew characteristics for a route.

Figure 7:
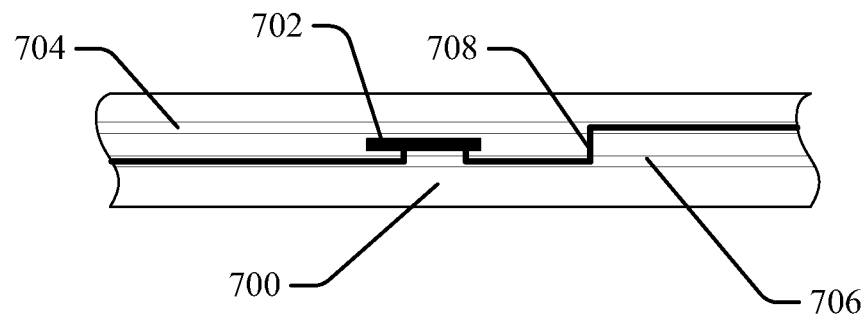
FIG. 7 is a diagram illustrating an example of a substrate in accordance with some aspects of the disclosure.
Figure 8:
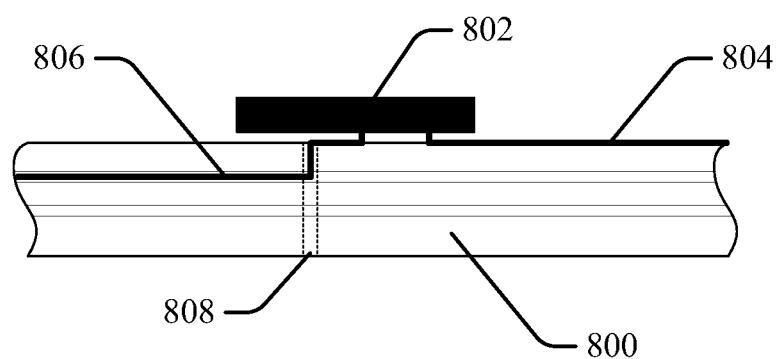
FIG. 8 is a diagram illustrating another example of a substrate in accordance with some aspects of the disclosure.

Temperature-based routing may be used for routing in two or three dimensions. For example, routing may be performed across different layers of a PCB, across different layers of an IC, across stacked ICs, or across some other multi-layer structure. In this case, a temperature map can be calculated for all prospective route points in the different layers and a routing decision made based on this three-dimensional temperature map. FIGS. 7 and 8 illustrate two examples of multi-layer routing (i.e., three-dimensional routing) on two different types of substrates, respectively. Additional examples are described in detail below with reference to FIG. 26 and following.

FIG. 7 illustrates a simplified example of routing on an integrated circuit die substrate 700. Through the use of deposition and other fabrication techniques, a circuit 702 and metal wires (traces) are formed on various layers of the substrate 700. In this example, wires are formed on a first metal layer 704 (e.g., a first wire routing layer) and on a second metal layer 706 (e.g., a second wire routing layer). Moreover, if needed, a wire can be routed on multiple layers whereby, at an appropriate location, the wire includes a transition 708 from one layer to another layer.

FIG. 8 illustrates a simplified example of routing on a printed circuit board substrate 800. Through the use of deposition and other fabrication techniques a circuit 802 (a surface mount component in this example) and metal wires (traces) are formed on or attached to various layers of the substrate 800. In this example, wires are formed on a first metal layer 804 (e.g., a first wire routing layer) and on a second metal layer 806 (e.g., a second wire routing layer). Moreover, if needed, a wire can be routed on multiple layers whereby a so-called via 808 electrically couples one section of a wire on one layer to another section of the wire on another layer.

A final routing decision may take physical factors into account as well as temperature factors. For example, weighting factors can be associated with transitions from one layer to another, the use of a via, reversing course, or other physical factors. In some aspects, these physical factors may affect the signal skew, the power consumption, or some other operating parameter associated with a route. Thus, a weighting factor can be used to quantify such an effect. Consequently, the determination of the best route (e.g., the route with the lowest skew, the route that provides a skew that best matches the skew of another route, the route with the lowest power consumption, etc.) can be based on a balancing of temperature correlation and these other weighting factors.

Figure 9:
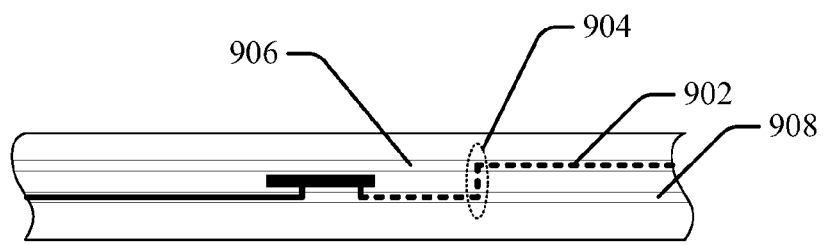
FIG. 9 is a diagram illustrating an example of a scenario where a layer-based weighting factor may be applied in accordance with some aspects of the disclosure.

FIG. 9 illustrates an example of a scenario where a routing decision may consider a layer-based weighting factor. A decision to use a particular route may take into account whether the route is on a single layer or multiple layers. In particular, since a transition between layers may negatively affect the signal propagation characteristics of the route (e.g., due to impedance discontinuities), a routing decision may penalize a route that transitions between layers one or more times.

As one example, after calculating a correlation value for a route 902, this correlation value may be adjusted to account for the route 902 including a transition 904 between a first layer 906 and a second layer 908. For example, the original correlation value for the route 902 may be reduced by a weighting factor to indicate that the skew associated with the route 902 is negatively affected by the transition 904.

As another example, a routing decision may be made based on a correlation value for the route 902 as well as one or more weighting factors related to the route 902. Such weighting factors can be indicative of, without limitation, the length of the route 902 and the number of transitions between layers in the route 902. Thus, the route selection algorithm can calculate one or more weighting factors for each of the prospective routes, and use these weighting factors and the correlation values to determine whether to select one route over another route.

Figure 10:
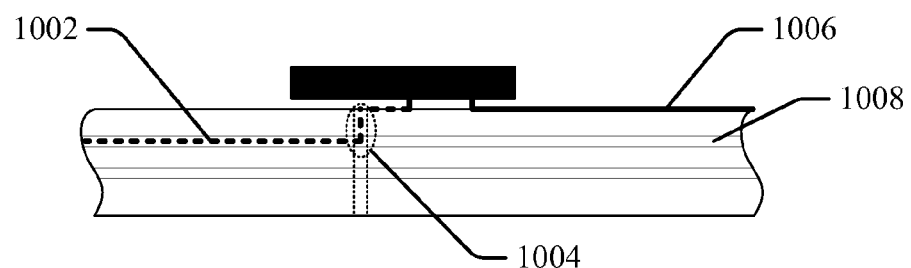
FIG. 10 is a diagram illustrating an example of a scenario where a via-based weighting factor may be applied in accordance with some aspects of the disclosure.

FIG. 10 illustrates an example of a scenario where a routing decision may consider a via-based weighting factor. Here, a decision to use a particular route may take into account whether the route passes through a via. Since the use of a via may negatively affect the signal propagation characteristics of the route (e.g., due to impedance discontinuities), a routing decision may penalize a route that uses one or more vias.

As one example, after calculating a correlation value for a route 1002, this correlation value may be adjusted to account for the route 1002 including a via 1004 between a first layer 1006 and a second layer 1008. For example, the original correlation value for the route 1002 may be reduced by a weighting factor to indicate that the skew associated with the route 1002 is negatively affected by the via 1004.

As another example, a routing decision may be made based on a correlation value for the route 1002 as well as one or more weighting factors related to the route 1002. Such weighting factors can be indicative of, without limitation, the length of the route 1002 and the number of vias 1004 in the route 1002. Thus, the route selection algorithm can calculate one or more weighting factors for each of the prospective routes, and use these weighting factors and the correlation values to determine whether to select one route over another route.

Figure 11:
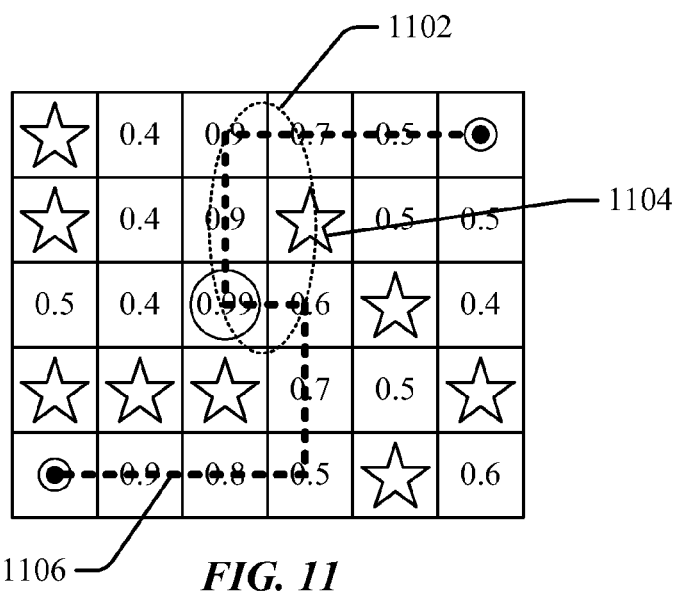
FIG. 11 is a diagram illustrating an example of a scenario where a course reversal-based weighting factor may be applied in accordance with some aspects of the disclosure.

FIG. 11 illustrates an example of a scenario where a routing decision may consider a course reversal-based weighting factor. In this scenario, a decision to use a particular route may take into account whether the route reverses its course. Since such a course reversal may negatively affect the signal propagation characteristics of the route (e.g., due to impedance discontinuities, transitioning outside of a desired area, or lengthening of the route), a routing decision may penalize a route that includes one or more course reversals. FIG. 11 illustrates an example of a course reversal 1102 caused by hot spots (e.g., hot spot 1104) that block the use of a more desirable route.

As one example, after calculating a correlation value for a route 1106, this correlation value may be adjusted to account for the route 1106 including a course reversal 1102. For example, the original correlation value for the route 1106 may be reduced by a weighting factor to indicate that the skew associated with the route 1106 is negatively affected by the course reversal 1102.

As another example, a routing decision may be made based on a correlation value for the route 1106 as well as one or more weighting factors related to the route 1106. Such weighting factors can be indicative of, without limitation, the length of the route 1106 and the number of course reversals 1102 in the route 1106. Again, the route selection algorithm can calculate one or more weighting factors for each of the prospective routes, and use these weighting factors and the correlation values to determine whether to select one route over another route.

In some implementations, three-dimensional multi-layer routing is employed over a plurality of stacked substrates. For example, the various layers referred to in FIGS. 7-10 above could be stacked substrates in some scenarios. Thus, the identification of a route as taught herein can involve identifying a route over a plurality of stacked substrates in some implementations. Additional 3-D examples are described in detail below with reference to FIG. 26 and following.

The disclosure relates in some aspects to selecting a route by balancing temperature considerations and route length considerations. For example, a route that is shorter than an alternative route might not be selected if the alternative route has better temperature characteristics. Conversely, a route that has better temperature characteristic than an alternative route might not be selected if the length of the route is longer than the alternative route. Consequently, the determination of the best route (e.g., the route with the lowest skew, the route that provides a skew that best matches the skew of another route, the route with the lowest power consumption, etc.) can be based on both temperature correlation and distance factors.

FIGS. 12 and 13 illustrate a scenario where a route decision may consider both temperature correlation and route distance. FIGS. 12 and 13 both illustrate the same correlation matrix 1200, but depict different routes 1202 and 1302, respectively. The route 1202 has a higher temperature correlation than the route 1302, while the route 1302 is shorter than the route 1202.

Accordingly, a routing decision can take into account the length of the route and the temperature correlation of the route to determine which route is better. As discussed herein, factors to consider when identifying the best route can include, without limitation, the amount of skew, a skew match with an associated route, and power consumption.

The manner in which these different factors are compared from one route to the next can take various forms. As one example, a routing scheme can calculate the differences between these factors for the routes 1202 and 1302, and compare these differences (e.g., through the use of a weighting factor) to determine whether the improved temperature correlation of the route 1202 offsets the longer length of the route 1202 in terms of desired performance (e.g., skew, power consumption, etc.). As another example, a routing scheme can calculate a metric for each route 1202 and 1302 that accounts for both temperature correlation and route length. The routing scheme can then compare the metric for the route 1202 with the metric for the route 1302 to identify the best route.

As mentioned above, thermal-aware routing as taught herein may advantageously be used to match the signal propagation characteristics of related wires. Two of these examples will be described in conjunction with FIGS. 14 and 15.

Figure 14:
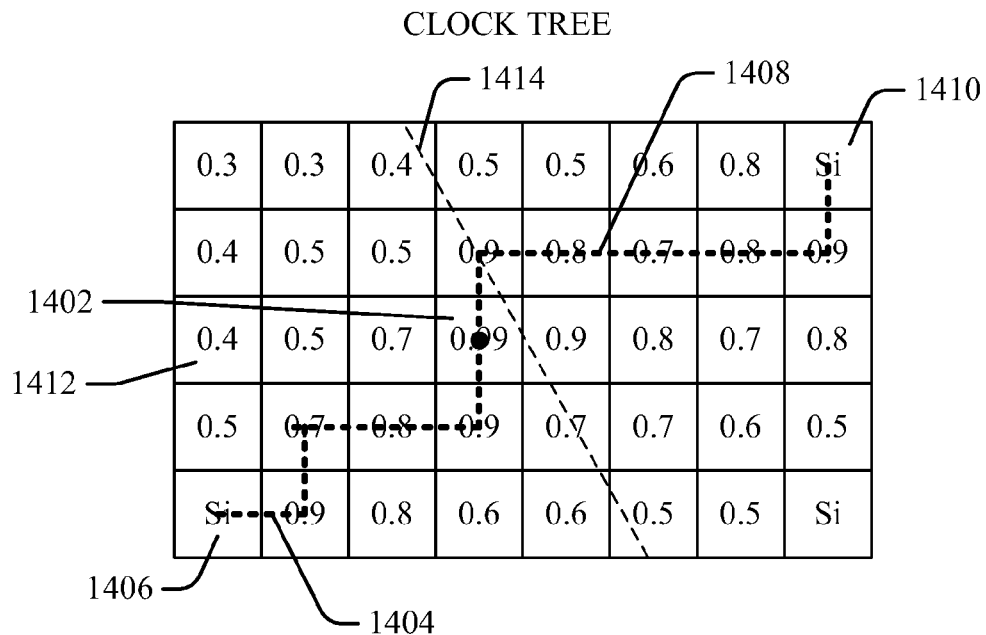
FIG. 14 is a diagram illustrating an example of a clock tree routed in accordance with some aspects of the disclosure.

FIG. 14 illustrates an example of a clock tree routed in a manner that places all of the branches of the clock tree on highly temperature correlated paths. A clock signal from a clock source (not shown) is coupled to a branch point 1402. A first branch 1404 of the clock tree is routed from the branch point 1402 to a first sink point 1406. A second branch 1408 of the clock tree is routed from the branch point 1402 to a second sink point 1410. As indicated, the respective routes for the first and second branches 1404 and 1408 are selected to have a high temperature correlation with the first and second sink points 1406 and 1410.

While the discussion herein has often referred to temperature correlation with respect to two target points, a path may be selected based on correlation with a different number of target points. For example, a clock tree may have more than two sink points (e.g., points 1406, 1410, and 1412 in FIG. 14).

In such a case, the techniques described herein may be employed to identify a route for multiple branches of the clock tree by identifying a multi-branch route that provides the best temperature correlation along the route with respect to three or more target points (e.g., sink points).

Figure 15:
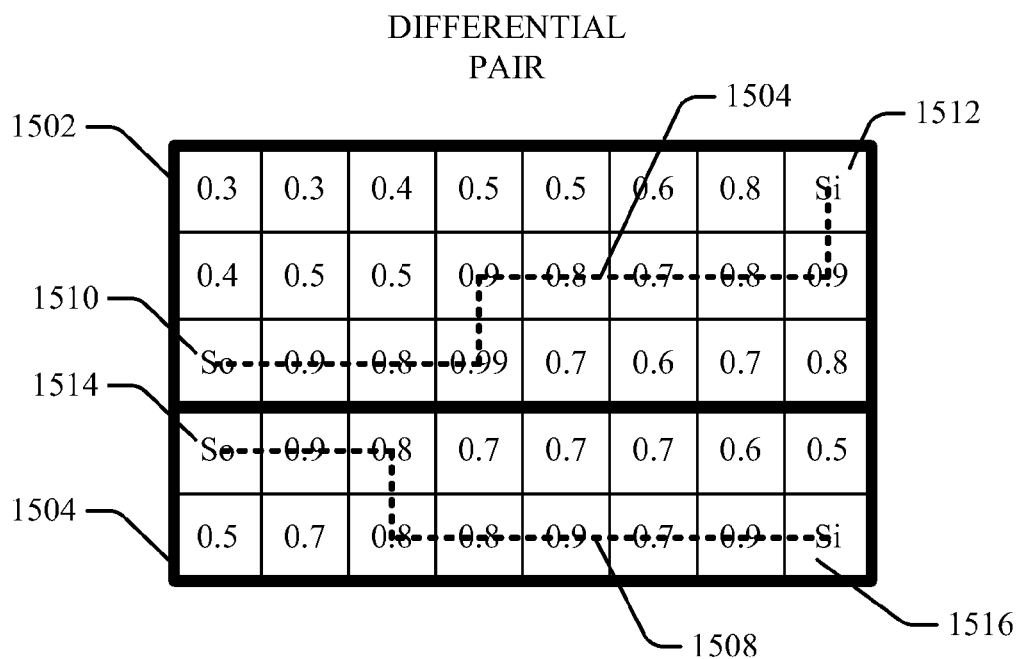
FIG. 15 is a diagram illustrating an example of a differential pair routed in accordance with some aspects of the disclosure.

FIG. 15 illustrates an example of a differential pair routed in a manner that places both rails of the differential pair on highly temperature correlated paths. In this example, a first grid 1502 (including the top three rows) is defined for routing a first rail 1504 of a differential pair, and a second grid 1506 (including the bottom two rows) is defined for routing a second rail 1508 of the differential pair.

The first rail 1504 is sourced at a first source point 1510 and sinked at a first sink point 1512. The second rail 1508 is sourced at a second source point 1514 and sinked at a second sink point 1516. As indicated, the respective routes for the first and second rails 1504 and 1508 are each selected to have a high temperature correlation with the corresponding sink and sources points.

Figure 16:
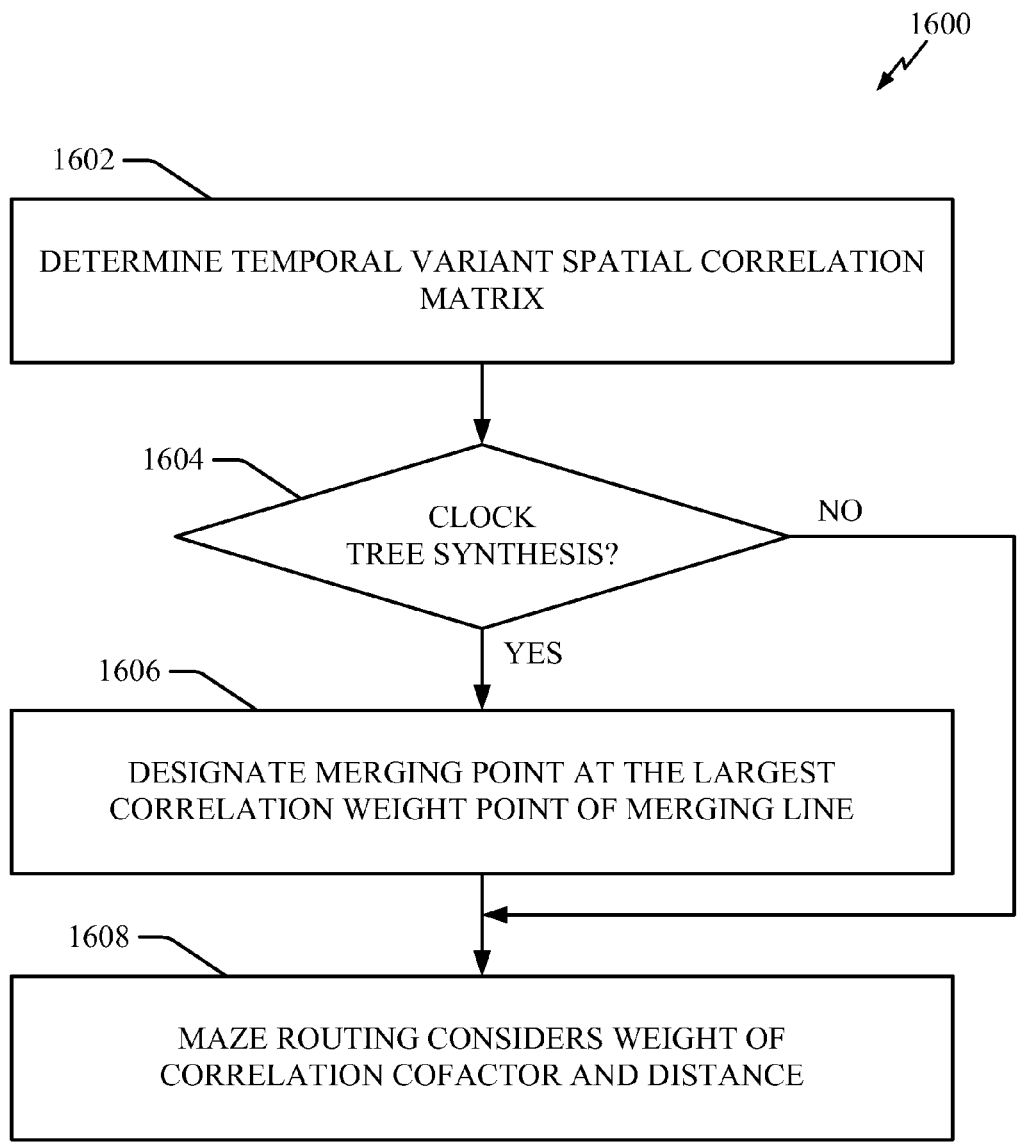
FIG. 16 is a flowchart illustrating an example of a maze routing method in accordance with some aspects of the disclosure.

FIG. 16 illustrates an example of a maze routing process 1600 that could be used to route the wires of FIGS. 14 and 15. The process 1600 may take place within a processing circuit 1810 (FIG. 18), which may be located in a circuit design tool or some other suitable apparatus. In another aspect, the process 1600 may be implemented by the circuit design system 1700 illustrated in FIG. 17. Of course, in various aspects within the scope of the disclosure, the process 1600 may be implemented by any suitable apparatus capable of supporting wire routing operations.

At block 1602, a temporal variant spatial correlation matrix (map) is determined. For example, an apparatus may generate the matrix or receive the matrix from another apparatus.

At block 1604, a determination is made as to whether a clock tree is being synthesized. If not (e.g., detail routing is being performed instead of clock tree routing), the operational flow proceeds to block 1608.

If a clock tree is being synthesized, the operational flow proceeds to block 1606 where a merging point for the clock tree is designated. In particular, the merging point is placed at the point in a merging line that has the largest correlation weight and is not a hot spot. In some implementations, a merging line is identified by calculating the Manhattan distance between the target points. FIG. 14 illustrates an example of a merging line 1414 that is equidistant from the first and second sink points 1406 and 1410. The merging line 1414 intersects the prospective merging points in the grid. Thus, the operations of block 1606 may involve determining the correlation cofactor for each of the prospective merging points and selecting the merging point that has the highest correlation weight, provided that prospective merging point is not a hot spot.

At block 1608, maze routing is invoked to identify a route that has the highest correlation cofactor weight, where the route is constrained by the Manhattan distance.

Figure 17:
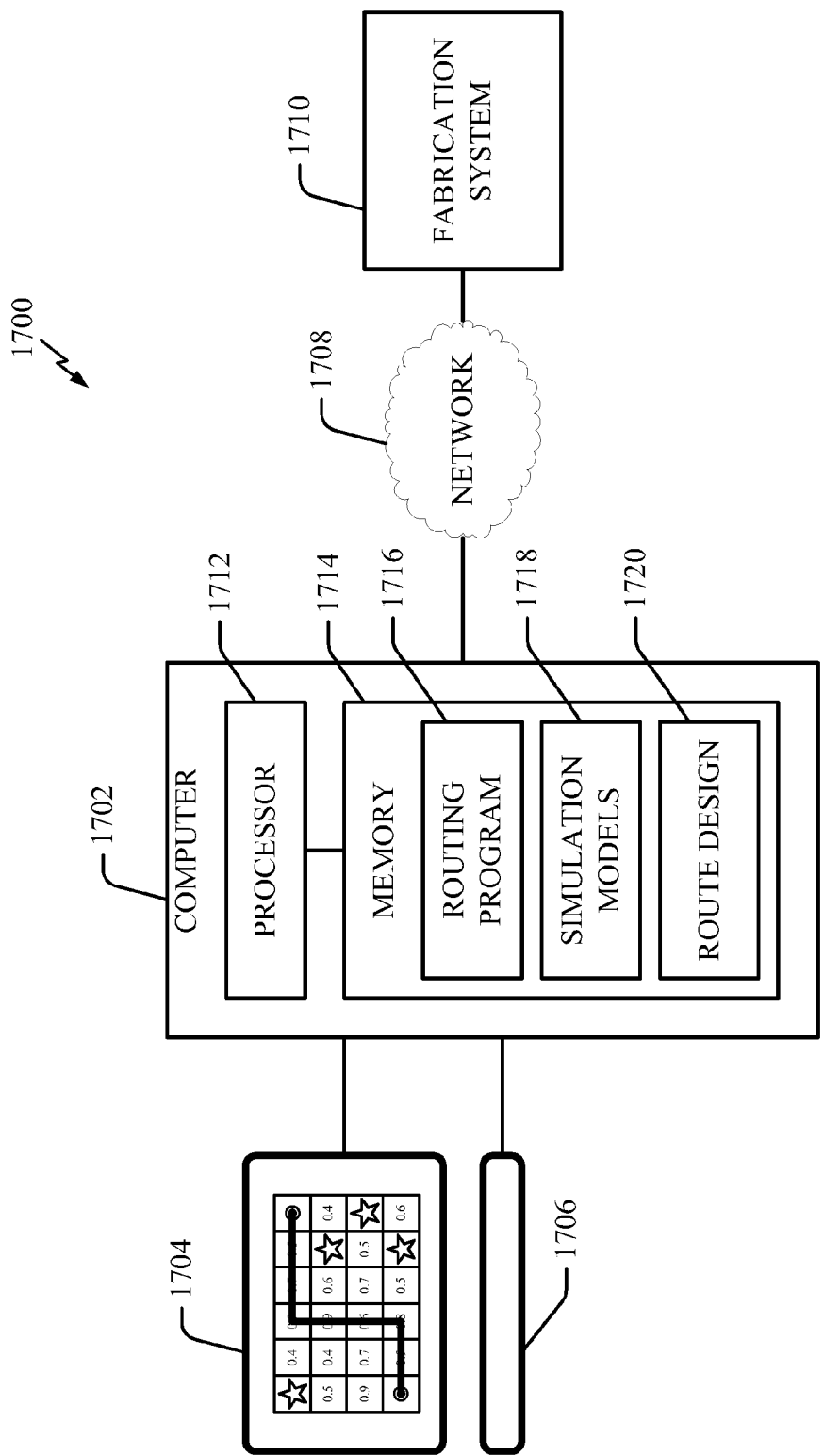
FIG. 17 is a block diagram illustrating an example of a circuit design system in which one or more aspects of the disclosure may find application.

FIG. 17 illustrates an example of a circuit design system 1700 in which one or more aspects of the disclosure may find application. The system 1700 includes a computer 1702 (e.g., a workstation) communicatively coupled to a user display device 1704 and user input devices 1706. The computer 1702 is also communicatively coupled to a network 1708 to enable design data generated by the computer 1702 to be transferred to a fabrication system 1710 that manufactures PCBs, ICs, or the like.

The computer 1702 includes a processor 1712 and a memory 1714. The processor 1712 may be any suitable type of processing unit, such as a central processing unit (CPU), a co-processor, an arithmetic processing unit, a graphics processing unit (GPU), a digital signal processor (DSP), etc. The memory 1714 may include any suitable type of memory technology such a RAM, ROM, FLASH, disk drives, and the like.

A routing program 1716 and simulation models 1718 stored in the memory 1714 and/or implemented by the processor 1712 enable a user to generate circuit designs in accordance with the teachings herein. For example, a user may use the display device 1704 and the user input devices to position circuits on at least one substrate (e.g., of an IC or a PCB), simulate temperature characteristics at various locations on the at least one substrate over time, generate a correlation matrix, generate a cofactor matrix, and select a route that has the best temperature correlation as taught herein. The user may then send a resulting route design 1720 to the fabrication system 1710 to produce the desired circuit component.

Figure 18:
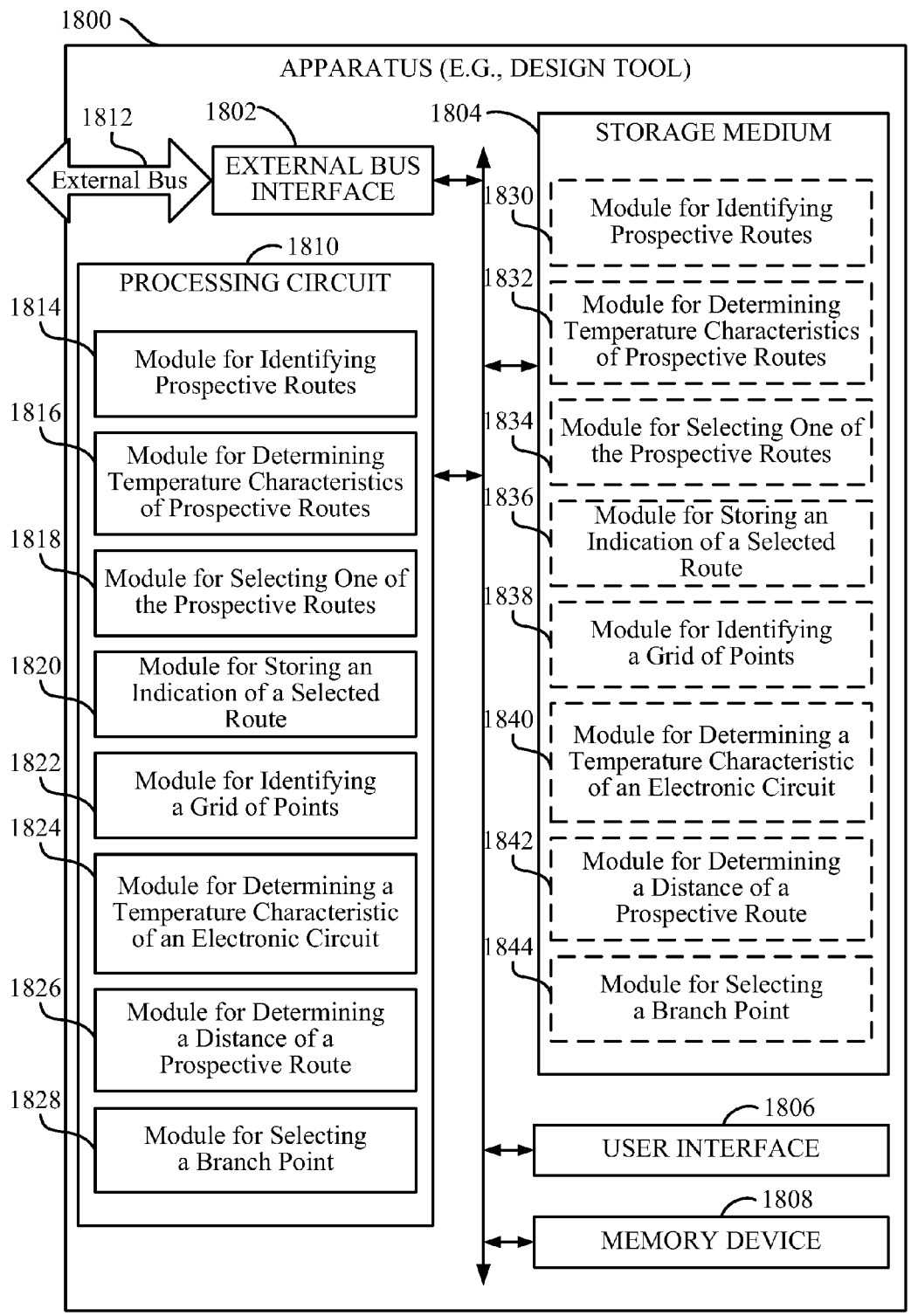
FIG. 18 is a block diagram illustrating select components of an apparatus configured to provide routing functionality in accordance with some aspects of the disclosure.

Turning now to FIG. 18, a block diagram is shown illustrating select components of an apparatus 1800, such as the computer 1702 of FIG. 17, according to at least one example of the disclosure. The apparatus 1800 (e.g., a design tool) includes an external bus interface 1802, a storage medium 1804, a user interface 1806, a memory device 1808, and a processing circuit 1810. The processing circuit is coupled to or placed in electrical communication with each of the external bus interface 1802, the storage medium 1804, the user interface 1806, and the memory device 1808.

The external bus interface 1802 provides an interface for the components of the apparatus 1800 to an external bus 1812. The external bus interface 1802 may include, for example, one or more of: signal driver circuits, signal receiver circuits, amplifiers, signal filters, signal buffers, or other circuitry used to interface with a signaling bus or other types of signaling media.

The processing circuit 1810 is arranged to obtain, process and/or send data, control data access and storage, issue commands, and control other desired operations. The processing circuit 1810 may include circuitry adapted to implement desired programming provided by appropriate media in at least one example. In some instances, the processing circuit 1810 may include circuitry adapted to perform a desired function, with or without implementing programming. By way of example, the processing circuit 1810 may be implemented as one or more processors, one or more controllers, and/or other structure configured to execute executable programming and/or perform a desired function. Examples of the processing circuit 1810 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1810 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1810 are for illustration and other suitable configurations within the scope of the disclosure are also contemplated.

The processing circuit 1810 is adapted for processing, including the execution of programming, which may be stored on the storage medium 1804. As used herein, the terms "programming" or "instructions" shall be construed broadly to include without limitation instruction sets, instructions, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 1810 may include one or more of: a module for identifying prospective routes 1814, a module for determining temperature characteristics of prospective routes 1816, a module for selecting one of the prospective routes 1818, a module for storing an indication of a selected route 1820, a module for identifying a grid of points 1822, a module for determining a temperature characteristic of an electronic circuit 1824, a module for determining a distance of a prospective route 1826, or a module for selecting a branch point 1828.

The module for identifying prospective routes 1814 may include circuitry and/or programming (e.g., a module for identifying prospective routes 1830 stored on the storage medium 1804) adapted to collect information about two or more target points within a routing area, calculate different routes that may be traversed within the routing area between the target points, and generate an indication of the prospective routes.

The module for determining temperature characteristics of prospective routes 1816 may include circuitry and/or programming (e.g., a module for determining temperature characteristics of prospective routes 1832 stored on the storage medium 1804) adapted to acquire information about prospective routes, calculate temperature characteristics of various points along each prospective route, and generate an indication of the temperature characteristics.

The module for selecting one of the prospective routes 1818 may include circuitry and/or programming (e.g., a module for selecting one of the prospective routes 1834 stored on the storage medium 1804) adapted to acquire information about temperature characteristics of prospective routes, identify a best temperature characteristic from among the different temperature characteristics, and generate information about the route associated with the best temperature characteristic.

The module for storing an indication of a selected route 1820 may include circuitry and/or programming (e.g., a module for storing an indication of a selected route 1836 stored on the storage medium 1804) adapted to acquire information about a selected route, generate an indication that is indicative of the selected route, generate a signal comprising the indication, and sending the signal to a memory device.

The module for identifying a grid of points 1822 may include circuitry and/or programming (e.g., a module for identifying a grid of points 1838 stored on the storage medium 1804) adapted to acquire information about a routing area for one or more circuits, define a grid of points within that area, and generate an indication of the defined grid of points.

The module for determining a temperature characteristic of an electronic circuit 1824 may include circuitry and/or programming (e.g., a module for determining a temperature characteristic of an electronic circuit 1840 stored on the storage medium 1804) adapted to acquire information about electronic circuits, determine a temperature characteristic of the electronic circuits under one or more operating conditions, and generate an indication of the temperature characteristic.

The module for determining a distance of a prospective route 1826 may include circuitry and/or programming (e.g., a module for determining a distance of a prospective route 1842 stored on the storage medium 1804) adapted to acquire information about a prospective route, calculate a distance of the prospective route, and generate an indication of the distance of the prospective route.

The module for selecting a branch point 1828 may include circuitry and/or programming (e.g., a module for selecting a branch point 1844 stored on the storage medium 1804) adapted to acquire information about a target points, identify prospective branch points between the target points, select one of the prospective branch points, and generate an indication that identifies the selected branch point.

The storage medium 1804 may represent one or more processor-readable devices for storing programming, electronic data, databases, or other digital information. The storage medium 1804 may also be used for storing data that is manipulated by the processing circuit 1810 when executing programming. The storage medium 1804 may be any available media that can be accessed by the processing circuit 1810, including portable or fixed storage devices, optical storage devices, and various other mediums capable of storing, containing and/or carrying programming. By way of example and not limitation, the storage medium 1804 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof. Thus, in some implementations, the storage medium may be a non-transitory (e.g., tangible) storage medium.

The storage medium 1804 may be coupled to the processing circuit 1810 such that the processing circuit 1810 can read information from, and write information to, the storage medium 1804. That is, the storage medium 1804 can be coupled to the processing circuit 1810 so that the storage medium 1804 is at least accessible by the processing circuit 1810, including examples where the storage medium 1804 is integral to the processing circuit 1810 and/or examples where the storage medium 1804 is separate from the processing circuit 1810.

Programming stored by the storage medium 1804, when executed by the processing circuit 1810, causes the processing circuit 1810 to perform one or more of the various functions and/or process steps described herein. For example, the storage medium 1804 may include one or more of: the module for identifying prospective routes 1830, the module for determining temperature characteristics of prospective routes 1832, the module for selecting one of the prospective routes 1834, the module for storing an indication of a selected route 1836, the module for identifying a grid of points 1838, the module for determining a temperature characteristic of an electronic circuit 1840, the module for determining a distance of a prospective route 1842, or the module for selecting a branch point 1844. Thus, according to one or more aspects of the disclosure, the processing circuit 1810 is adapted to perform (in conjunction with the storage medium 1804) any or all of the processes, functions, steps and/or routines for any or all of the apparatuses described herein. As used herein, the term "adapted" in relation to the processing circuit 1810 may refer to the processing circuit 1810 being one or more of configured, employed, implemented, and/or programmed (in conjunction with the storage medium 1804) to perform a particular process, function, step and/or routine according to various features described herein.

The memory device 1808 may represent one or more memory devices and may comprise any of the memory technologies listed above or any other suitable memory technology. The memory device 1808 may store circuit design information such as, without limitation, an indication of a selected route, along with other information used by one or more of the components of the apparatus 1800. The memory device 1808 also may be used for storing data that is manipulated by the processing circuit 1810 or some other component of the apparatus 1800. In some implementations, the memory device 1808 and the storage medium 1804 are implemented as a common memory component.

The user interface 1806 includes functionality that enables a user to interact with the apparatus 1800. For example, the user interface 1806 may interface with one or more user output devices (e.g., a display device, etc.) and one or more user input devices (e.g., a keyboard, a tactile input device, etc.).

Figure 19:
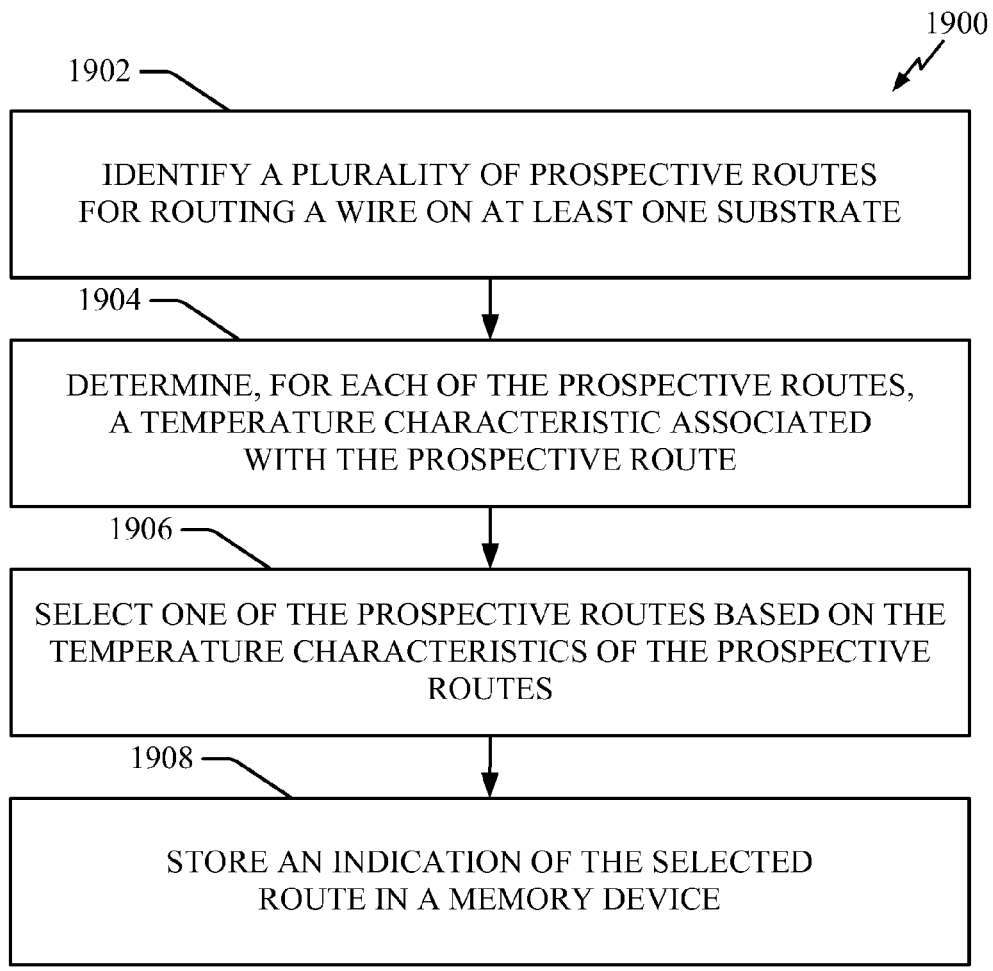
FIG. 19 is a flowchart illustrating a wire routing method in accordance with some aspects of the disclosure.

FIG. 19 illustrates a process 1900 for wire routing in accordance with some aspects of the disclosure. The process 1900 may take place within a processing circuit 1810 (FIG. 18), which may be located in a circuit design tool or some other suitable apparatus. In another aspect, the process 1900 may be implemented by the circuit design system 1700 illustrated in FIG. 17. Of course, in various aspects within the scope of the disclosure, the process 1900 may be implemented by any suitable apparatus capable of supporting wire routing operations.

At block 1902, prospective routes for routing a wire on at least one substrate are identified. For example, different routes for a wire between a first endpoint and a second endpoint may be identified within a grid of points defined on the at least one substrate. The at least one substrate may comprise a printed circuit board substrate, an integrated circuit die substrate, or some other type of substrate.

At block 1904, for each of the prospective routes identified at block 1902, a temperature characteristic associated with the prospective route is determined. For example, the operations of block 1904 may involve determining, for each point of a set of points along a corresponding prospective route, a temperature correlation between the point and first and second endpoints associated with the routing of the wire.

In some aspects, the determination of the temperature characteristics associated with the prospective routes may involve: determining, for each of the points of a grid of points, a temperature characteristic of the point; generating a spatial correlation matrix corresponding to the grid of points based on the temperature characteristics of the points; generating a correlation cofactor matrix based on the spatial correlation matrix, wherein the correlation cofactor matrix correlates, for each of the points of the grid of points, the temperature characteristic of the point with the temperature characteristics of first and second endpoints associated with the routing of the wire; and determining, for each prospective route, a temperature correlation between the prospective route and the first and second endpoints based on the correlation cofactor matrix.

At block 1906, one of the prospective routes is selected based on the temperature characteristics determined at block 1904. In some aspects, the selection of the route comprises determining which prospective route has a highest temperature correlation with first and second endpoints associated with the routing of the wire. In some aspects, the selection of the route comprises determining which set of points of a plurality of different sets of points associated with the different prospective routes has a highest collective temperature correlation with first and second endpoints associated with the routing of the wire. In some aspects, the selection of the route comprises rejecting any of the prospective routes that pass through an area of the at least one substrate associated with a temperature that exceeds a threshold temperature. In some aspects, the selection of the route comprises rejecting any of the prospective routes that pass through an area of the at least one substrate associated with a temperature that falls below a threshold temperature.

At block 1908, an indication of the selected route is stored in a memory device. For example, the indication may be stored along with other routing data and other circuit data associated with a circuit design.

Figure 20:
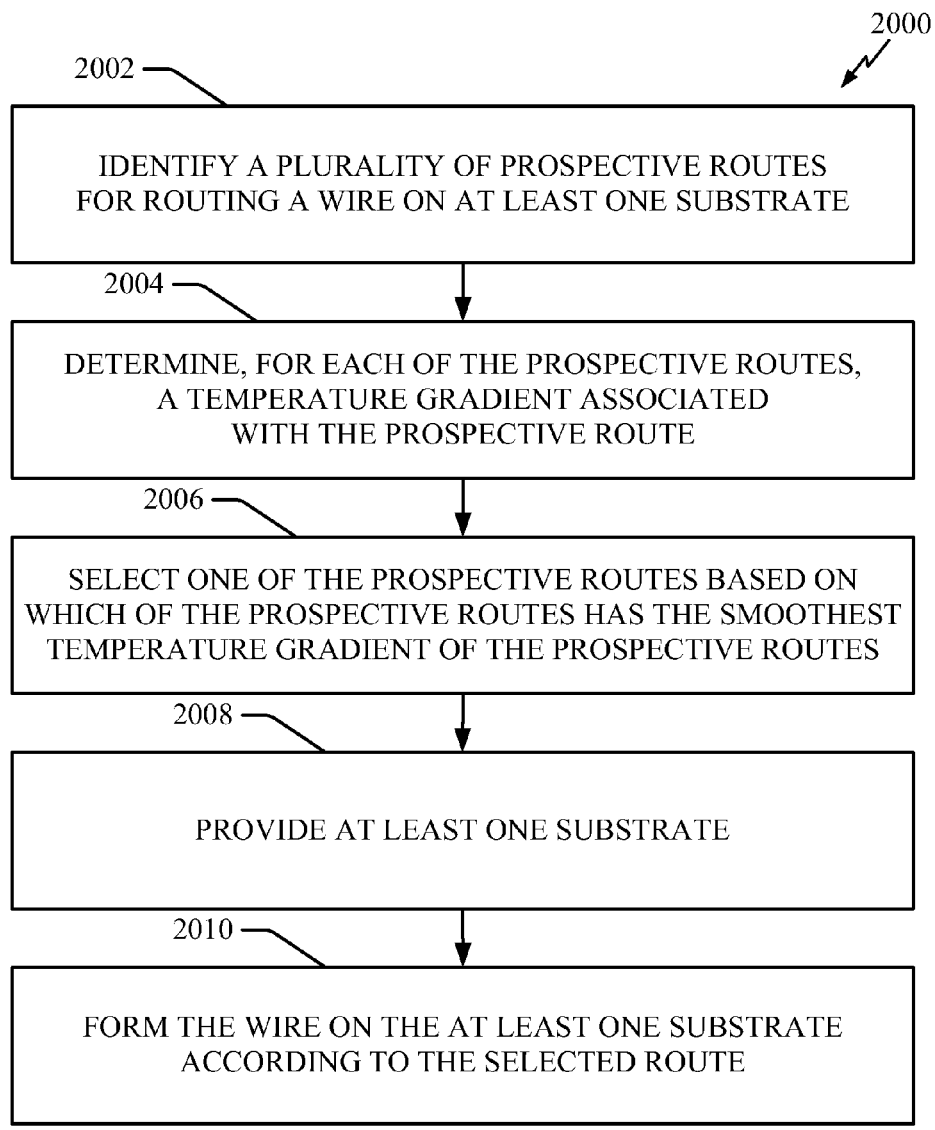
FIG. 20 is a flowchart illustrating a process for preparing a substrate having a wire formed thereon in accordance with some aspects of the disclosure.

FIG. 20 illustrates a process 2000 for preparing at least one substrate having a wire formed thereon along a selected route associated with a smoothest temperature gradient from among a plurality of prospective routes. One or more operations of the process 2000 may take place within a processing circuit 1810 (FIG. 18), which may be located in a circuit design tool or some other suitable apparatus. In another aspect, one or more operations of the process 2000 may be implemented by the circuit design system 1700 illustrated in FIG. 17. Of course, in various aspects within the scope of the disclosure, the process 2000 may be implemented by any suitable apparatus capable of supporting wire routing operations.

At block 2002, the prospective routes for routing the wire on the at least one substrate are identified. In some aspects, the operations of block 2002 may correspond to the operations of block 1902. Also as discussed above, the at least one substrate may comprise a printed circuit board substrate, an integrated circuit die substrate, or some other type of substrate.

At block 2004, for each of the prospective routes identified at block 2002, a temperature gradient associated with the prospective route is determined. In some aspects, the determination of the temperature gradients may comprise determining, for each point of a set of points along a corresponding prospective route, a temperature correlation between the point and first and second endpoints associated with the routing of the wire.

In some aspects, the determination of the temperature gradients may involve: determining, for each of the points of a grid of points, a temperature characteristic of the point; generating a spatial correlation matrix corresponding to the grid of points based on the temperature characteristics of the points; generating a correlation cofactor matrix based on the spatial correlation matrix, wherein the correlation cofactor matrix correlates, for each of the points of the grid of points, the temperature characteristic of the point with the temperature characteristics of first and second endpoints associated with the routing of the wire; and determining, for each prospective route, a temperature correlation between the prospective route and the first and second endpoints based on the correlation cofactor matrix.

At block 2006, one of the prospective routes is selected based on which of the prospective routes has the smoothest temperature gradient of the prospective routes. In some aspects, the selection of one of the prospective routes may comprise determining which prospective route has a highest temperature correlation with first and second endpoints associated with the routing of the wire. In some aspects, the selection of one of the prospective routes may comprise determining which set of points has a highest collective temperature correlation with first and second endpoints associated with the routing of the wire. In some aspects, the selection of one of the prospective routes may comprise rejecting any of the prospective routes that pass through an area of the at least one substrate associated with a temperature that exceeds a threshold temperature. In some aspects, the selection of one of the prospective routes may comprise rejecting any of the prospective routes that pass through an area of the at least one substrate associated with a temperature that falls below a threshold temperature.

In some aspects, the smoothest temperature gradient may correspond to a highest correlation in temperature with the first and second endpoints along the selected route. In some aspects, the smoothest temperature gradient may correspond to a highest consistency of a temperature characteristic along the selected route.

At block 2008, an appropriate manufacturing operation provides (e.g., forms or acquires) the at least one substrate. For example, a fabrication system may form at least one substrate for an integrated circuit die or form at least one substrate for a printed circuit board.

At block 2010, an appropriate manufacturing operation forms the wire on the at least one substrate according to the selected route. For example, based on circuit design data that indicates the path of the selected route, a fabrication system may form the wire on at least one substrate for an integrated circuit die or on at least one substrate for a printed circuit board.

In some aspects, the selected route does not traverse any area of the at least one substrate associated with a temperature that exceeds a threshold temperature. In some aspects, the selected route does not traverse any area of the at least one substrate associated with a temperature that falls below a threshold temperature.

In some aspects, the selected route may comprise a first endpoint, a second endpoint, and a branch point, whereby the branch point is associated with a highest temperature correlation with the first and second endpoints from among a plurality of prospective branch points located between the first and second endpoints.

In some aspects, the at least one substrate may define a plurality of routing layers (e.g., stacked substrates). In this case, the smoothest temperature gradient may be associated with one of the prospective routes that traverses at least two of the plurality of routing layers. Also, the smoothest temperature gradient may be associated with one of the prospective routes that traverses a via between at least two the plurality of routing layers. Furthermore, the smoothest temperature gradient may be associated with one of the prospective routes that reverses course.

Figure 21:
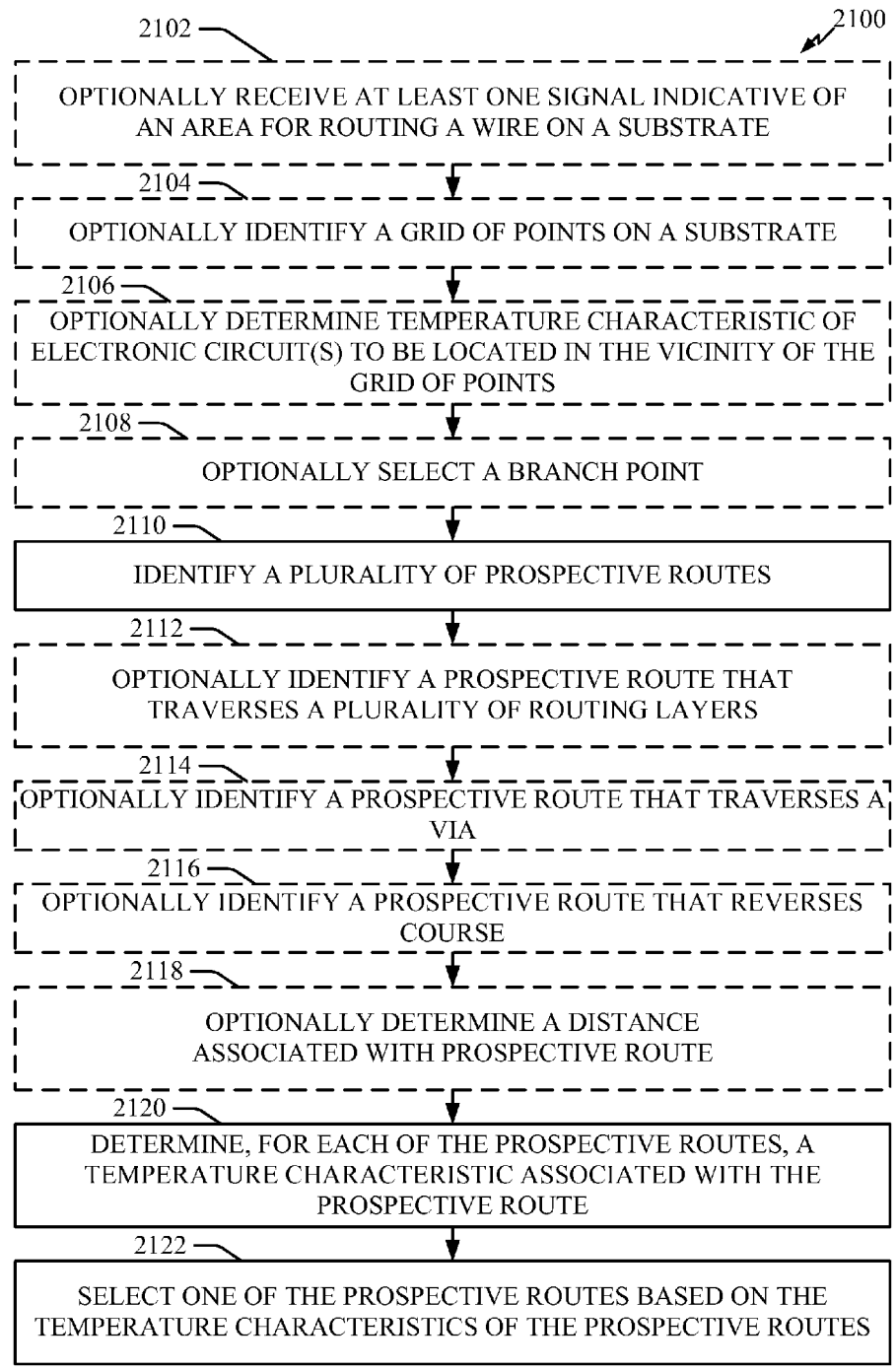
FIG. 21 is a flowchart illustrating additional aspects of a wire routing method in accordance with some aspects of the disclosure.

FIG. 21 illustrates a process 2100 that includes additional aspects of a wire routing method in accordance with some aspects of the disclosure. The process 2100 may take place within a processing circuit 1810 (FIG. 18), which may be located in a circuit design tool or some other suitable apparatus. In another aspect, the process 2100 may be implemented by the circuit design system 1700 illustrated in FIG. 17. Of course, in various aspects within the scope of the disclosure, the process 2100 may be implemented by any suitable apparatus capable of supporting wire routing operations.

At optional block 2102, at least one signal indicative of an area for routing a wire on a substrate (e.g., a single layer substrate or a multi-layer substrate) may be received. For example, a receiver of an apparatus (e.g., a receiver circuit in a bus interface or a processing circuit) may receive a signal (e.g., that comprises a message) from another apparatus (e.g., a memory device or a transmitter circuit) that includes information that indicates the area for routing the wire.

At optional block 2104, a grid of points may be identified on a substrate. For example, the grid may be defined within a specified routing area.

At optional block 2106, at least one temperature characteristic of at least one electronic circuit to be located in a vicinity of the grid of points may be determined. For example, a simulation may be conducted or measurements made to determine the temperatures that are to be expected in the vicinity of the electronic circuit(s) during operation of the electronic circuit(s). In this case, a determination of the temperature characteristics of the points (e.g., at block 2120) may be based on the at least one temperature characteristic of the at least one electronic circuit.

At optional block 2108, a branch point may be selected. For example, in the event a clock tree is being routed, a branch point of a plurality of prospective branch points between first and second endpoints may be selected based on which prospective branch point has a highest temperature correlation with the first and second endpoints.

At block 2110, the prospective routes are identified. In some aspects, the operations of block 2110 may correspond to the operations of block 1902 discussed above.

At optional block 2112, at least one prospective route that traverses at least two of a plurality of routing layers may be identified. In this case, selection of the route (e.g., at block 2122) may involve applying a weighting factor to each prospective route that traverses at least two of the plurality of routing layers.

At optional block 2114, at least one prospective route that traverses a via between at least two of a plurality of routing layers may be identified. In this case, selection of the route may involve applying a weighting factor to each prospective route that traverses a via between at least two of the plurality of routing layers.

At optional block 2116, at least one prospective route that reverses course may be identified. In this case, selection of the route may involve applying a weighting factor to each prospective route that reverses course.

At optional block 2118, for each of the prospective routes, a distance associated with the prospective route may be identified. In this case, selection of the route may be based on the distances associated with the prospective routes.

At block 2120, for each of the identified prospective routes, a temperature characteristic associated with the prospective route is determined. In some aspects, the operations of block 2120 may correspond to the operations of block 1904 discussed above.

At block 2122, one of the prospective routes is selected based on the temperature characteristics determined at block 2120. In some aspects, the operations of block 2122 may correspond to the operations of block 1906 discussed above.

In view of the above, a routing scheme practiced in accordance with the teaching herein may advantageously provide more effective routing as compared to conventional routing schemes. For example, U.S. Pat. Nos. 7,155,686 and 8,209,651 are directed to a significantly different scheme whereby a wire is moved if the wire generates too much heat. Also, while U.S. Pat. Nos. 6,775,710 and 7,725,861 use the terms "temperature" and "hot spots" in the context of routing, these patents do not perform any routing based on actual temperature.

Additional Exemplary Features Applicable to 2-D Wiring Implementations

Figure 22:
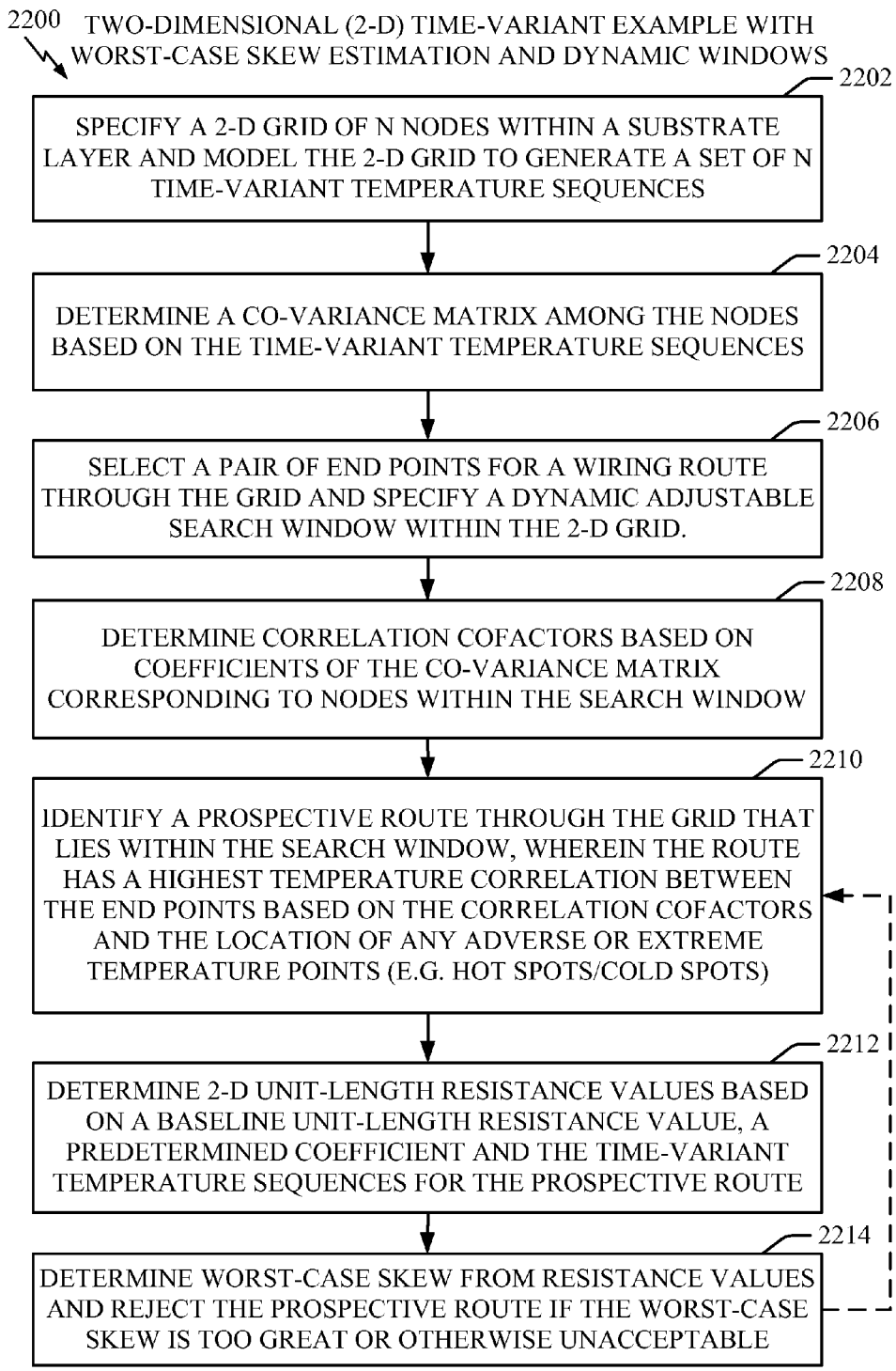
FIG. 22 is a flowchart illustrating a wire routing method directed to 2-D time-variant routing with dynamically adjustable search windows and worst-case skew estimation.
Figure 23:
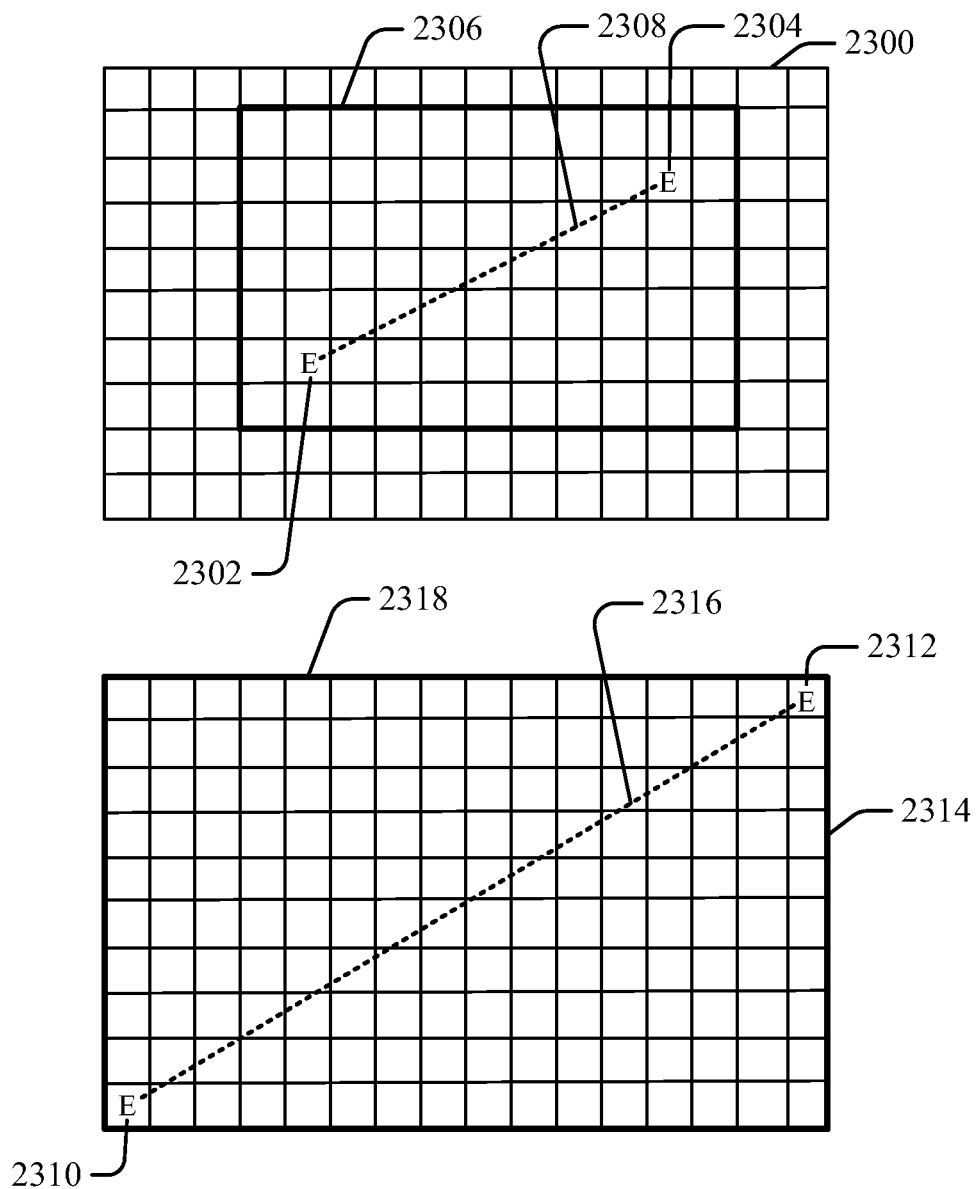
FIG. 23 is a diagram illustrating a dynamically adjustable search window for use with 2-D time-variant routing.
Figure 24:
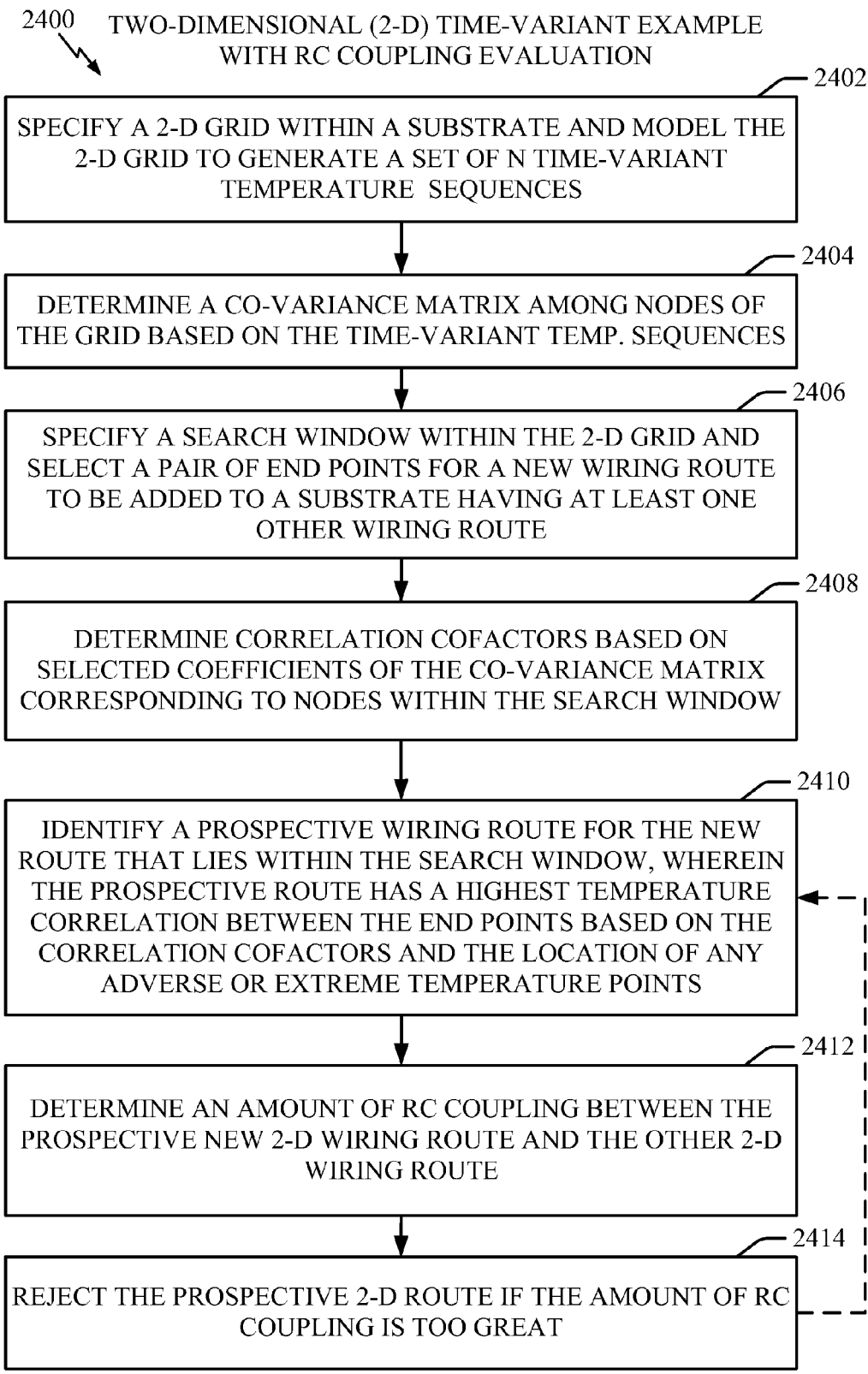
FIG. 24 is a flowchart illustrating a wire routing method directed to 2-D time-variant routing employing with resistance-capacitance (RC) coupling evaluation.

Referring to FIGS. 22-24, additional or alternative features will now be described that are applicable to 2-D wiring implementations. At least some of these features exploit or incorporate procedures described above. For brevity, these procedures will not be described in detail again, other than to highlight any differences.

FIG. 22 illustrates an exemplary 2-D routing procedure 2200 that may be performed by a suitably-equipped routing system wherein the routing takes into account a worst-case skew estimation and exploits dynamic search windows. In this example, other factors may also be taken into account such as the location of any extreme or otherwise adverse temperature locations (e.g. hot spots or cold spots). At 2202, the routing system specifies a 2-D grid of N nodes within a substrate layer and models the 2-D grid to generate a set of N time-variant temperature sequences. Procedures described above may be used to generate the grid of nodes and to generate the time-variant temperature sequences. See, for example, Equation 1, shown and described above. At 2204, the routing system determines a co-variance matrix among the nodes based on the time-variant temperature sequences. See, for example, Equations 2-5, shown and described above. At 2206, the routing system specifies a dynamic adjustable search window within the 2-D grid and selects a pair of end points for a wiring route through the grid.

Exemplary dynamic search windows are shown in FIG. 23. A first 2-D grid 2300 has designated end points 2302 and 2304. A dynamic search window 2306 is set based on the respective locations of the end points and the absolute distance 2308 therebetween. In this example, the search window 2306 is set to be smaller than the overall grid so as to reduce the amount of computation required to generate correlation co-factors. In some examples, the routing system calculates the absolute distance between the end points first and then uses that distance to help determine the preferred area of the dynamic window 2306. The vertical and horizontal boundaries of the window 2306 are then set based on the locations of the end points so as to encompass those points and provide additional horizontal and vertical space for routing if available (to accommodate any reverse direction backtracking as might be needed to avoid hot spots or the like.) FIG. 23 also provides an example where end points, 2310 and 2312, are located at the boundary of a 2-D grid 2314. As such, the absolute distance 2316 between the end points is at its maximum given the size of the grid and so the resulting dynamic window 2318 encompasses the entire grid, as shown. Although the examples of FIG. 23 illustrate rectangular windows, it should be understood that other window shapes may be employed, such as windows with truncated corners, so as to further reduce the area of the window and hence also reduce the computational burden.

Returning to FIG. 22, once the search window is specified, the routing system determines correlation cofactors at 2208 based on coefficients of the co-variance matrix corresponding to nodes within the search window. As explained above, a correlation cofactor in area P (CCp) to a target i, j may be defined based on the two corresponding coefficients. In an example where the correlation cofactor is based on the product of the coefficients, CCp=cov(i,p)*cov(p,j). At 2210, the routing system identifies or selects a prospective route through the grid that lies within the search window wherein the route has a highest temperature correlation between the end points based on the correlation cofactors and the location of any adverse temperature points (e.g. hot spots/cold spots). See the descriptions of FIG. 5 and following, above, for exemplary procedures for identifying one or more prospective routes within a 2-D grid while taking into account hot spots, etc.

At 2212, the routing system determines 2-D unit-length resistance values based on a baseline unit-length resistance value, a predetermined coefficient and the time-variant temperature sequences for the prospective route. In this regard, for a 2-D example, unit-length resistance may be represented as a function of temperature gradient as follows:

$$r_{unit}(x,y,t) = \rho_0 \cdot (1 + \beta \cdot T(x,y,t)) \qquad (6)$$

where $\rho_0$ is the unit-length resistance at 0° C., x, y are the 2-D coordinates and $\beta$ is a predetermined temperature coefficient of resistance (1/° C.). The two coefficients $\rho_0$ and $\beta$ may be measured or obtained using otherwise conventional techniques. When the embedding path $d(M^{ti}, S_k)$ is fixed, the resistance may be calculated by:

$$R(M^{ti}, S_k) = \Sigma_{\forall e \in d(M^{ti}, S_k)} E[r_{unit}(e)] \cdot len(e) \qquad (7)$$

where $E[r_{unit}(x,y)]$ is the mean value of resistance in an edge $e(M^{ti}, S_k)$ and d is the applicable distance.

At 2214, the routing system determines worst-case skew from the resistance values and rejects the prospective route if the worst-case skew is too great or is otherwise unacceptable. For example, the worst-case skew may be compared against a predetermined threshold representative of a skew that is too great for the particular circuit application. In this regard, the delay from the source node s0 to sink si, D(s0_si) may be defined as the time required for the node voltage (waveform) to pass 100% of the peak voltage under the impulse excitation in the source node. After obtaining the source to sink delay of a j-th routing configuration $Conf_{ij}$ for a given i, the worst-case skew corresponding to $Conf_{ij}$ can be calculated or estimated as follows:

$$Skew_i = \max_{\forall \text{ sink } s_k} D_{(s0 \to sk)} - \min_{\forall \text{ sink } s_k} D_{(s0 \to sk)} \qquad (8)$$

As noted, the worst-case skew for a prospective route may be compared against a threshold and rejected if too great. If the route is rejected, processing may return to block 2210 (as shown by the dashed line of the figure) to identify an alternative route that avoids skew problems. Alternatively, worst-case skew may be assessed and accounted for during the procedures of block 2210 while the system is mapping out possible routes so that the prospective route that is identified is already assured to have an acceptable worst-case skew. Thus, FIGS. 22 and 23 illustrate an example where both adjustable windows and worst-case skew determinations are exploited. In other examples, only one or the other or neither of these features is exploited.

FIG. 24 illustrates an exemplary routing procedure 2400 that may be performed by a suitably-equipped routing system wherein the routing takes into account RC coupling. As with the previous example, other factors may also be taken into account such as the location of extreme temperature locations. At 2402, the routing system specifies a 2-D grid of N nodes within a substrate layer and models the 2-D grid to generate a set of N time-variant temperature sequences. At 2404, the routing system determines a co-variance matrix among the nodes based on the time-variant temperature sequences. At 2406, the routing system specifies a search window within the 2-D grid (which might be dynamic) and selects a pair of end points for a new wiring route through the grid to be added to a substrate having at least one other wiring route. At 2408, the routing system determines correlation cofactors based on coefficients of the co-variance matrix corresponding to nodes within the search window. At 2410, the routing system identifies or selects a prospective route for the new line through the grid that lies within the search window, wherein the route has a highest temperature correlation between the end points based on the correlation cofactors and the location of any extreme temperature points, etc. At 2412, the routing device determines an amount of RC coupling between the prospective new 2-D route and the other 2-D wiring route.

Figure 25:
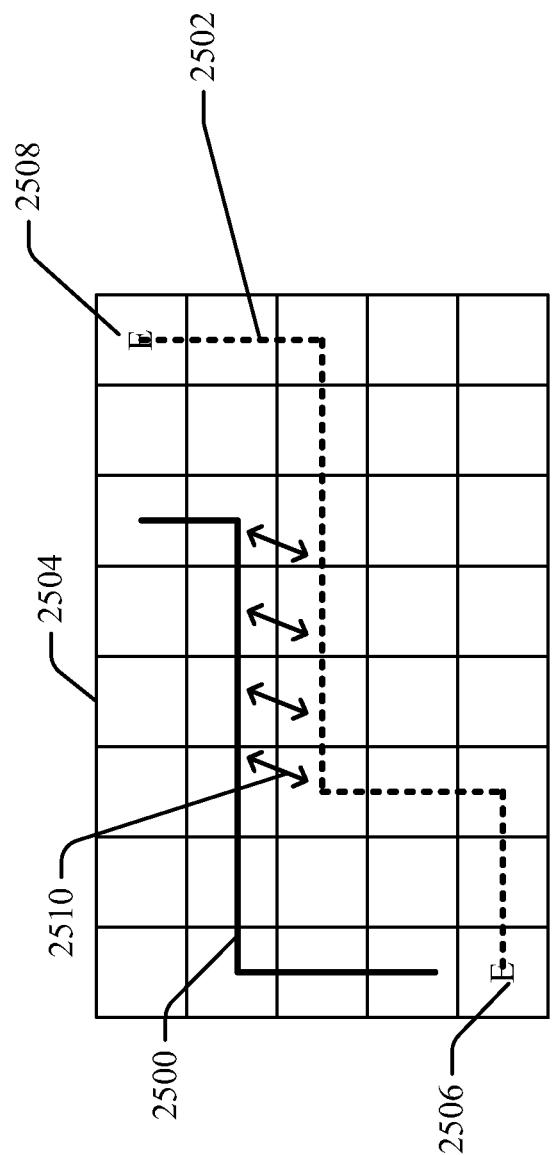
FIG. 25 is a diagram illustrating RC coupling considerations applicable to 2-D time-variant wire routing.

FIG. 25 illustrates exemplary RC coupling between a wiring route 2500 and a prospective new route 2502 within a 2-D grid 2504 wherein the new route 2502 is intended to connect an end point 2506 to an end point 2508. In this example, the prospective wiring route 2502 lies alongside the other wiring route 2500 for part of its length, triggering RC coupling, which is shown generally by way of arrows 2510.

Returning to FIG. 24, the routing device may determine the amount of RC coupling at 2414 between the prospective new route and the other line using otherwise conventional RC coupling assessment or estimation techniques, which may take into account the distance between the adjacent portions of the paths as well as the material of the layer. At 2414, the routing system rejects the prospective route if the amount of RC coupling is too great or is otherwise unacceptable. For example, the amount of expected RC coupling may be compared against a predetermined threshold representative of an amount of coupling that is too great for the particular circuit application (i.e. coupling that would unduly effect the propagation of signals along the new line, causing unacceptable skew or other undesirable effects.) If the prospective route is rejected, processing may then return to block 2410 (as shown by way of the dashed line) to identify an alternative prospective route that avoids RC coupling problems by, for example, following a route that does not lie adjacent the other wire. Alternatively, RC coupling may be assessed and accounted for during the procedures of block 2410 while the system is mapping possible routes so that the prospective route identified at block 2410 is already assured to have an acceptably low amount of coupling with other wires.

Some of the 2-D features just described are also generally applicable to multi-layer (i.e. 3-D) implementations. In the following section, examples of these and other features are described in connection with multi-layer 3-D examples.

Additional Exemplary Features Applicable to 3-D Implementations

Referring now to FIGS. 26-32, additional or alternative features will now be described that are applicable to 3-D implementations. At least some of these features exploit or incorporate procedures already described above. For brevity, these procedures will not be described in detail again, other than to highlight any differences.

Figure 26:
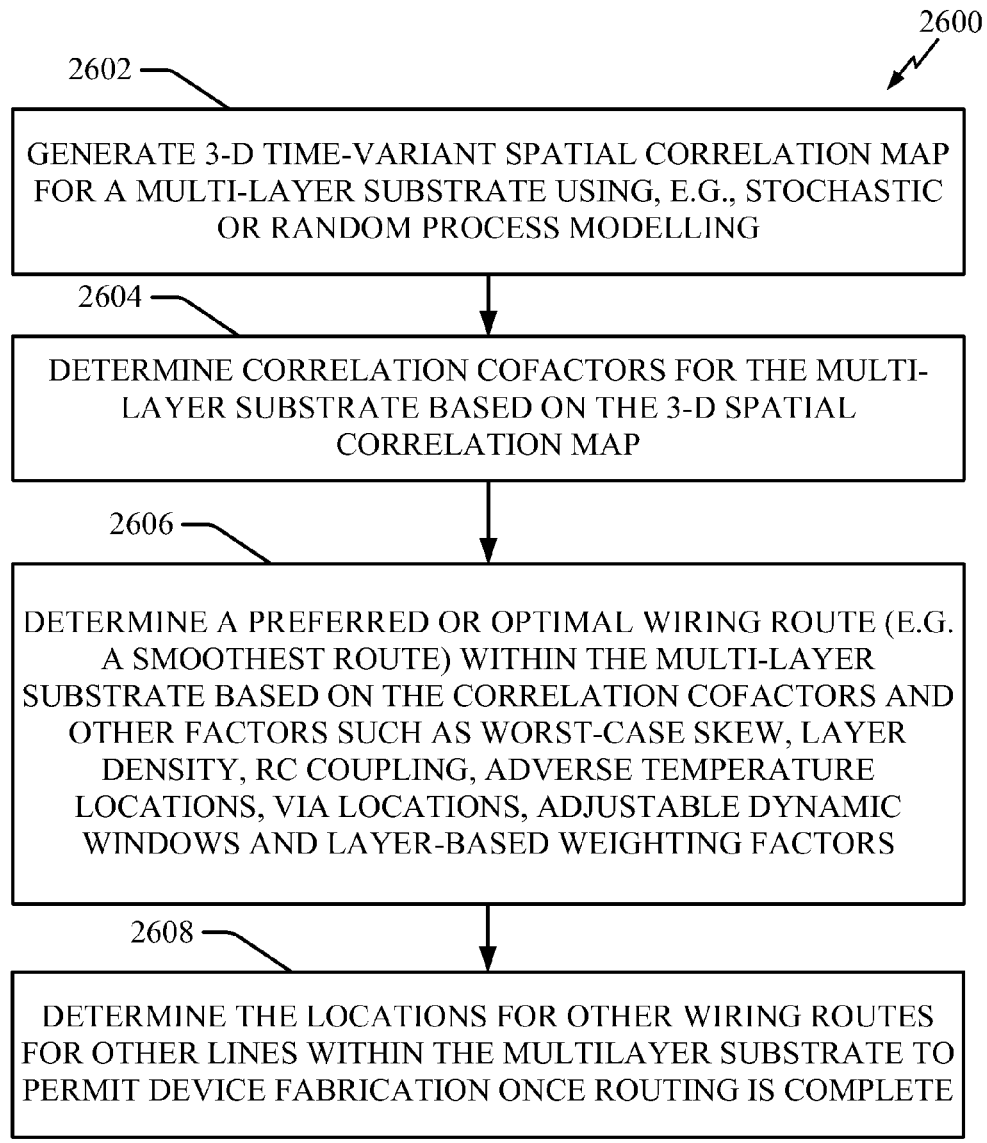
FIG. 26 is a flowchart summarizing a three-dimensional (3-D) wire routing method in accordance with some aspects of the disclosure.

FIG. 26 provides an overview of additional 3-D time-variant (or temporal-variant) routing features that may be performed by a suitably-equipped routing system. At 2602, the routing system generates a 3-D time-variant spatial correlation map for a multi-layer substrate using, e.g., stochastic or random process modelling as discussed above (where stochastic means randomly determined or having a random probability pattern that may be analyzed statistically but may not be predicted precisely.) At 2604, the routing system determines correlation cofactors for the multi-layer substrate based on the 3-D spatial correlation map. Examples are described below. At 2606, the routing system determines a preferred or optimal wiring route (e.g. a "smoothest" route) within the multi-layer substrate based on the correlation cofactors and other factors such as worst-case skew, layer density, RC coupling, adverse temperature locations (e.g. hot spot locations), via locations, adjustable dynamic windows and layer-based weighting factors. Illustrative examples of the use of some of these factors are provided below. At 2608, the routing system then determines other wiring routes for other paths within the multilayer substrate to permit device fabrication once routing is complete. In this regard, a typical IC may have hundreds or thousands of wiring paths, each of which might be routed by taking into account the various factors of block 2606.

Figure 27:
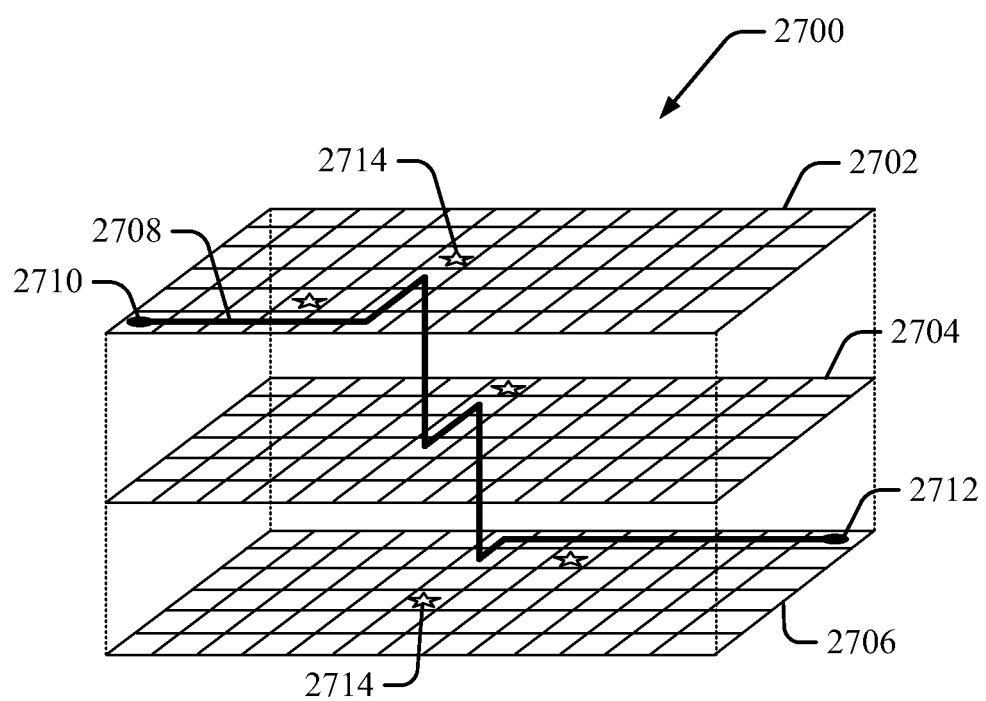
FIG. 27 is a diagram illustrating a prospective 3-D wiring route within a 3-D grid within a multilayer substrate.

FIG. 27 illustrates an exemplary 3-D multi-layer stacked substrate 2700 having, in this example, three layers 2702, 2704 and 2706. A 3-D wiring path 2708 is connected between a pair of end points 2710 and 2712 on different layers. As shown, the wiring path traverses portions of each of the three layers while avoiding various hot spots/cold spots 2714. Connection from one layer to another is achieved by routing the wiring path through vias (not separately shown) that provide conduction pathways between the layers.

Figure 28:
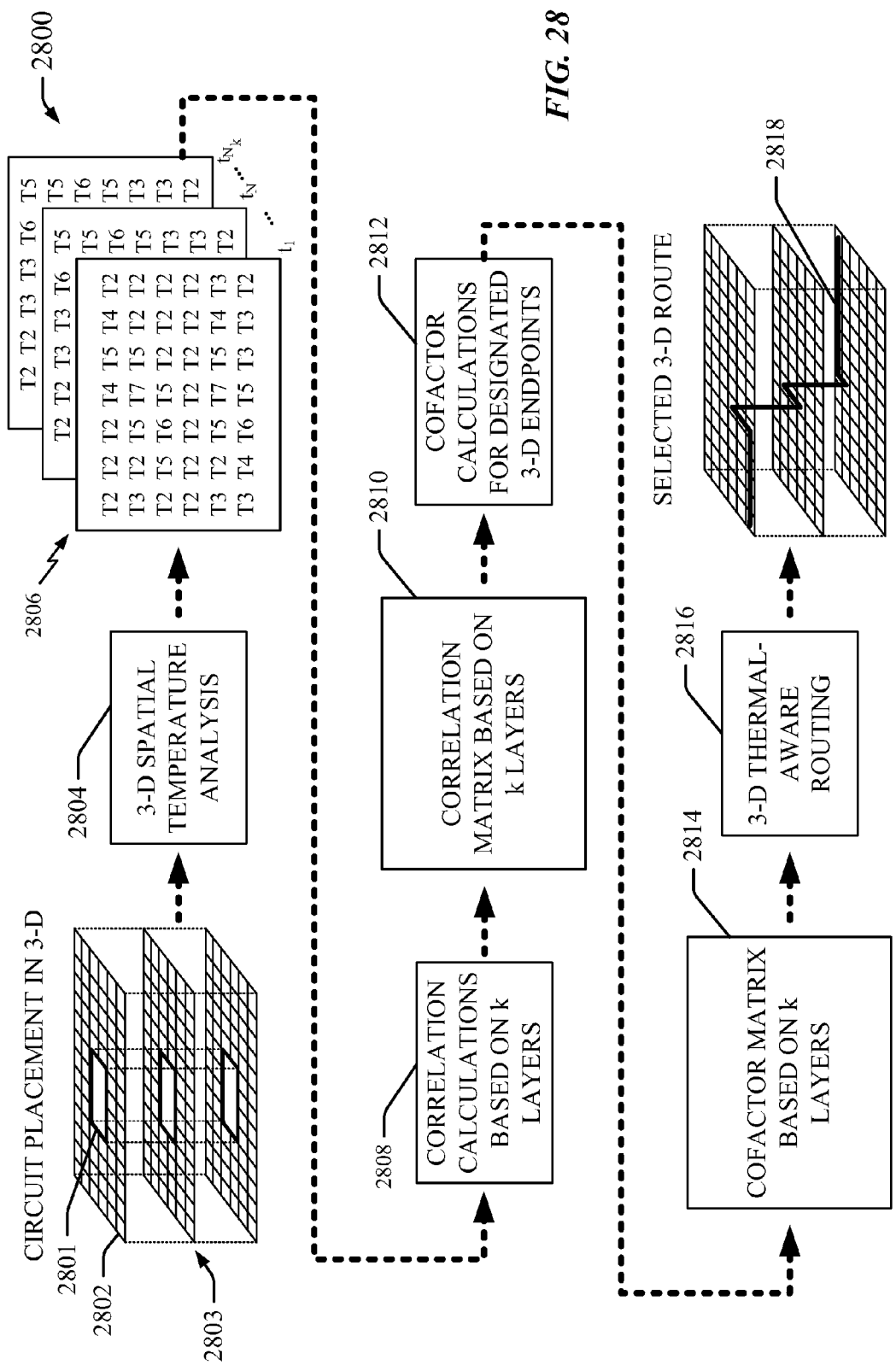
FIG. 28 is a diagram illustrating an example of generating and using a cofactor matrix for a 3-D wiring example in accordance with some aspects of the disclosure.

FIG. 28 illustrates an example of generating and using a cofactor matrix for a 3-D implementation. Some aspects of this 3-D implementation are the same or similar to corresponding aspects of the 2-D implementation of FIG. 6 and hence will not be described again in detail. As already explained, high temperature variability can significantly affect the delay and skew associated with a wiring route. As with 2-D thermal-aware routing, 3-D thermal-aware routing may consider both distance and temperature correlation for evaluating the delay between each node and for also reducing skew and skew variation. Since dynamic temperature variation over time generates different skews, the 3-D routing scheme may identify the smoothest routing path, from a temperature perspective, in an attempt to guarantee or achieve more stable skew variation. That is, the 3-D routing scheme considers time-variant temperature variations along with 3-D spatial and temporal correlation. A 3-D temperature correlation map is then generated by analyzing 3-D time-variant temperature maps. In this manner, the 3-D routing scheme can identify the multi-layer route with the highest correlation cofactor values and thereby provide a route with better thermal tolerance. In addition, by avoiding any hot spot/cold spot areas identified in the temperature correlation map, the 3-D routing scheme can further reduce skew.

The overall circuit design process 2800 begins by locating one or more circuits 2801 within an area 2802 of a PCB, IC, or some other suitable multi-layer structure 2803 where the operation of the circuit may generate heat. In the example of FIG. 28, circuit 2801 is shown as potentially extending across all layers of the multi-layer structure 2803. Note that in this 3-D example, the area 2802 may correspond to a volume within the substrate. The term "area" is used to be consistent with the descriptions above. A grid pattern is shown within area 2802 of multi-layer structure 2803, which extends in and around the circuit 2801. It should be understood that this pattern is not an actual component or feature of the substrate itself. Rather, it is illustrative of how the software of the routing system may subdivide the structure for use in determining routing paths. The grid can be of generally arbitrary size, shape and granularity. In practice, a grid with much finer granularity is employed than is shown in FIG. 28. Non-rectangular grids could potentially be used instead, although a rectangular grid is more convenient for processing purposes, especially when Manhattan routing is employed. It should also be understood that the actual substrate may be much larger than the portion shown. For example, the area 2802 may represent only one relatively small portion of an overall IC to be fabricated. Although only a single circuit 2801 is shown within the area 2802, multiple circuits may be provided within the area.

3-D spatial temperature analysis 2804 is then performed for the area 2802. As with the 2-D example above, this may involve determining (e.g., estimating) the temperature at different points of the area 2802 over a period of time. As explained, a simulation program that has information about the temperature characteristic of the circuits located in the circuit area under consideration and information about how these circuits are configured can estimate the expected temperature at various points within the area 2802 when the circuits are in operation. To model time-variant temperatures in the vicinity of the circuits in the area 2802, the aforementioned grid is assigned a temperature range, which can be obtained by measurement or thermal simulation.

As a specific, non-limiting example, 3-D temperature analysis 2804 may involve a micro-architecture level power and temperature simulation. The area 2802 is divided into a uniform grid with some number of nodes per layer k of the multi-layer substrate. Generally, for layer k, there will be $N_k$ nodes. Thus, there are $M=\sum_{k=1}^{K} N_k$ nodes within multi-layer area 2802 where K is the total number of layers. Temperature sequences generated by temperature analysis 2804 may be represented as follows:

$$\mathcal{T}_{n_1} = \{T(t_1, n_1), \ldots, T(t_p, n_1), T(t_{p+1}, n_1), \ldots, T(t_N, n_1)\} \quad (9)$$

$$\mathcal{T}_{n_2} = \{T(t_1, n_2), \ldots, T(t_p, n_2), T(t_{p+1}, n_2), \ldots, T(t_N, n_2)\}$$

$$\ldots$$

$$\mathcal{T}_{n_{N_1}} = \{T(t_1, n_{N_1}), \ldots, T(t_p, n_{N_1}), T(t_{p+1}, n_{N_1}), \ldots, T(t_N, n_{N_1})\}$$

$$\mathcal{T}_{n_{N_1+1}} =$$
$$\{T(t_1, n_{N_1+1}), \ldots, T(t_p, n_{N_1+1}), T(t_{p+1}, n_{N_1+1}), \ldots, T(t_N, n_{N_1+1})\}$$

$$\ldots$$

$$\mathcal{T}_{n_{N_k}} = \{T(t_1, n_{N_k}), \ldots, T(t_p, n_{N_k}), T(t_{p+1}, n_{N_k}), \ldots, T(t_N, n_{N_k})\}$$

FIG. 28 illustrates a simplified example of a resulting temperature matrix 2806 for time instances $t_1$ to $t_{N_k}$. In a non-limiting example, the temperature matrix 2806 corresponds to Equation 9. Correlation calculations 2808 use the 3-D temperature matrix 2806 as an input to generate a correlation matrix 2810 based on the k layers of the multi-layer substrate. In a non-limiting example, the correlation calculations 2808 generate a temperature correlation matrix or co-variance matrix (of size $(\sum_{k=1}^{K} N_k)^2$) represented by:

$$C(i_k, j_k) = \frac{\text{cov}(i_k, j_k)}{\sigma_{i_k} \cdot \sigma_{j_k}} \quad (10)$$

where $$\text{cov}(i_k, j_k) = \sum_{\tau=1}^{N} T(t_\tau, n_{i_k}) T(t_\tau, n_{j_k}) - \sum_{\tau=1}^{N} T(t_\tau, n_{i_k})$$
$$\sum_{\tau=1}^{N} T(t_\tau, n_{j_k}) \quad (11)$$

is a co-variance matrix between nodes and where $$\sigma_{i_k} = \sqrt{\sum_{\tau=1}^{N} \frac{T(t_\tau, n_{i_k})^2}{N} - \left(\sum_{\tau=1}^{N} \frac{T(t_\tau, n_{i_k})}{N}\right)^2} \quad (11)$$

$$\sigma_{j_k} = \sqrt{\sum_{\tau=1}^{N} \frac{T(t_\tau, n_{j_k})^2}{N} - \left(\sum_{\tau=1}^{N} \frac{T(t_\tau, n_{j_k})}{N}\right)^2} \quad (12)$$

are the standard deviations for nodes $n_i$ and $n_j$. In this example, the 3-D correlation matrix 2810 of FIG. 2810 would thus correspond to Equation 10.

Cofactor calculations 2812 use the 3-D correlation matrix 2810 as an input to generate a cofactor matrix 2814 (based on k layers) associated with designated 3-D target points (e.g., endpoints within the multi-layer substrate) for the route. As in the 2-D examples above, a point in the 3-D grid having a high correlation cofactor value represents high correlation with both routing target points. In some implementations, a correlation cofactor is based on the product of the coefficients associated with two target points: $CCp_k=\text{cov}(i_k,p_k)*\text{cov}(p_k,j_k)$ where $p_k$ indicates that p may be within any one of the k layers. In other implementations, a correlation cofactor may be based on the sum of the coefficients, $CCp_k=\text{cov}(i_k,p)+\text{cov}(p,j_k)$. Other algorithms or procedures that serve to indicate the correlation of a point in the 3-D grid with two target points in the 3-D grid could be used as well.

Thereafter, 3-D thermal-aware routing 2816 uses the cofactor matrix 2814 as an input to identify a 3-D route 2818 with the highest correlation values. For example, the 3-D thermal-aware routing 2816 may calculate a correlation value for each prospective 3-D route between two target points in the multi-layer substrate. As with the 2-D case, the correlation value for a route is a function of the individual cofactor values associated with the 3-D grid points along the route. For example, the individual cofactor values may be multiplied together, added together, or operated on in some other way to generate the correlation value for the 3-D route. Various types of 3-D routing algorithms (e.g., 3-D maze routing, etc.) may be employed in various 3-D implementations depending on design objectives. Thermal-aware routing may employ Manhattan routing rules or other routing rules. Thus, routing need not be restricted to "to the right" routing choices or be restricted to remain within a defined routing window. Thus, course reversal (e.g., backtracking) could be employed in a 3-D scenario where this results in superior skew characteristics for a 3-D route. Moreover, the 3-D thermal aware routing 2816 may take into account one or more of the routing factors listed in FIG. 26 such as RC coupling, worst-case skew, layer density, weighting factors, etc.

Insofar as weighting factors are concerned, as explained above with reference to FIGS. 9-11, a final routing decision may take physical factors into account using various weighting factors. Weighting factors can be associated with transitions from one layer to another, the use of a via, reversing course, or other physical factors. These physical factors may affect the signal skew, the power consumption, or some other operating parameter associated with a 3-D route. Thus, one or more weighting factors can be used at 2816 to quantify such effects. The determination of a preferred or optimal 3-D route (e.g., the 3-D route with the lowest skew, the 3-D route that provides a skew that best matches the skew of another 3-D route, the 3-D route with the lowest power consumption, etc.) can be based on a balancing of temperature correlation and other weighting factors. See, FIGS. 9-11 and their descriptions for various examples.

Figure 29:
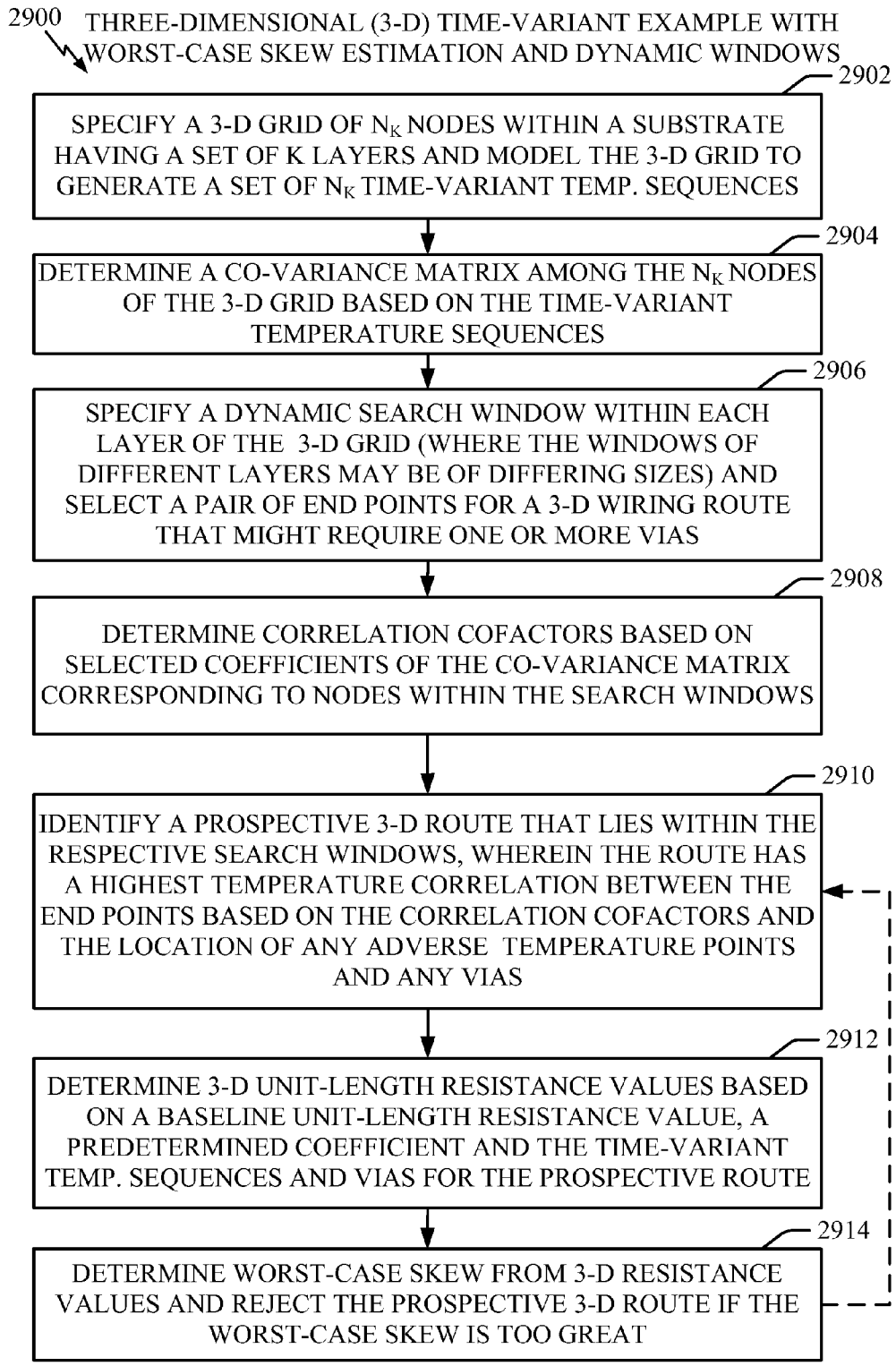
FIG. 29 is a flowchart illustrating a wire routing method directed to 3-D time-variant routing with dynamically adjustable search windows and worst-case skew estimation.

FIG. 29 illustrates an exemplary routing procedure 2900 that may be performed by a suitably-equipped 3-D routing system wherein the 3-D routing takes into account a worst-case skew estimation and exploits dynamic search windows within at least some of the layers of a multi-layer substrate. Other factors may also be taken into account such as the location of hot spots. At 2902, the 3-D routing system specifies a 3-D grid of $N_K$ nodes within a substrate layer and models the 3-D grid to generate a set of $N_K$ time-variant temperature sequences where, as noted, $N_K=\sum_{k=1}^{K} N_k$. Procedures described above in connection with Equation 9 may be used to generate the grid of $N_K$ nodes and to generate the time-variant temperature sequences. At 2904, the 3-D routing system determines a co-variance matrix among the nodes based on the time-variant temperature sequences as shown above in, for example, Equations 10-12. At 2906, the 3-D routing system specifies a dynamic adjustable search window within each layer k of the 3-D grid and selects a pair of end points within the 3-D grid for wiring a 3-D route through the grid that might require one or more vias.

Figure 30:
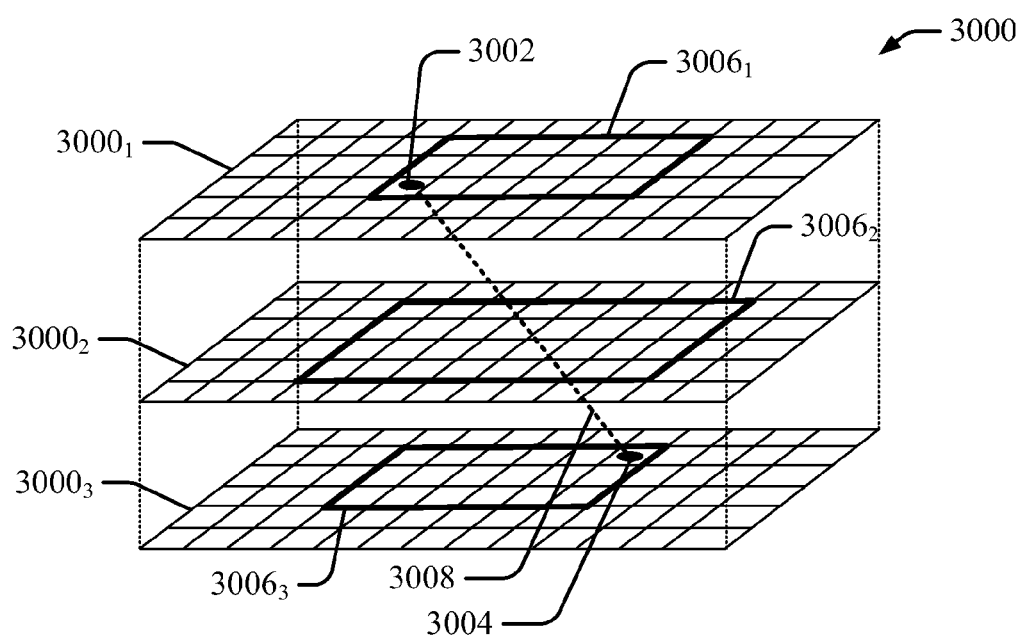
FIG. 30 is a diagram illustrating dynamically adjustable search windows for use with 3-D time-variant routing.

A set of three exemplary dynamic search windows are shown in FIG. 30. In the example, a 3-D grid 3000 includes three stacked layers $3000_1$, $3000_2$ and $3000_3$ and has designated end points 3002 and 3004. A first dynamic search window $3006_1$ is set for the top layer $3000_1$; a second dynamic search window $3006_2$ is set for the middle layer $3000_2$; and a third dynamic search window $3006_3$ is set for the bottom layer $3000_3$. As shown, the search windows can have different sizes for each layer. The relative sizes of the search windows can be set by the routing system based on the respective locations of the two end points and on the absolute distance 3008 therebetween. In this example, the search windows $3006_1$ and $3006_3$ of the top and bottom layers are smaller than the search window $3006_2$ of the middle layer. All three search windows are set smaller than the overall grid to reduce the amount of computation required to generate correlation co-factors. Similar to the 2-D example above, the 3-D routing system may calculate the absolute distance between the end points first and use that distance to help determine the preferred areas of each of the three dynamic windows ($3006_1$, $3006_1$ and $3006_3$). The vertical and horizontal boundaries of each of the three windows are then set based on the locations of the end points so as to encompass those points and provide additional horizontal and vertical space on at least some of the layers for routing (to accommodate, e.g., any backtracking that might be needed to avoid hot spots or the like.) Although the example of FIG. 30 illustrates rectangular search windows, it should again be understood that other window shapes may be employed in at least some examples.

Returning to FIG. 29, once each search window is specified, the 3-D routing system determines correlation cofactors at 2908 based on coefficients of the co-variance matrix corresponding to nodes within the search windows of each layer. As explained above, a correlation cofactor among areas P ($CCp_k$) to a target $i_k$, $j_k$ may be defined based on the two corresponding coefficients. In an example where the correlation cofactor is based on the product of the coefficients, $CCp_k = cov(i_k,p)*cov(p,j_k)$. At 2910, the 3-D routing system identifies or selects a prospective 3-D route through the grid that lies within the search windows wherein the route has a highest temperature correlation between the end points based on the correlation cofactors and the location of any adverse temperature points (e.g. hot spots/cold spots) and any vias. See the descriptions of FIG. 28 for exemplary procedures for identifying one or more prospective routes within a 3-D grid while taking into account hot spots, etc.

At 2912, the 3-D routing system determines 3-D unit-length resistance values based on a baseline unit-length resistance value, a predetermined coefficient and the time-variant temperature sequences for the prospective 3-D route while also taking to account the presence of vias. In this regard, in a 3-D example, unit-length resistance may be represented as a function of temperature gradient as follows:

$$r_{unit}(x,y,k,t) = \rho_0 \cdot (1 + \beta \cdot T(x,y,k,t)) \quad (13)$$

where $\rho_0$ is again the unit-length resistance at 0° C., x, y, k are the 3-D coordinates and $\beta$ is a predetermined temperature coefficient of resistance (1/° C.). Resistance of a via between a kth layer and (k−1)th layer may be represented using:

$$r_{via}(k) \quad (14)$$

For a substrate having K layers, there will be (K−1) different $r_{via}$ values (assuming one via per layer). The resistance over the 3-D path can then be calculated, for example, as:

$$R = \sum_{for\ all\ k} \left( \sum r_{unit}(x, y, k, t) \cdot d + \sum \alpha \cdot r_{via}(k) \right) \quad (15)$$

where $\alpha$ denotes the existence of a via (with $\alpha=0$ for no via and $\alpha=1$ for a via.) After the temperature-affected resistance is determined, the routing system can then calculate or estimate the clock skew and its variation using techniques similar to those set forth above for the 2-D worst-case skew example of FIG. 22. See, for example, Equation 8 and its descriptions.

At 2914, the routing system determines worst-case skew from the resistance values and rejects the prospective 3-D route if the worst-case skew is too great or otherwise unacceptable. Again, as an example, the worst-case skew may be compared against a predetermined threshold. If the prospective route is rejected, processing may return to block 2910 (via the dashed arrow of the figure) to identify an alternative 3-D route that avoids skew problems. Alternatively, worst-case skew may be assessed and accounted for during the procedures of block 2910 while the 3-D system is mapping out possible routes so that the prospective 3-D route that is identified is already assured to have an acceptable worst-case skew.

Figure 31:
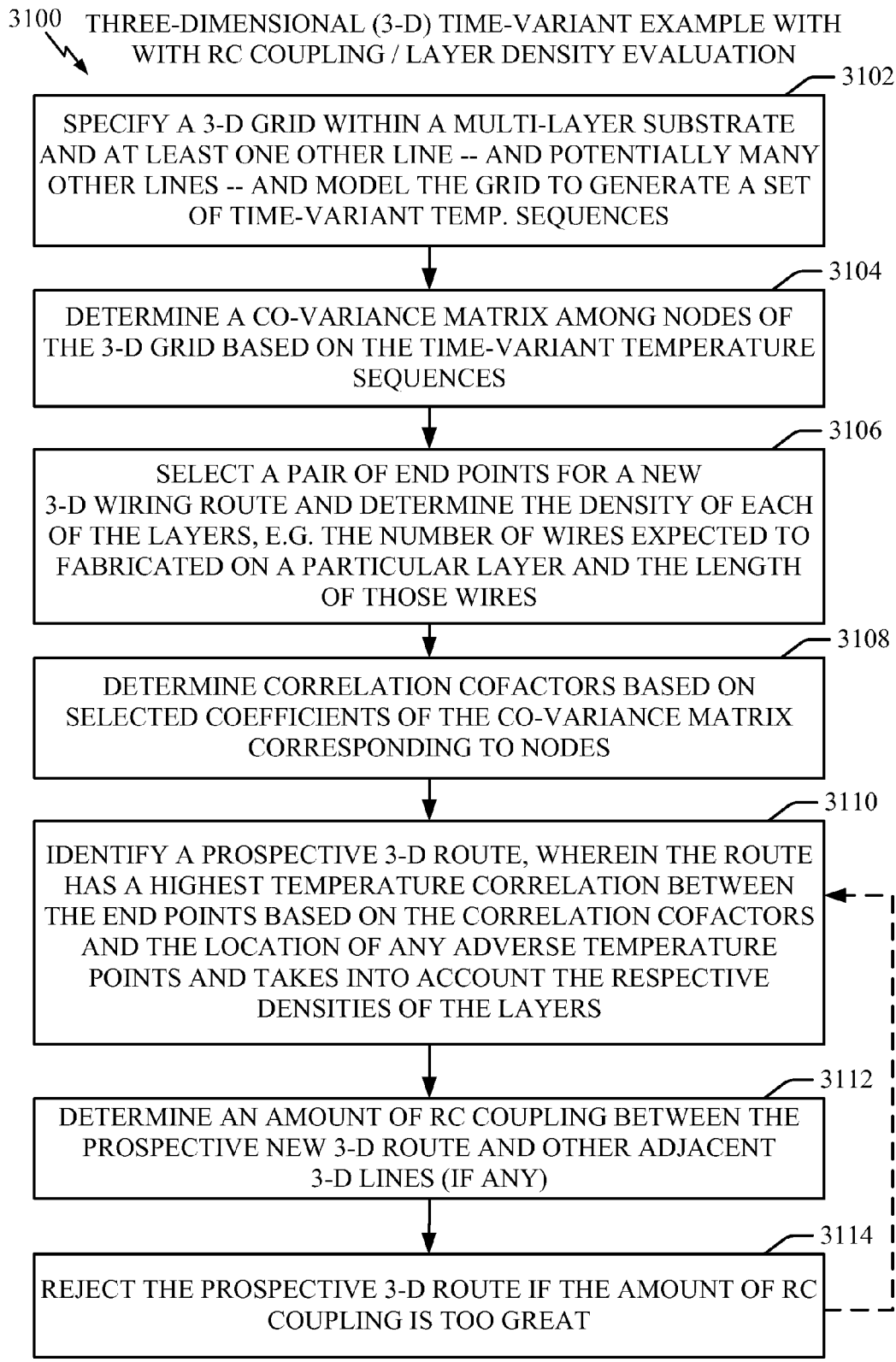
FIG. 31 is a flowchart illustrating a wire routing method directed to 3-D time-variant routing with RC coupling and layer wire density evaluation.

FIG. 31 illustrates an exemplary 3-D routing procedure 3100 that may be performed by a suitably-equipped routing system wherein the routing takes into account a RC coupling of wiring routes on different layers of a multi-layer substrate as well as layer densities. As with the previous example, other factors may also be taken into account such as the location of hot spots, etc. At 3102, the 3-D routing system specifies a 3-D grid of $N_K$ nodes within a multi-layer substrate having at least one other line—and potentially many other lines—and models the 3-D grid to generate a set of $N_K$ time-variant temperature sequences. At 3104, the 3-D routing system determines a co-variance matrix among the nodes based on the time-variant temperature sequences. At 3106, the 3-D routing system selects a pair of end points for a new wiring route through the grid that will be added along with the other lines. Although not specifically shown in FIG. 31, the routing system may use various search windows as already described. Also at 3106, the routing system determines the density of each of the layers of the multi-layer substrate, e.g. the number of wires expected to be fabricated on a particular layer and the length of those wires. That is, layer density can generally refer to the overall amount of metal expected to be deposited on a particular layer. For example, if a particular layer currently has no wires designated for fabrication on that layer, then the layer density is considered to be low (and may be represented by a density of zero.) However, if a particular layer currently has numerous wires designated for fabrication on that layer (as a result of previous iterations of the routing procedure), then the density is considered to be high and, in that case, the layer density may be quantified as the sum of the number of wires for that layer and the total length of those wires on that layer. Other suitable techniques may be used to quantify layer density. Layer density can be important since it may be appropriate, in some examples, to route new prospective lines onto layers with relatively low density while avoiding layers with relatively high density. Moreover, it may be desirable to route new prospective lines on layers that do not lie adjacent to layers with high density as such routing may result in RC coupling with the wires of the adjacent layer. Additionally or alternatively, layer density may be representative of the material density of a particular layer, particularly if that material density affects RC coupling. Still further, layer density may be representative of a number of layers per unit height since such can also affect RC coupling.

At 3108, the 3-D routing system determines correlation cofactors based on coefficients of the co-variance matrix corresponding to nodes within the search windows of each layer. At 3110, the 3-D routing system identifies or selects a prospective 3-D route for the new line through the grid that lies within the various search windows, wherein the route has a highest temperature correlation between the end points based on the correlation cofactors and the location of any extreme temperature points, etc., while also taking into account the respective densities of the layers. As noted, the routing system may favor a route that avoids layers of relatively high density. At 3112, the 3-D routing device determines an amount of RC coupling between the prospective new 3-D route and the other 2-D or 3-D line.

Figure 32:
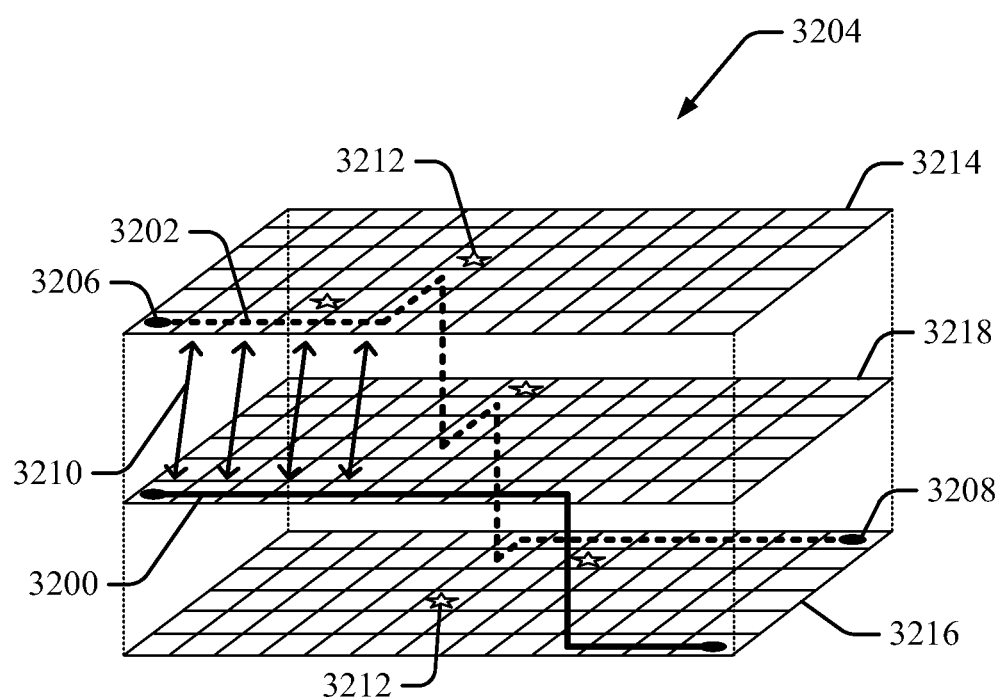
FIG. 32 is a diagram illustrating RC coupling considerations and wire density considerations applicable to 3-D time-variant wire routing.

FIG. 32 illustrates exemplary RC coupling between a line 3200 and a prospective new 3-D line 3202 within a 3-D grid 3204 wherein the prospective new 3-D line 3202 is intended to connect between end points 3206 and 3208. In this example, the prospective new 3-D line 3202 lies alongside—and one layer above—the other line 3200 for part of its route, triggering RC coupling, which is shown generally by way of arrows 3210. The figure also shows various hot spots 3212 to be avoided. FIG. 32 also serves to illustrate layers of differing layer density. In this example, the topmost layer 3214 has a density of zero (before the prospective new 3-D line 3202 has been accepted as part of the design) since there are no other lines or portions of lines on that layer. The bottommost layer 3216 has a relatively low (but non-zero) density since a relatively short portion of line 3200 passes along that layer. The middle layer 3218 has a relatively higher density since a longer portion of the line 3200 passes along that layer. Hence, there is more metal in the middle layer 3218 than the bottom layer 3216. In practical implementations, after numerous iterations of the routing system, numerous lines or portions of lines may be designated for fabrication on various layers of the substrate and hence the density of some of the layers may be quite high.

Returning to FIG. 31, the 3-D routing device may determine the amount of RC coupling at 3114 between the prospective new 3-D route and the other adjacent lines (if any) using otherwise conventional RC coupling assessment or estimation techniques, which may take into account the distance between the adjacent portions of the wiring paths and any differences in material between the different layers, as well as the aforementioned layer densities. At 3114, the routing system rejects the prospective route if the amount of RC coupling is too great. For example, the amount of expected RC coupling may be compared against a predetermined threshold representative of coupling that is too great for the particular circuit application (i.e. coupling that would unduly effect the propagation of signals along the new line, causing unacceptable skew or other undesirable effects.) If the prospective route is rejected, processing may then return to block 3110 (via the dashed arrow of the figure) to identify an alternative prospective route that avoids RC coupling problems by, for example, following a route that does not lie adjacent other wires or which avoids layers of high density. Alternatively, RC coupling may be assessed and accounted for during the procedures of block 3110 while the system is mapping possible routes so that the prospective route identified at block 3110 is already assured to have an acceptably low amount of coupling with other wires.

Exemplary Systems and Methods

Figure 33:
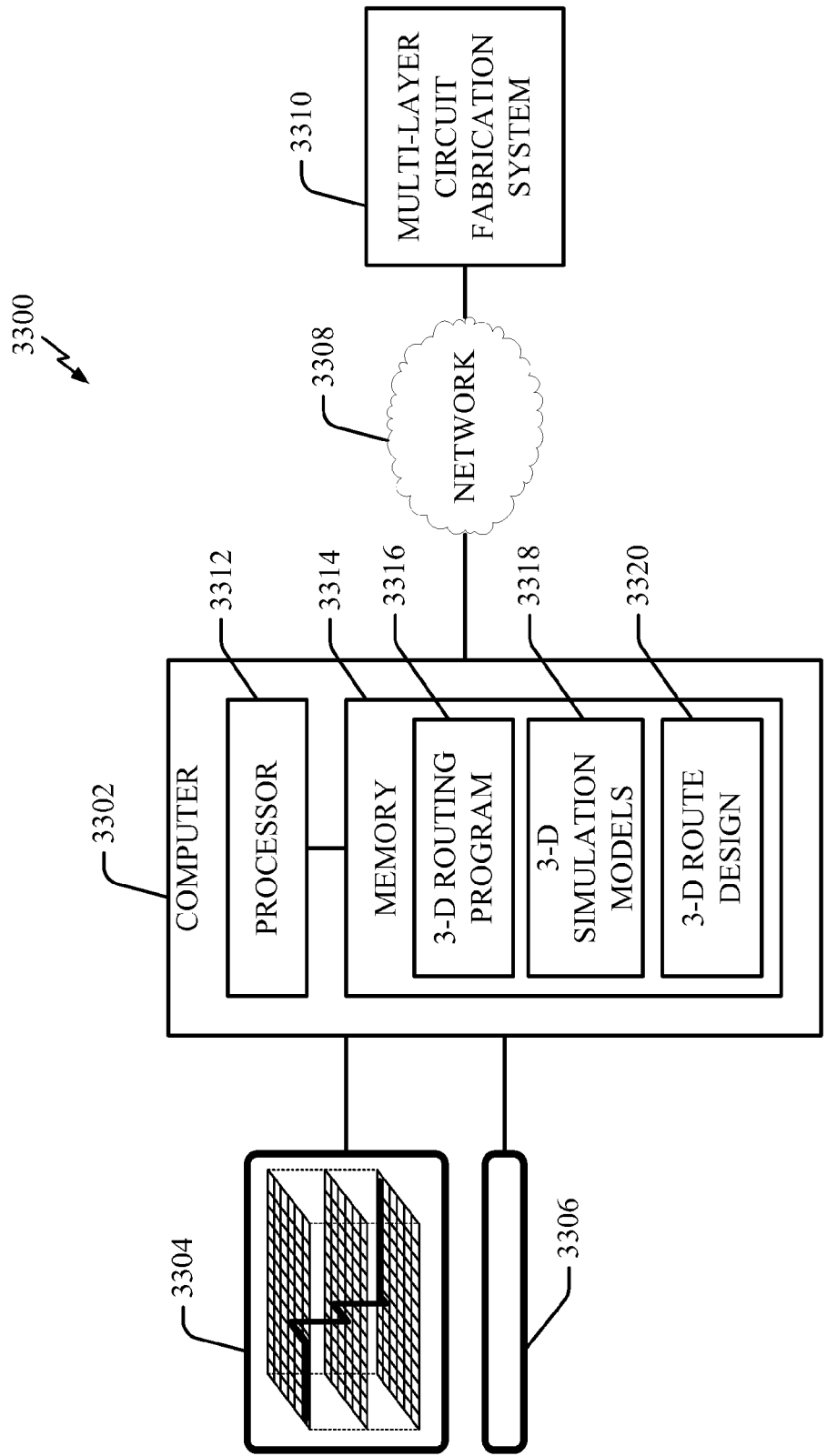
FIG. 33 is a block diagram illustrating an exemplary circuit design system adapted for 3-D wiring in which one or more aspects of the disclosure may find application.

FIG. 33 illustrates an example of a circuit design system 3300 in which one or more aspects of the disclosure may find application. The system 3300 is similar to the corresponding system of FIG. 17 but particularly adapted to 3-D routing and, as such, only pertinent differences will be described in detail. The system 3300 includes a computer 3302 communicatively coupled to a user display device 3304, adapted for displaying 3-D representations of multi-layer substrate circuits, and user input devices 3306. The computer 3302 is also communicatively coupled to a network 3308 to enable 3-D design data generated by the computer 3302 to be transferred to a multi-layer circuit fabrication system 3310 that manufactures PCBs, ICs, or the like. The computer 3302 includes a processor 3312 and a memory 3314.

A 3-D routing program 3316 and 3-D simulation models 3318 stored in the memory 3314 and/or implemented by the processor 3312 enable a user to generate 3-D circuit designs in accordance with the teachings herein. For example, a user may use the display device 3304 and the user input devices to position 3-D circuits on at least one multi-layer substrate (e.g., of an IC or a PCB), simulate 3-D temperature characteristics at various locations on the at least one multi-layer substrate over time, generate a correlation matrix, generate a cofactor matrix, and select a 3-D route that has the best temperature correlation as taught herein. The user may then send a resulting 3-D route design 3320 to the fabrication system 3310 to produce the desired circuit component. Note that 3-D techniques described herein generally include 2-D techniques as a portion or subset thereof where applicable. Hence, the 3-D routing program 3316 may process 2-D routes, as well as 3-D routes. Likewise, the 3-D simulation models 3318 may also process 2-D models and the 3-D route design 3320 may also process 2-D route designs. As such, the 3-D components shown in FIG. 33 and other figures herein are not limited to the processing of only 3-D circuits or designs.

Figure 34:
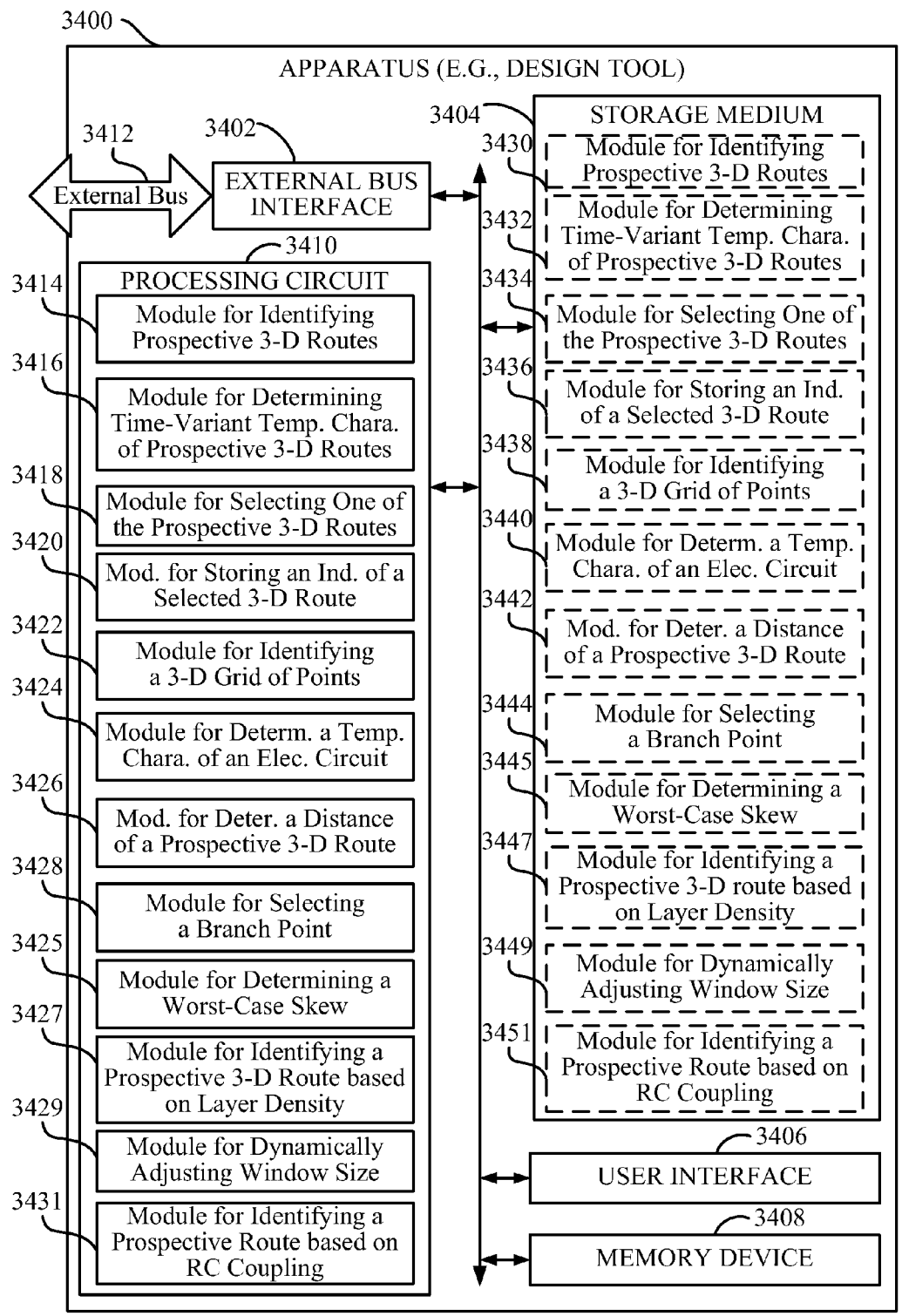
FIG. 34 is a block diagram illustrating selected components of an apparatus configured to provide 3-D routing functionality and other functionality in accordance with some aspects of the disclosure.

Turning now to FIG. 34, a block diagram is shown illustrating selected components of an apparatus 3400, such as the computer 3302 of FIG. 33, according to at least one example of the disclosure. The apparatus 3400 is similar to the corresponding system of FIG. 18 but particularly adapted to 3-D routing and, as such, only pertinent differences will be described in detail. The apparatus 3400 (e.g., a design tool) includes an external bus interface 3402, a storage medium 3404, a user interface 3406, a memory device 3408, and a processing circuit 3410. The processing circuit is coupled to or placed in electrical communication with each of the external bus interface 3402, the storage medium 3404, the user interface 3406, and the memory device 3408. The external bus interface 3402 provides an interface for the components of the apparatus 3400 to an external bus 3412. The processing circuit 3410 is arranged to obtain, process and/or send data, control data access and storage, issue commands, and control other desired operations. In some instances, the processing circuit 3410 may include circuitry adapted to perform a desired function, with or without implementing programming. The processing circuit 3410 is adapted for processing, including the execution of programming, which may be stored on the storage medium 3404.

In some instances, the processing circuit 3410 may include one or more of: a module for identifying prospective 3-D routes 3414, a module for determining temperature characteristics of prospective 3-D routes 3416, a module for selecting one of the prospective 3-D routes 3418, a module for storing an indication of a selected 3-D route 3420, a module for identifying a 3-D grid of points 3422, a module for determining a temperature characteristic of an electronic circuit 3424, a module for determining a distance of a prospective 3-D route 3426, a module for selecting a branch point 3428, a module for determining a worse-case skew 3425, a module for identifying a prospective 3-D route based on layer density 3427, a module for dynamically adjusting window size 3429 (which may operate, for example, in either 2-D or 3-D) and a module for identifying a prospective route based on RC coupling 3431 (which may operate, for example, in either 2-D or 3-D).

The module for identifying prospective 3-D routes 3414 may include circuitry and/or programming (e.g., a module for identifying prospective 3-D routes 3430 stored on the storage medium 3404) adapted to collect information about two or more target points within a 3-D routing area, calculate different 3-D routes that may be traversed within the 3-D routing area between the target points, and generate an indication of the prospective 3-D routes. The module for determining temperature characteristics of prospective 3-D routes 3416 may include circuitry and/or programming (e.g., a module for determining temperature characteristics of prospective 3-D routes 3432 stored on the storage medium 3404) adapted to acquire information about prospective 3-D routes, calculate temperature characteristics of various points along each prospective 3-D route, and generate an indication of the temperature characteristics.

The module for selecting one of the prospective 3-D routes 3418 may include circuitry and/or programming (e.g., a module for selecting one of the prospective 3-D routes 3434 stored on the storage medium 3404) adapted to acquire information about temperature characteristics of prospective 3-D routes, identify a best temperature characteristic from among the different temperature characteristics, and generate information about the 3-D route associated with the best temperature characteristic. The module for storing an indication of a selected 3-D route 3420 may include circuitry and/or programming (e.g., a module for storing an indication of a selected 3-D route 3436 stored on the storage medium 3404) adapted to acquire information about a selected 3-D route, generate an indication that is indicative of the selected 3-D route, generate a signal comprising the indication, and send the signal to a memory device.

The module for identifying a grid of 3-D points 3422 may include circuitry and/or programming (e.g., a module for identifying a grid of 3-D points 3438 stored on the storage medium 3404) adapted to acquire information about a 3-D routing area for one or more circuits, define a grid of 3-D points within that area, and generate an indication of the defined grid of 3-D points. The module for determining a temperature characteristic of an electronic circuit 3424 may include circuitry and/or programming (e.g., a module for determining a temperature characteristic of an electronic circuit 3440 stored on the storage medium 3404) adapted to acquire information about electronic circuits, determine a temperature characteristic of the electronic circuits under one or more operating conditions, and generate an indication of the temperature characteristic. The module for determining a distance of a prospective route 3426 may include circuitry and/or programming (e.g., a module for determining a distance of a prospective route 3442 stored on the storage medium 3404) adapted to acquire information about a prospective route, calculate a distance of the prospective route, and generate an indication of the distance of the prospective route. The module for selecting a branch point 3428 may include circuitry and/or programming (e.g., a module for selecting a branch point 3444 stored on the storage medium 3404) adapted to acquire information about a target points, identify prospective branch points between the target points, select one of the prospective branch points, and generate an indication that identifies the selected branch point.

The module for determining a worst-case skew 3425 may include circuitry and/or programming (e.g., a module for determining a worst-case skew 3445 stored on the storage medium 3404) adapted to acquire information about electronic circuits, determine a worst-case skew of the electronic circuits under one or more operating conditions, and generate an indication of the worst-case skew. The module for identifying a prospective 3-D route based on layer density 3427 may include circuitry and/or programming (e.g., a module for identifying a prospective 3-D route based on layer density 3447 stored on the storage medium 3404) adapted to acquire information about a prospective 3-D route, calculate a layer density for layers associated with the prospective route, and generate an indication of the identification of a prospective 3-D route based on layer density The module for dynamically adjusting window size 3429 may include circuitry and/or programming (e.g., a module for dynamically adjusting window size 3449 stored on the storage medium 3404) adapted to acquire information about a target points, dynamically identify and adjust search window sizes, and generate an indication of the window sizes. The module for identifying a prospective route based on RC coupling 3431 may include circuitry and/or programming (e.g., a module for identifying a prospective route based on RC coupling 3451 stored on the storage medium 3404) adapted to acquire information about RC coupling, identify a prospective route based on RC coupling, and generate an indication of the RC coupling and the prospective route.

As with the example of FIG. 18, the storage medium 3404 may represent one or more processor-readable devices for storing programming, electronic data, databases, or other digital information. The storage medium 3404 may also be used for storing data that is manipulated by the processing circuit 3410 when executing programming. The storage medium 3404 may be any available media that can be accessed by the processing circuit 3410, including portable or fixed storage devices, optical storage devices, and various other mediums capable of storing, containing and/or carrying programming. In some implementations, the storage medium may be a non-transitory (e.g., tangible) storage medium.

Figure 35:
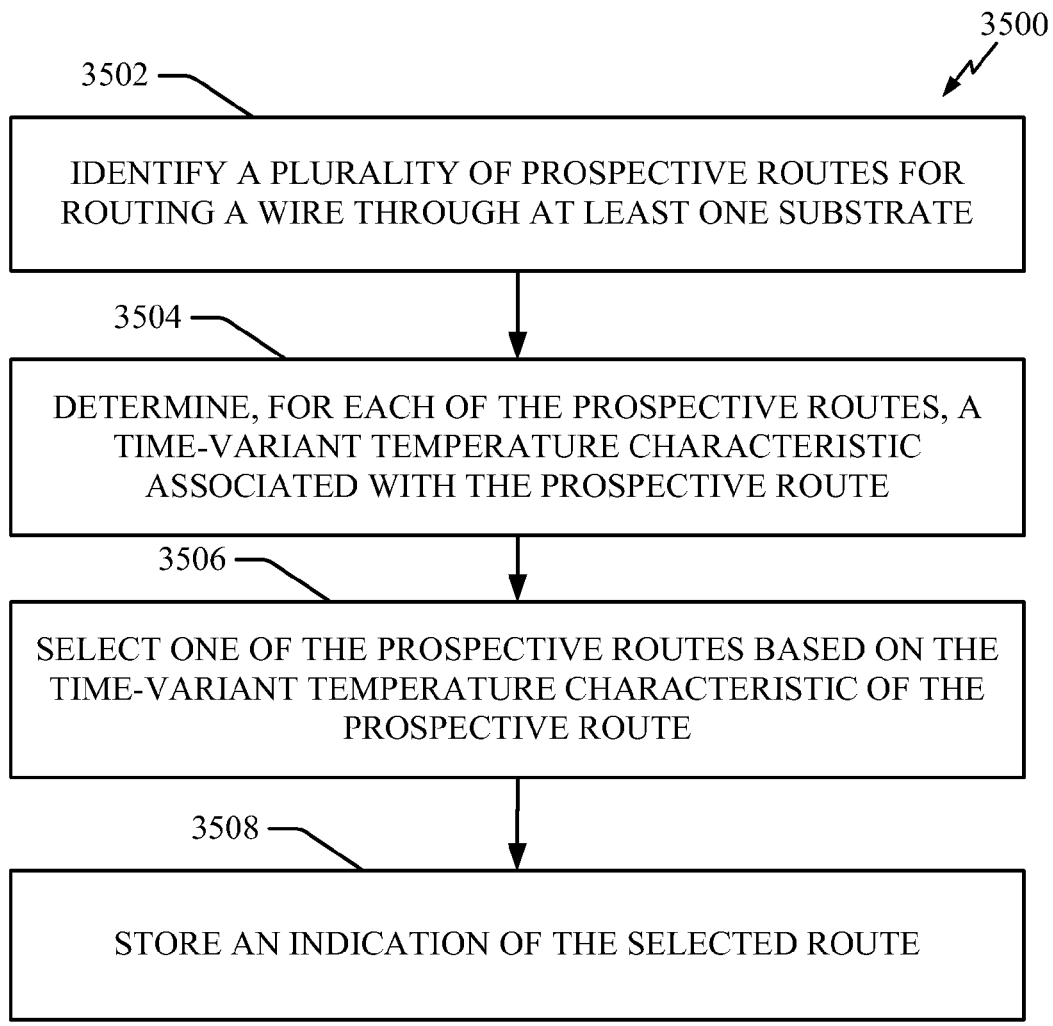
FIG. 35 is a flowchart illustrating a time-variant wire routing method in accordance with some aspects of the disclosure.

FIG. 35 illustrates a process 3500 for wire routing in accordance with some aspects of the disclosure. The process 3500 may take place within a processing circuit 3410 (FIG. 34), which may be located in a circuit design tool or some other suitable apparatus. In another aspect, the process 3500 may be implemented by the circuit design system 3300 illustrated in FIG. 33. Of course, in various aspects within the scope of the disclosure, the process 3500 may be implemented by any suitable apparatus capable of supporting wire routing operations. For brevity, the system, circuit or apparatus performing the process will be referred to in the following description merely as a system. At block 3502, the system identifies a plurality of prospective routes for routing a wire through at least one substrate. The at least one substrate may comprise a printed circuit board substrate, an integrated circuit die substrate, or some other type of substrate. At block 3504, the system determines, for each of the prospective routes, a time-variant temperature characteristic associated with the prospective route. At block 3506, the system selects one of the prospective routes based on the time-variant temperature characteristic of the prospective route. At block 3508, the system stores an indication of the selected route such as in a memory device. For example, the indication may be stored along with other routing data and other circuit data associated with a circuit design. Examples of these procedures are set forth above, particularly within the descriptions of FIGS. 22-25.

Figure 36:
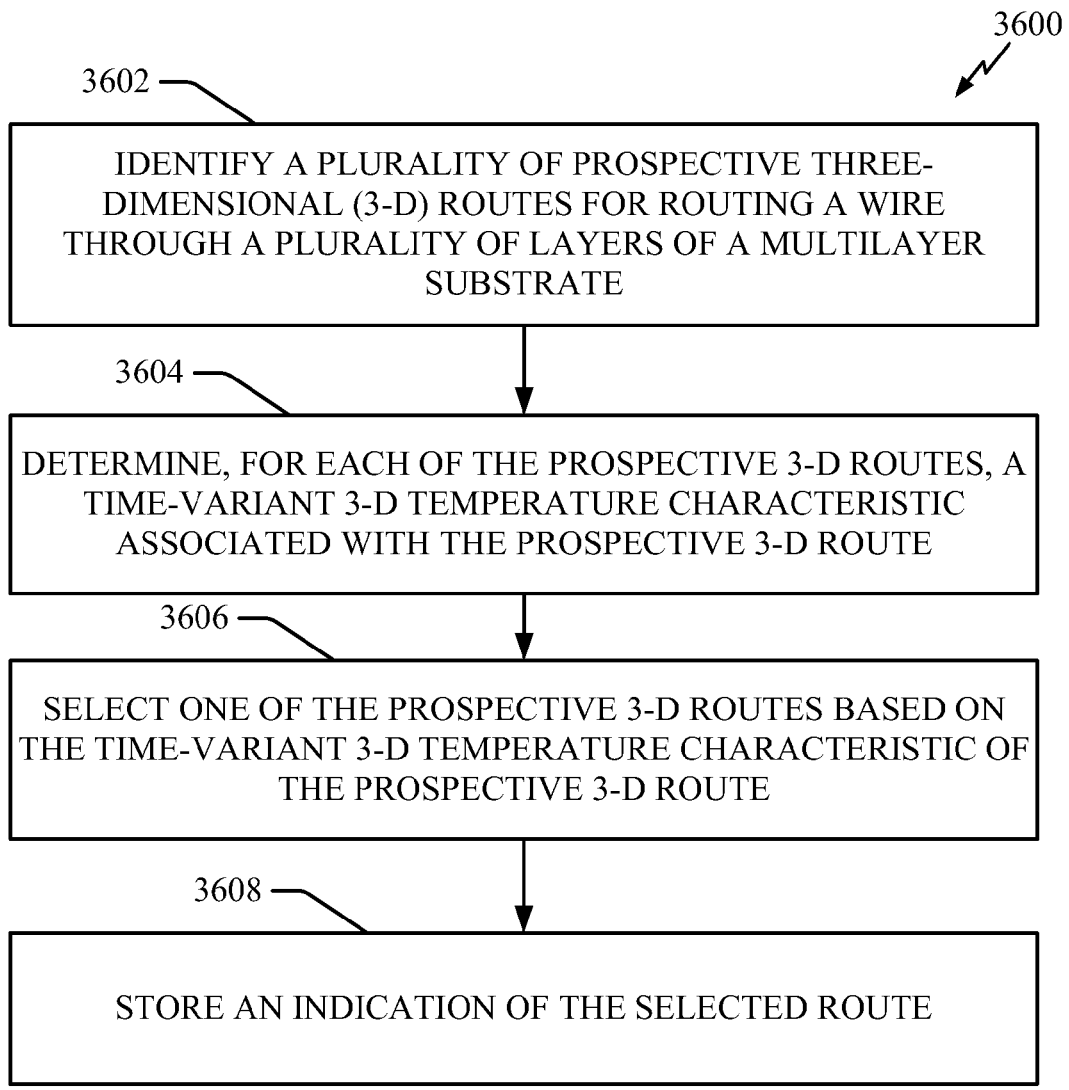
FIG. 36 is a flowchart illustrating a 3-D time-variant wire routing method in accordance with some aspects of the disclosure.

FIG. 36 illustrates a process 3600 for 3-D wire routing in accordance with additional aspects of the disclosure. In various aspects within the scope of the disclosure, the process 3600 may be implemented by any suitable system, circuit or apparatus capable of supporting wire routing operations. Again, for brevity, the system, circuit or apparatus performing the process will be referred to in the following description as a system. At block 3602, the system identifies a plurality of prospective 3-D routes for routing a wire through a plurality of layers of a multilayer substrate. At block 3604, the system determines, for each of the prospective 3-D routes, a time-variant 3-D temperature characteristic associated with the prospective 3-D route. At block 3606, the system selects one of the prospective 3-D routes based on the time-variant 3-D temperature characteristic of the prospective 3-D route. At block 3608, the system stores an indication of the selected 3-D route such as in a memory device. Examples of these procedures are set forth above, particularly within the descriptions of FIGS. 26-32.

Figure 37:
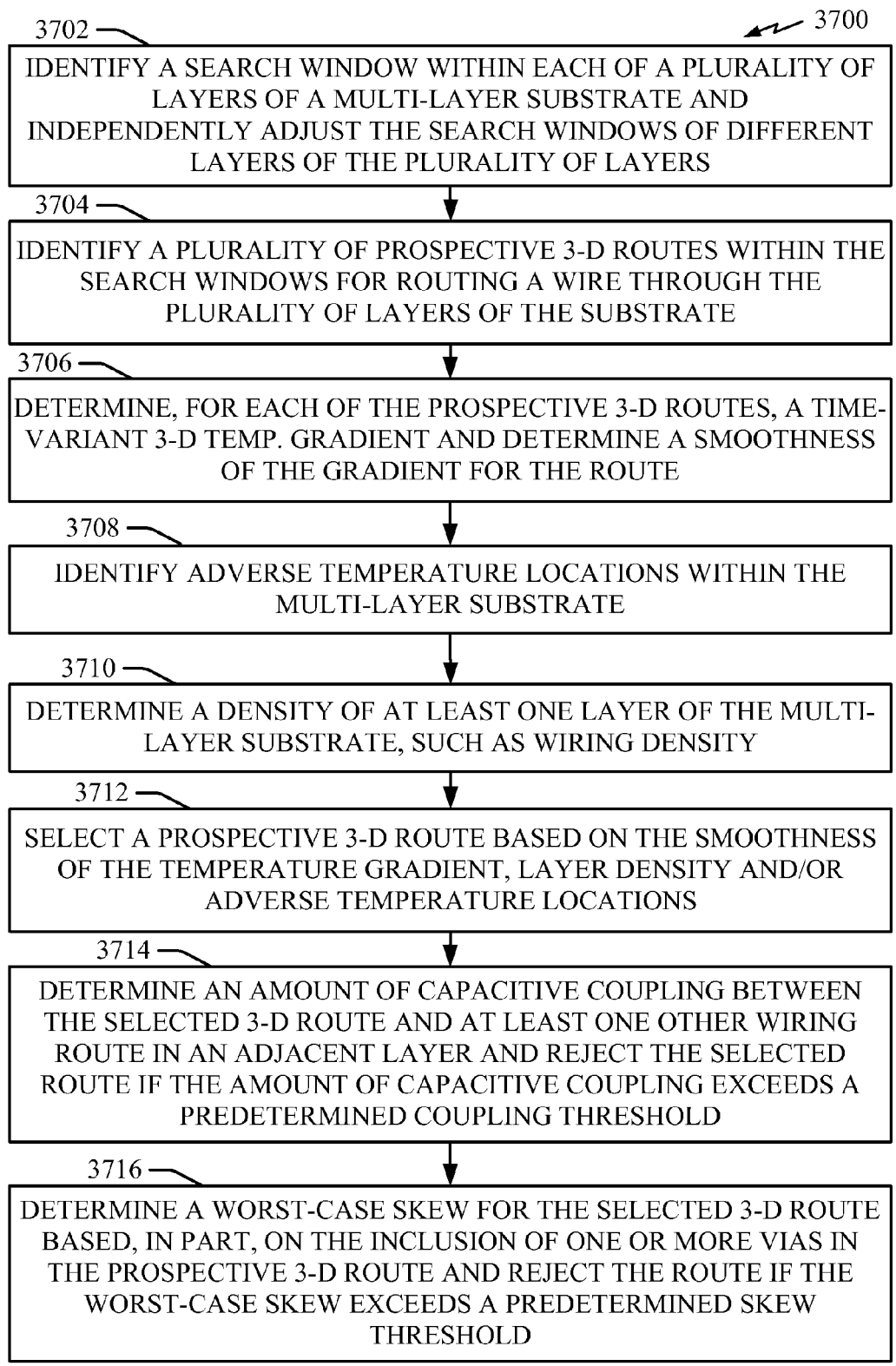
FIG. 37 is a flowchart illustrating additional time-variant wire routing methods in accordance with further aspects of the disclosure.

FIG. 37 illustrates a process 3700 for 3-D wire routing in accordance with some additional aspects of the disclosure. In various aspects within the scope of the disclosure, the process 3700 may be implemented by any suitable system, circuit or apparatus capable of supporting wire routing operations. Again, for brevity, the system, circuit or apparatus performing the process will be referred to in the following description as a system. At block 3702, the system identifies a search window within each of a plurality of layers of a multi-layer substrate and independently adjusts the search windows of different layers of the plurality of layers. At block 3704, the system identifies a plurality of prospective 3-D routes within the search windows for routing a wire through the plurality of layers of the substrate. At block 3706, the system determines, for each of the prospective 3-D routes, a time-variant 3-D temperature gradient and determines a smoothness of the gradient for the route. At block 3708, the system identifies adverse temperature locations within the multi-layer substrate. At block 3710, the system determines a density of at least one layer of the multi-layer substrate, such as wire density. Examples of these procedures are set forth above, particularly within the descriptions of FIGS. 26-32.

At block 3712, the system selects a prospective 3-D route based on the smoothness of the temperature gradient, layer density and/or adverse temperature locations. At block 3714, the system determines an amount of capacitive coupling between the selected 3-D route and at least one other wiring route in an adjacent layer and rejects the selected route if the amount of capacitive coupling exceeds a predetermined coupling threshold. At block 3716, the system determines a worst-case skew for the selected 3-D route based, in part, on the inclusion of one or more vias in the prospective 3-D route and rejects the route if the worst-case skew exceeds a predetermined skew threshold. Examples of these procedures are set forth above, particularly within the descriptions of FIGS. 26-32.

Thus at least some aspects of the disclosure are directed to a simple low-power and high-speed thermal aware interconnect technique for inter-chip communication which can provide clock balance and small skew for clock tree structure or other interconnect setup times and hold times. By avoiding, e.g., hot spots and conducting thermal-aware 3D-routing, a routing system can efficiently depress the clock skew variation and clock skew, in at least some examples, with less buffer insertion to balance the clock, setup time and hold time. Aspects of the system can achieve less power consumption than at least some predecessor routing designs.

Figure 38:
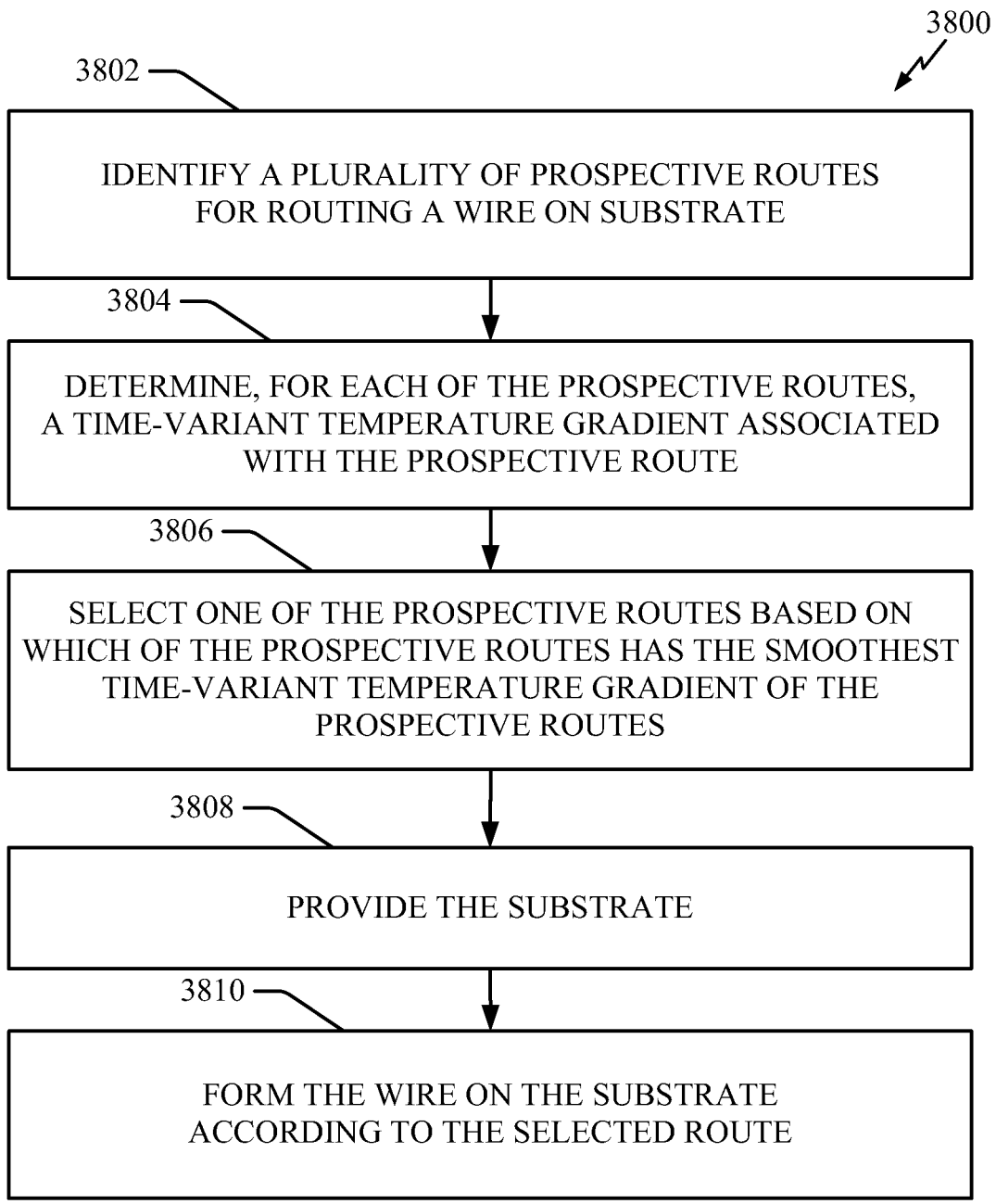
FIG. 38 is a flowchart illustrating a process for preparing a substrate having a wire formed thereon in accordance with some further aspects of the disclosure.

FIG. 38 illustrates a process 3800 for preparing at least one substrate having a wire formed thereon along a selected route associated with a smoothest time-variant temperature gradient from among a plurality of prospective routes. One or more operations of the process 3800 may take place within a processing circuit 3410 (FIG. 34), which may be located in a circuit design tool or some other suitable apparatus. In another aspect, one or more operations of the process 3800 may be implemented by the circuit design system 3300 illustrated in FIG. 33. However, in various aspects within the scope of the disclosure, the process 3800 may be implemented by any suitable apparatus capable of supporting wire routing operations.

Briefly, at block 3802, the prospective routes for routing the wire on the at least one substrate are identified. As discussed above, the at least one substrate may comprise a printed circuit board substrate, an integrated circuit die substrate, or some other type of substrate. At block 3804, for each of the prospective routes identified at block 3802, a time-variant temperature gradient associated with the prospective route is determined. At block 3806, one of the prospective routes is selected based on which of the prospective routes has the smoothest time-variant temperature gradient of the prospective routes. At block 3808, an appropriate manufacturing operation provides (e.g., forms or acquires) the at least one substrate. For example, a fabrication system may form at least one substrate for an integrated circuit die or form at least one substrate for a printed circuit board. At block 3810, an appropriate manufacturing operation forms the wire on the at least one substrate according to the selected route. For example, based on circuit design data that indicates the path of the selected route, a fabrication system may form the wire on at least one substrate for an integrated circuit die or on at least one substrate for a printed circuit board.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. Additional elements, components, steps, and/or functions may also be added or not utilized without departing from the disclosure.

While features of the disclosure may have been discussed relative to certain implementations and figures, all implementations of the disclosure can include one or more of the advantageous features discussed herein. In other words, while one or more implementations may have been discussed as having certain advantageous features, one or more of such features may also be used in accordance with any of the various implementations discussed herein. In similar fashion, while exemplary implementations may have been discussed herein as device, system, or method implementations, it should be understood that such exemplary implementations can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

Accordingly, the various features associated with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. A routing apparatus, comprising:
    a memory device; and
    a processing circuit coupled to the memory device and configured to:
        identify a plurality of prospective routes for routing a wire through at least one substrate;
        determine, for each of the prospective routes, a time-variant temperature characteristic associated with the prospective route;
        select one of the prospective routes based on a skew determined for each of the prospective routes using the time-variant temperature characteristic associated with the each of the prospective routes;
        store an indication of the selected route in the memory device; and
        provide design data including the indication of the selected route that may be used to manufacture an integrated circuit, substrate or printed circuit board.

2. The apparatus of claim 1, wherein:
    the substrate is a multi-layer substrate; and
    the processing circuit is further configured to:
        identify the plurality of prospective routes by identifying a plurality of prospective three-dimensional (3-D) routes through a plurality of layers of a multi-layer substrate;

determine, for each of the prospective 3-D routes, a time-variant 3-D temperature characteristic associated with the prospective 3-D route;
select one of the prospective 3-D routes based on the time-variant 3-D temperature characteristic of the prospective 3-D routes; and
store an indication of the selected 3-D route in the memory device.

3. The apparatus of claim 2, wherein the processing circuit is further configured to:
determine, for each of the prospective 3-D routes, a time-variant 3-D temperature gradient for each prospective 3-D route; and
select one of the prospective 3-D routes by selecting a route having a smoothest time-variant 3-D temperature gradient.

4. The apparatus of claim 2, wherein the processing circuit is further configured to:
identify adverse temperature locations within the multi-layer substrate; and
select one of the prospective 3-D routes by selecting a route that avoids the adverse temperature locations.

5. The apparatus of claim 2, wherein the processing circuit is further configured to:
determine a density of at least one layer of the multi-layer substrate; and
select one of the prospective 3-D routes by selecting the prospective route based in part on the density of the at least one layer of the multi-layer substrate.

6. The apparatus of claim 5, wherein the processing circuit is further configured to:
determine the density of the at least one layer of the multi-layer substrate by determining a wiring density.

7. The apparatus of claim 1, wherein the processing circuit is further configured to:
determine a worst-case skew of the selected route; and
reject the selected route if the worst-case skew exceeds a predetermined skew threshold.

8. The apparatus of claim 7, wherein:
the substrate is a multi-layer substrate with at least one via;
the selected route is a 3-D route including the via; and
the processing circuit is further configured to:
determine the worst-case skew for the selected route based, at least in part, on the inclusion of the via in the 3-D route.

9. The apparatus of claim 1, wherein:
the routing of the wire is between a first endpoint and a second endpoint; and
wherein the processing circuit is further configured to:
identify a search window within the at least one substrate; and
adjust the search window based on locations of first and second endpoints.

10. The apparatus of claim 9, wherein:
the substrate is a multi-layer substrate; and
wherein the processing circuit is further configured to:
identify a search window within each of a plurality of layers of the multi-layer substrate; and
independently adjust the search windows of different layers of the plurality of layers.

11. The apparatus of claim 1, wherein the processing circuit is further configured to:
determine an amount of capacitive coupling between the selected route and at least one other wiring route; and
reject the selected route if the amount of capacitive coupling exceeds a predetermined coupling threshold.

12. The apparatus of claim 11, wherein:
the substrate is a multi-layer substrate; and
wherein the processing circuit is further configured to:
determine the amount of capacitive coupling between the selected route and at least one other wiring route within an adjacent layer of the multi-layer substrate; and
reject the selected route if the amount of capacitive coupling with the at least one other wiring route within the adjacent layer exceeds the predetermined coupling threshold.

13. The apparatus of claim 1, wherein:
the substrate is a multi-layer substrate, the prospective routes are 3-D routes within the layers of the multi-layer substrate, and the temperature characteristic is a 3-D temperature characteristic; and
wherein the processing circuit is further configured to:
identify a 3-D grid of points within the multi-layer substrate; and
identify the 3-D routes by identifying routes within the 3-D grid of points based, at least in part, on the 3-D temperature characteristic, wherein the routing of the wire is between a first endpoint and a second endpoint within the grid of points.

14. The apparatus of claim 13, wherein the processing circuit is further configured to determine the 3-D temperature characteristic associated with each prospective 3-D route by:
determining, for each of the points of the 3-D grid of points, a temperature characteristic of the point;
generating a spatial correlation matrix corresponding to the 3-D grid of points based on the temperature characteristics of the points;
generating a correlation cofactor matrix based on the spatial correlation matrix, wherein the correlation cofactor matrix correlates, for each of the points of the 3-D grid of points, the temperature characteristic of the point with the temperature characteristics of the first and second endpoints; and
determining, for each prospective 3-D route, a temperature correlation between the each prospective 3-D route and the first and second endpoints based on the correlation cofactor matrix.

15. A routing method performed at a circuit design system, comprising:
identifying, at the circuit design system, a plurality of prospective routes for routing a wire through at least one substrate;
using a processor of the circuit design system to determine, for each of the prospective routes, a time-variant temperature characteristic associated with the prospective route that corresponds to a skew associated with the prospective route;
selecting, at the circuit design system, one of the prospective routes based on the time-variant temperature characteristic of the prospective routes; and
storing, in a memory of the circuit design system, an indication of the selected route,
wherein the indication of the selected route is used to manufacture an integrated circuit, substrate or printed circuit board.

16. The method of claim 15, wherein the substrate is a multi-layer substrate and wherein:
identifying the plurality of prospective routes comprises identifying a plurality of prospective three-dimensional (3-D) routes through a plurality of layers of the multi-layer substrate;

determining the time-variant temperature characteristic comprises determining, for each of the prospective 3-D routes, a time-variant 3-D temperature characteristic associated with the prospective 3-D route;

selecting one of the prospective routes comprises selecting a prospective 3-D route based on the time-variant 3-D temperature characteristic of the prospective 3-D route; and storing an indication of the selected route comprises storing an indication of the selected 3-D route in a memory device.

17. The method of claim 16, further comprising:
determining, for each of the prospective 3-D routes, a time-variant 3-D temperature gradient; and
selecting one of the prospective 3-D routes by selecting a route having a smoothest 3-D temperature gradient.

18. The method of claim 16, further comprising:
identifying adverse temperature locations within the multi-layer substrate; and
selecting one of the prospective 3-D routes by selecting a route that avoids the adverse temperature locations.

19. The method of claim 16, further comprising:
determining a density of at least one layer of the multi-layer substrate; and
selecting one of the prospective 3-D routes by selecting the prospective route based in part on the density of the at least one layer of the multi-layer substrate.

20. The method of claim 19, further comprising:
determining the density of at least one layer of the multi-layer substrate by determining a wiring density.

21. The method of claim 15, further comprising:
determining a worst-case skew of the selected route; and
rejecting the selected route if the worst-case skew exceeds a predetermined skew threshold.

22. The method of claim 21, wherein the substrate is a multi-layer substrate with at least one via and the selected route is a 3-D route including the via, and wherein the method further comprises:
determining the worst-case skew for the selected prospective 3-D route based, at least in part, on the inclusion of the via in the 3-D route.

23. The method of claim 15, wherein the routing of the wire is between a first endpoint and a second endpoint, and wherein the method further comprises:
identifying a search window within the at least one substrate; and
adjusting the search window based on locations of the first and second endpoints.

24. The method of claim 22, wherein the substrate is a multi-layer substrate, and wherein the method further comprises:
identifying a search window within each of a plurality of layers of the multi-layer substrate; and
independently adjusting the search windows of different layers of the plurality of layers.

25. The method of claim 15, further comprising:
determining an amount of capacitive coupling between the selected route and at least one other wiring route; and
rejecting the selected route if the amount of capacitive coupling exceeds a predetermined coupling threshold.

26. The method of claim 25, wherein the substrate is a multi-layer substrate, and wherein the method further comprises:
determining the amount of capacitive coupling between the selected route and at least one other wiring route within an adjacent layer of the multi-layer substrate; and
rejecting the selected route if the amount of capacitive coupling with the at least one other wiring route within the adjacent layer exceeds the predetermined coupling threshold.

27. The method of claim 15, wherein the substrate is a multi-layer substrate, the prospective routes are 3-D routes within the layers of the multi-layer substrate, and the temperature characteristic is a 3-D temperature characteristic, and wherein the method further comprises:
identifying a 3-D grid of points within the multi-layer substrate; and
identifying the 3-D routes by identifying routes within the 3-D grid of points based, at least in part, on the 3-D temperature characteristic, wherein the routing of the wire is between a first endpoint and a second endpoint within the grid of points.

28. The method of claim 27, wherein determining the 3-D temperature characteristic associated with each prospective 3-D route comprises:
determining, for each of the points of the 3-D grid of points, a temperature characteristic of the point;
generating a spatial correlation matrix corresponding to the 3-D grid of points based on the temperature characteristics of the points;
generating a correlation cofactor matrix based on the spatial correlation matrix, wherein the correlation cofactor matrix correlates, for each of the points of the 3-D grid of points, the temperature characteristic of the point with the temperature characteristics of the first and second endpoints; and
determining, for each prospective 3-D route, a temperature correlation between the each prospective 3-D route and the first and second endpoints based on the correlation cofactor matrix.

29. A routing apparatus, comprising:
means for identifying a plurality of prospective routes for routing a wire through at least one substrate;
means for determining, for each of the prospective routes, a time-variant temperature characteristic associated with the prospective route;
means for selecting one of the prospective routes based on the time-variant temperature characteristic of the prospective route that corresponds to a skew associated with the prospective route; and
means for storing an indication of the selected route,
wherein the indication of the selected route is used to manufacture an integrated circuit, substrate or printed circuit board.

30. A substrate having a wire formed thereon along a selected route associated with a time-variant temperature gradient from among a plurality of prospective routes, the substrate prepared by a process comprising:
identifying, using a circuit the plurality of prospective routes for routing the wire on the substrate;
determining, using the circuit design system and for each of the prospective routes, a time-variant temperature characteristic associated with the prospective route that corresponds to a skew associated with the prospective route;
selecting, at the circuit design system, one of the prospective routes based on the time-variant temperature characteristic of the prospective routes;
providing an indication of the selected route;
providing the substrate; and
forming the wire on the substrate based on the indication of the selected route.

* * * * *